(12) United States Patent
Aman et al.

(10) Patent No.: US 12,387,543 B2
(45) Date of Patent: Aug. 12, 2025

(54) SYSTEM AND METHOD FOR ALLOWING AUTHENTICATED SELF-ACCESS TO A PREMISES WITHOUT SHARING PESONAL DATA INCLUDING BIOMETRICS

(71) Applicants: James Andrew Aman, Celebration, FL (US); Jeffrey Paul Cheesman, Hamburg, NJ (US)

(72) Inventors: James Andrew Aman, Celebration, FL (US); Jeffrey Paul Cheesman, Hamburg, NJ (US)

( * ) Notice: Subject to any disclaimer, the term of this patent is extended or adjusted under 35 U.S.C. 154(b) by 0 days.

(21) Appl. No.: 17/871,950

(22) Filed: Jul. 24, 2022

(65) Prior Publication Data

US 2023/0016769 A1 Jan. 19, 2023

Related U.S. Application Data

(60) Division of application No. 17/087,126, filed on Nov. 2, 2020, now Pat. No. 11,443,575, which is a division
(Continued)

(51) Int. Cl.
*G07C 9/20* (2020.01)
*A63G 31/16* (2006.01)
(Continued)

(52) U.S. Cl.
CPC .............. *G07C 9/215* (2020.01); *A63G 31/16* (2013.01); *A63G 33/00* (2013.01); *B60R 21/01512* (2014.10); *G06V 20/52* (2022.01); *G07C 9/00896* (2013.01); *G07C 9/25* (2020.01); *G07C 9/257* (2020.01); *G07C 9/28* (2020.01); *G08C 17/02* (2013.01); *H04Q 9/00* (2013.01); *H04W 4/023* (2013.01); *H04W 4/029* (2018.02);
(Continued)

(58) Field of Classification Search
CPC .......... G07C 9/215; G07C 9/25; G07C 9/257; G07C 9/28; G07C 9/00896; G08C 17/02; H04W 4/80; H04W 4/029; H04W 4/023; H04Q 9/00; G06V 20/52; B60R 21/01512; A63G 31/16; A63G 33/00
USPC ...................... 235/382, 382.5, 380, 375, 487
See application file for complete search history.

(56) References Cited

U.S. PATENT DOCUMENTS

2005/0242921 A1 11/2005 Zimmerman et al.
2013/0045804 A1 2/2013 Ruke
(Continued)

Primary Examiner — Edwyn Labaze

(57) ABSTRACT

A system for providing a customized guest experience to a specific guest during a group experience being provided to one or more guests including the specific guest. The system comprising an interactive gaming system for engaging the guest across two or more locationally distinct guest experiences, at least one of which being the group experience, a guest tracking system for determining a final seating or otherwise distinct location being occupied by the specific guest during the receiving of the group experience, where the guest wears or carries wireless tracking means sensed by the guest tracking system. The system further comprises one or more apparatus for providing the customized guest experience to the specific guest while the specific guest is substantially occupying the specific distinct location of the group location, where the customized guest experience is based at least in part upon the specific distinct location.

20 Claims, 11 Drawing Sheets

Related U.S. Application Data of application No. 16/055,078, filed on Aug. 4, 2018, now Pat. No. 10,861,267, which is a continuation-in-part of application No. 15/975,236, filed on May 9, 2018, now Pat. No. 10,719,134.

(60) Provisional application No. 62/541,328, filed on Aug. 4, 2017.

(51) Int. Cl.
| | | |
|---|---|---|
| *A63G 33/00* | (2006.01) | |
| *B60R 21/015* | (2006.01) | |
| *G06V 20/52* | (2022.01) | |
| *G07C 9/00* | (2020.01) | |
| *G07C 9/25* | (2020.01) | |
| *G07C 9/28* | (2020.01) | |
| *G08C 17/02* | (2006.01) | |
| *H04Q 9/00* | (2006.01) | |
| *H04W 4/02* | (2018.01) | |
| *H04W 4/029* | (2018.01) | |
| *H04W 4/80* | (2018.01) | |
| *B60R 21/00* | (2006.01) | |
| *H04W 4/08* | (2009.01) | |

(52) U.S. Cl.
CPC ....... *H04W 4/80* (2018.02); *B60R 2021/0097* (2013.01); *G07C 2209/08* (2013.01); *H04Q 2209/47* (2013.01); *H04W 4/08* (2013.01)

(56) References Cited

U.S. PATENT DOCUMENTS

| | | | |
|---|---|---|---|
| 2013/0227651 A1 | 8/2013 | Schultz | |
| 2016/0005053 A1* | 1/2016 | Klima | G06T 5/002 |
| | | | 705/7.29 |
| 2016/0224803 A1* | 8/2016 | Frank | G06F 21/6245 |
| 2017/0169449 A1* | 6/2017 | Heaven | G06Q 30/0203 |
| 2018/0311588 A1* | 11/2018 | Beumers | A63G 31/16 |
| 2020/0215442 A1* | 7/2020 | Leiba | G06F 3/011 |
| 2021/0016185 A1* | 1/2021 | Linguanti | A63G 31/00 |
| 2022/0214742 A1* | 7/2022 | Yeh | G06F 3/016 |

* cited by examiner

Smart-Ticket 2

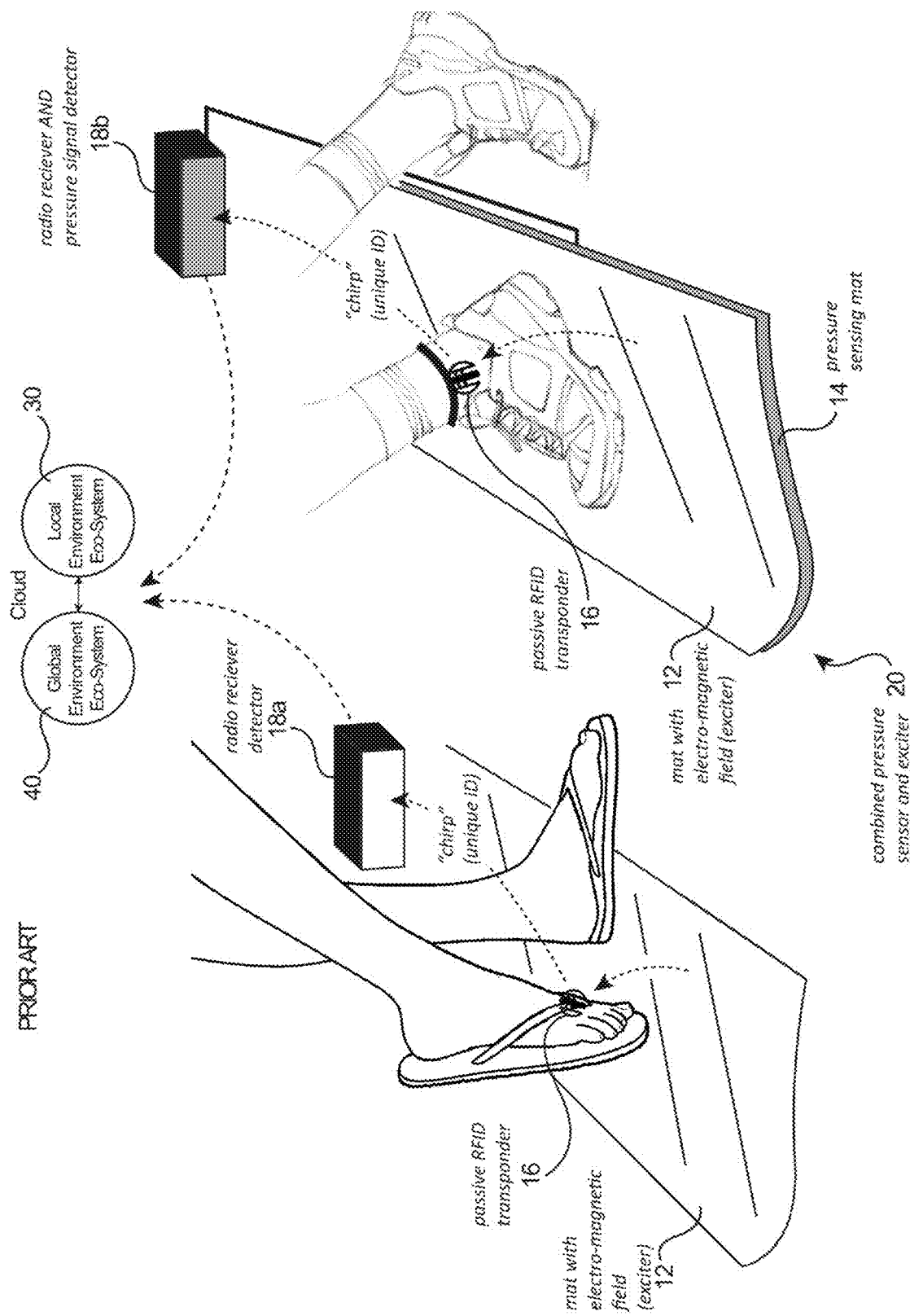

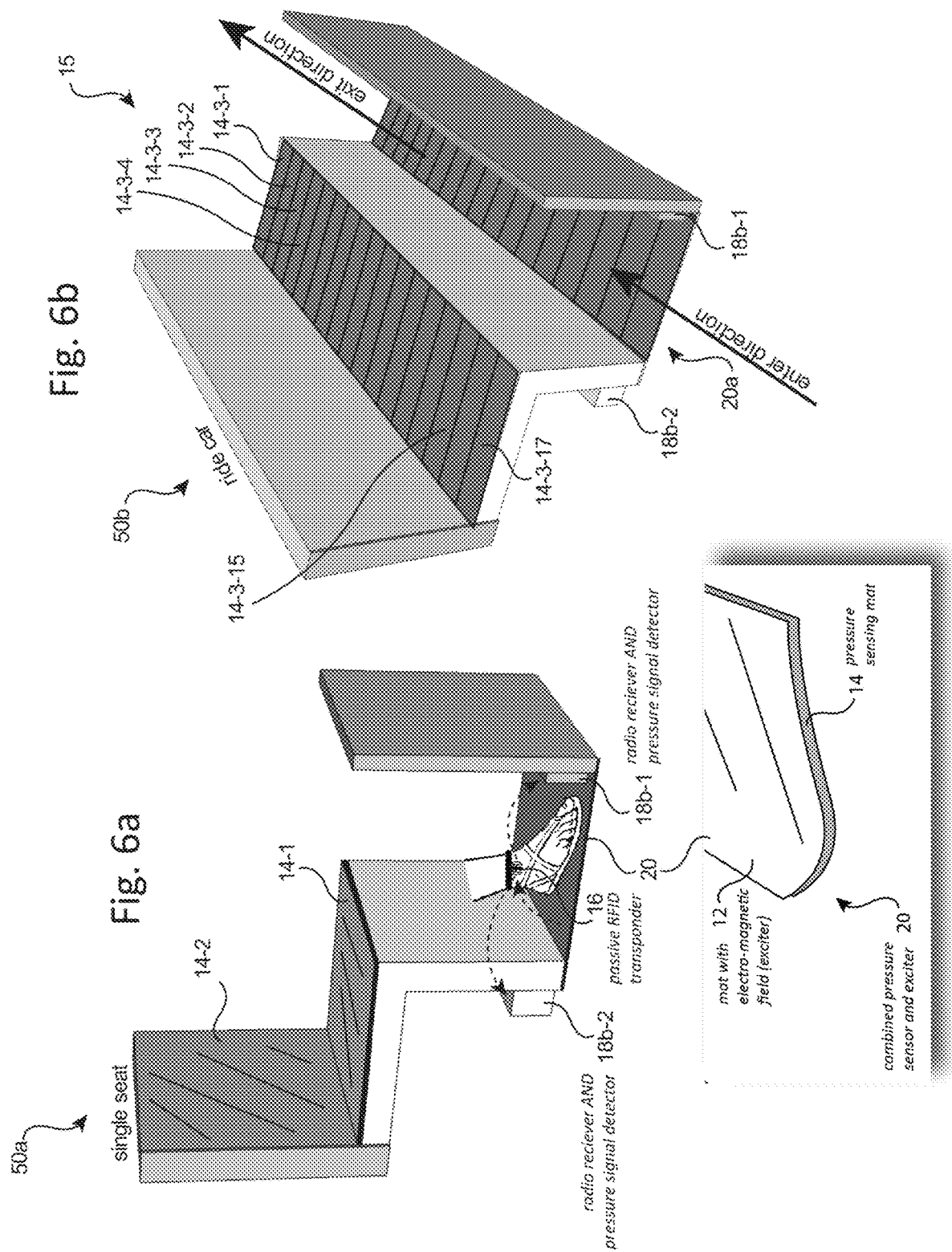

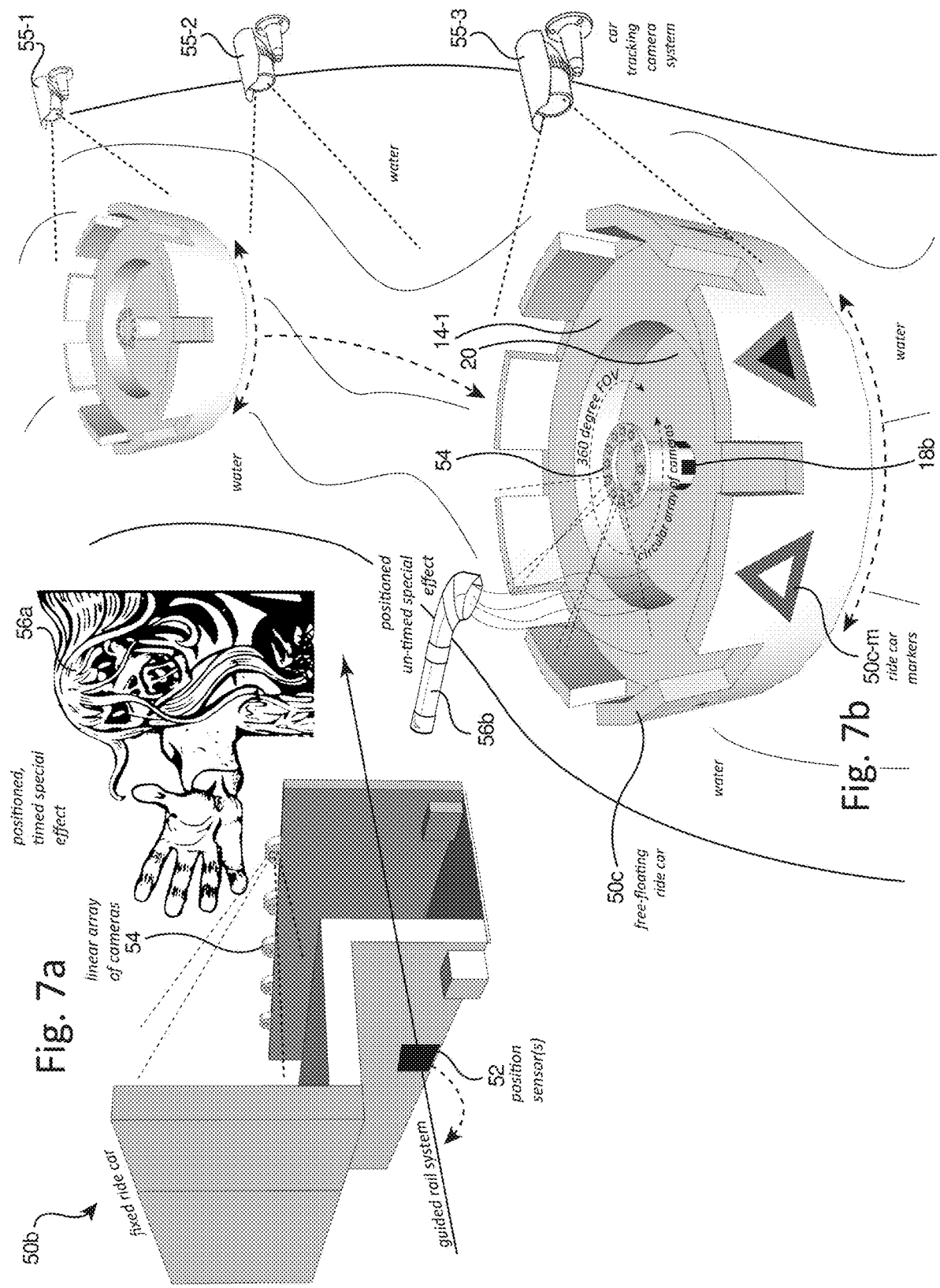

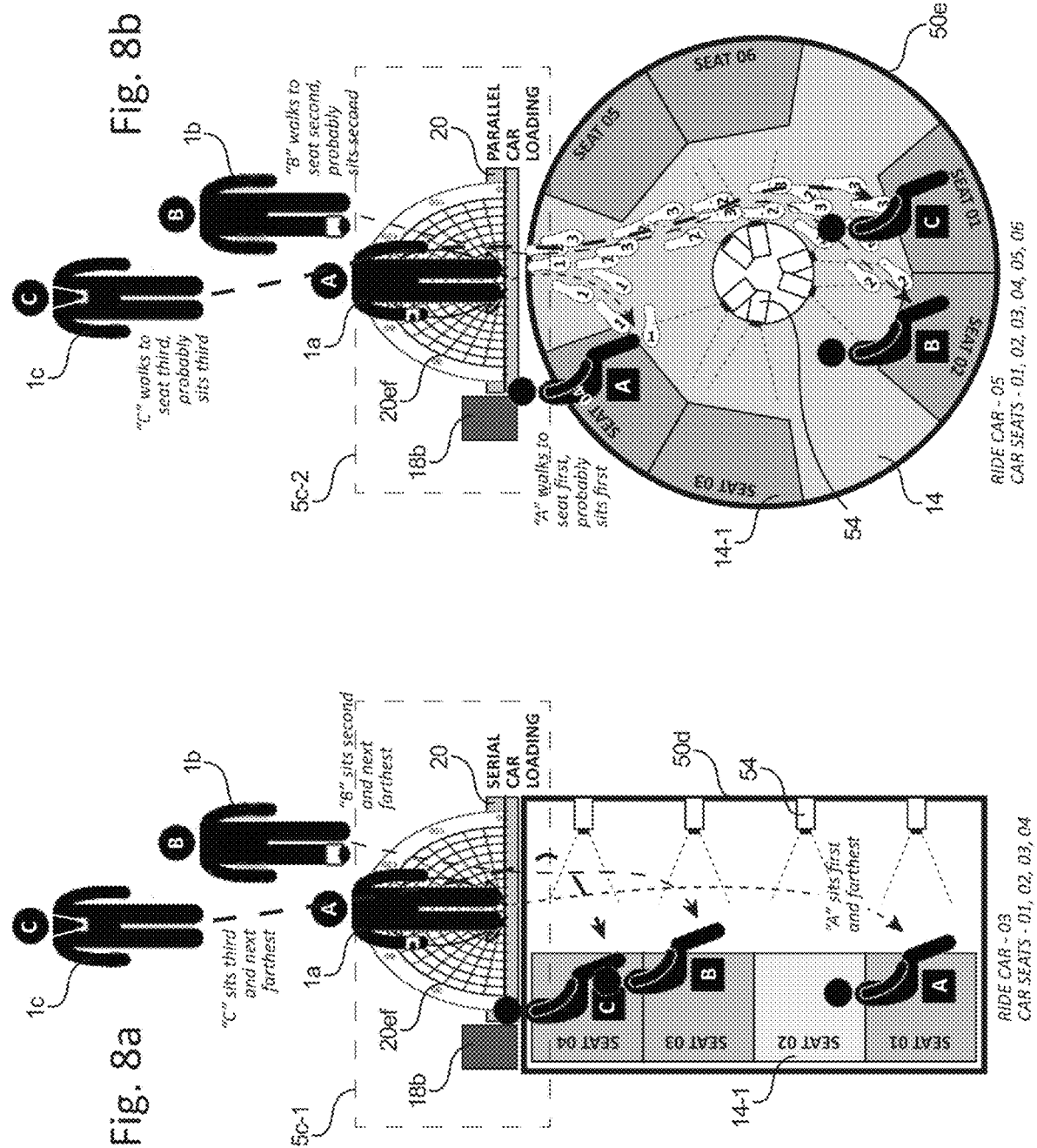

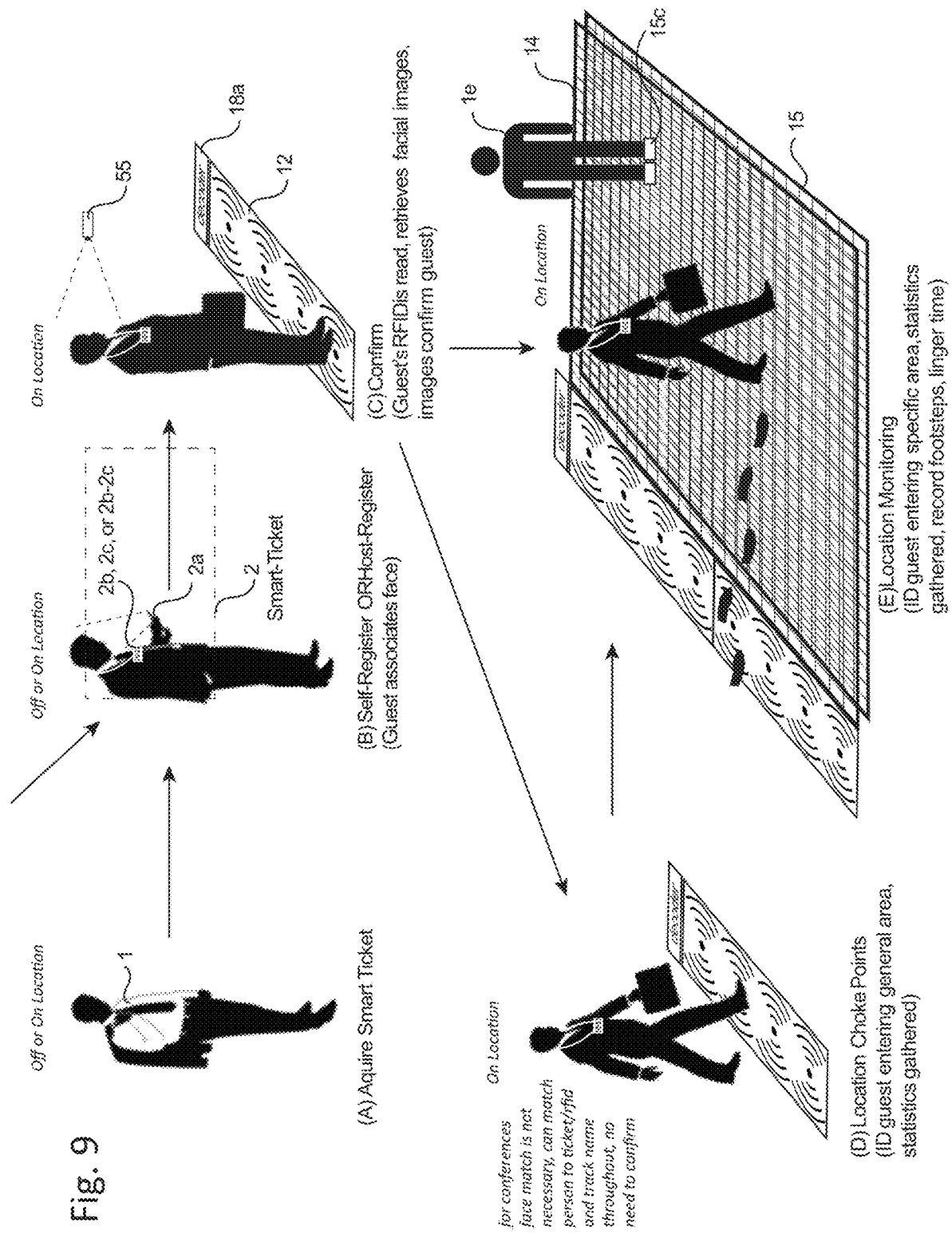

SYSTEM AND METHOD FOR ALLOWING AUTHENTICATED SELF-ACCESS TO A PREMISES WITHOUT SHARING PESONAL DATA INCLUDING BIOMETRICS

CROSS-REFERENCE TO RELATED APPLICATIONS

The present application is a divisional of U.S. Non-Provisional application Ser. No. 17/087,126 entitled THEME PARK GAMIFICATION, GUEST TRACKING AND ACCESS CONTROL SYSTEM filed on Nov. 2, 2020. The parent application is a divisional of U.S. Non-Provisional application Ser. No. 16/055,078 entitled THEME PARK GAMIFICATION, GUEST TRACKING AND ACCESS CONTROL SYSTEM filed on Aug. 4, 2018. U.S. Non-Provisional application Ser. No. 16/055,078 is a continuation-in-part of the U.S. Non-Provisional application Ser. No. 15/975,236 entitled INTERACTIVE OBJECT TRACKING MIRROR-DISPLAY AND ENTERTAINMENT SYSTEM filed on May 9, 2018. The present application through U.S. Non-Provisional application Ser. No. 16/055,078 claims the benefit of U.S. Provisional Application No. 62/541,328 filed on Aug. 4, 2017.

FIELD OF INVENTION

The present invention relates to a physical-virtual theme park gaming experience that relies at least in part upon guest tracking and provides novel solutions for determining the location of guests as they enter the park and other park areas such as ride lines, rides, shows, restaurants, shops, etc. The present invention teaches apparatus and methods for determining the individual seat a guest is occupying on a moving ride, including guided rides and free-floating rides. The tracking apparatus is also shown to support unmanned and secure venue and sub-venue access control.

BACKGROUND OF THE INVENTION

There are roughly 700 theme and amusement parks worldwide hosting just under 1 billion visitors annually. The typical park provides an enclosed area with a number of park vistas, rides, shows and restaurants, where the park vistas have a limited amount of interactivity and the rides and shows are a repeating unchanging experience. Some theme parks such as Disney World are offering limited guest tracking with some ability to have individualized experiences.

What is needed is a guest tracking system that at least tracks guests to distinct physical park-interaction locations, such as ride lines, rides, shows, restaurants, shops, etc., where the tracking system detects and maintains a database of each guest that is currently inside of a given park-interaction location. When the location is a ride, it is further desirable to detect and determine what ride car, row and seat an individual guest is sitting within, combined with the ongoing location of the ride car as it is guided along the ride path and ultimately past ride special effects. When the ride is a free-floating ride, such as a raft on a waterway, or free-ranging, such as a go cart on a race track, it is desirable to track the on-going location and orientation of the ride craft or vehicle. Using the ride car, craft or vehicle information in combination with the guest seat location provides significant opportunities for creating customized guest experiences, including controlling or directing the output of a ride effect, where the effects may output light, sound, water, air, vibration, etc., and where the ride effects may be fixed to a venue structure or asset, fixed to the venue structure or asset but movable in one or more degrees of freedom, or free-floating such as a radio controlled drone.

All theme parks prohibit a guest from carrying their cell phone at least on fast moving rides prohibiting a guest from capturing self-images. What is needed is a system for allowing a guest to capture self-images on moving rides. Theme parks do not currently provide means for allowing guests to play games while riding on the cars, crafts or vehicles, where the games include pressing buttons or other inputs in real-time, where the inputs are also usable along with the guest locations for controlling or directing the output of a ride effect.

Guests visiting theme parks also typically wait in several lines including at least the line to enter the park and lines for what are known as "fast lanes," where a typical ride has a "normal lane" than any ticket holder may enter which might have a 120-minute wait time, and a fast lane that only premium ticket holders may enter which might have a 20-minute wait time. When entering the park during busy times, guests often wait for 20-30 minutes to go through a manned ticket check where many parks are also requiring the guest to provide biometric information such as a fingerprint to ensure that a single multi-day ticket is being limited to a single person. What is needed is a way for guests to register their own tickets by at least associating their own biometric using a venue app that remains private to the guest, whereupon pre-entry into a park the guest uses their own cell phone to provide confirmation of their biometric. In such a system, the guests cell phone become an official entry checkpoint for the venue, while still providing guest information privacy. For parks that currently have manned checkpoints for securing park fast lane entrance, the present invention offers significant labor-saving costs as guest use self-serve access points that do not require individual staff to operate. While some parks have already upgraded to unmanned "touch points" that allow a guest to scan their ticket and touch their finger for biometric proof, these stations are costly and are often still manned as the fingerprint readers can be difficult for some guests to manage.

And lastly, families and large groups for example from a school, have the additional concerns of lost and missing children. What is needed is a combined access control, guest tracking, gaming and lost guest services platform, such as herein described.

BRIEF SUMMARY OF THE INVENTION

Certain embodiments commensurate in scope with the originally claimed subject matter are summarized below. These embodiments are not intended to limit the scope of the disclosure, but rather these embodiments are intended only to provide a brief summary of disclosed invention. Indeed, the present disclosure may encompass a variety of forms that may be similar to or different from the embodiments set forth below.

The present invention provides for a guest smart ticket that preferably includes close range data, such as the ticket number and status, and extended range data, such as a guest tracking number. The guest downloads a venue app onto their cell phone prior to arriving at the park. Using the venue app they scan the close range data using the cell phone's near field communications. Once their tickets numbers are uploaded into their venue app, the guest then provides their personal biometric data, such as a finger print and/or facial image after which the venue app updates the smart ticket status to "registered." This data remains on their cell phone and private to them and is only shared under rare instances of identity conflicts. The venue app uses GPS to determine its current location and restricts the guest from certain functions based upon their location. One key restricted function is the step of confirmation, which can only happen after registration and within a bounded pre-area of the park, just before the park entrance. Guests enter the bounded pre-area by scanning their registered tickets into an unmanned access point. Once in the pre-area, the venue app will then automatically allow the guest to use their own cell phone to re-enter biometric data. The venue app then self-confirms that this re-entered biometric data matches the registration data and if so resets the status on the guest's smart ticket to "confirmed." The guest may then scan their confirmed ticket at a second unmanned access point to enter the park. The present invention shows that this same step of a pre-area with confirmation is usable inside the park in any "sub-venue," such as a fast lane or show where entrance is restricted based upon the type of ticket purchased. Once inside the park, there are multiple chokepoints that include one or more extended range data readers such a RFID technology. As guests pass by any of the chokepoints, their tracking number is detected and logged. The tracking number is optionally associated with the ticket number and potential non-private guest information such as age, sex, city, state, etc. The park benefits from the real-time tracking database and analytics providing valuable information about all guests in any given park-interaction locations, such as ride lines, rides, shows, restaurants, shops, etc. Additional teachings herein provide multiple solutions for then also determining the individual ride seat a given guest is occupying on any type of guided, free-floating or free-ranging ride. Using this detailed tracking information, park assets such as ride effects are then programmed to alter their output based at least in part upon any of the guest information especially including tracking information. Guests benefit in multiple ways from the present invention. The typical repeating park experiences become individualized, at a level controllable by the guest. For example, the guest may optionally provide a name to be associated with their tracking number such that park effects can speak their name. On select rides such as a free-floating water craft, guests can play an interactive game as the ride automatically lights up seats predicting which guest is going to be doused with a water effect, and all guests can choose by a button to increase or decrease the amount of water. Guests playing a parkwide game can build up points and credits that are usable for input into the park effect control algorithms, for example a guest with sufficient points can have a shield against the water effect, turning it around on the other guests in the craft, such that any guest who voted to have extra water dumped will themselves be squirted by a ride apparatus on the craft.

Optional camera apparatus usable on the rides for confirming seat occupancy can also include a "selfie-button" allowing the guest to capture self-images at any point along the ride, where proofs of the images are then immediately transferred to the venue app for review, purchased and automatic social media posting after the present system detects that the guest has disembarked. Guests in groups such as families with children can use a single cell phone to register and confirm the entire family. Guests in groups such as from a school can associate multiple cell phones and apps as a single group, where each of the multiple venue apps might for example control 5 tickets. All groups can assign one or more guardians. Guardians can see in real-time which park interaction location any associated guest is within, or was last within, and otherwise the last known chokepoint through which the associated guest passed. Guardians can report any of their guests as missing, immediately notifying park staff with all relevant data, include sending pre-captured pictures of the guest as stored on the guardian's cell phone and venue app. Any park staff or other guest that thinks they see a missing guest can capture an image of that possibly missing guest, where the image is immediately uploaded and using facial meta data is compared to other facial meta data, such that all possible guardians are immediately notified and asked to respond.

Given the state-of-the-art in printed electronics, RFID tracking systems, pressure sensing materials such as conductive fabrics and plastics, software systems including mobile applications and symmetrical encryption, controllable output devices for causing various outputs including light, sound, air and water, etc., as well as the novel dual public-private image display technology described in the parent patent of which this application is a continuation-in-part, it is now possible to achieve the many benefits described herein using the taught apparatus and methods.

The present invention is anticipated to offer significant benefits beyond theme and amusement parks, for example including museums, sporting and music venues, convention centers, air ports and even secure office buildings.

74 which is the venue that guests enter by scanning their confirmed smart-ticket 2c into a self-service access point 5a-3 changing their smart-ticket 2c status to active. Also shown are self-serve access points 5a-2 and 5a-4 though which guests may exit ZONE3 73 or ZONE4 74 respectively, resetting their smart-ticket status to registered.

Figure 4:
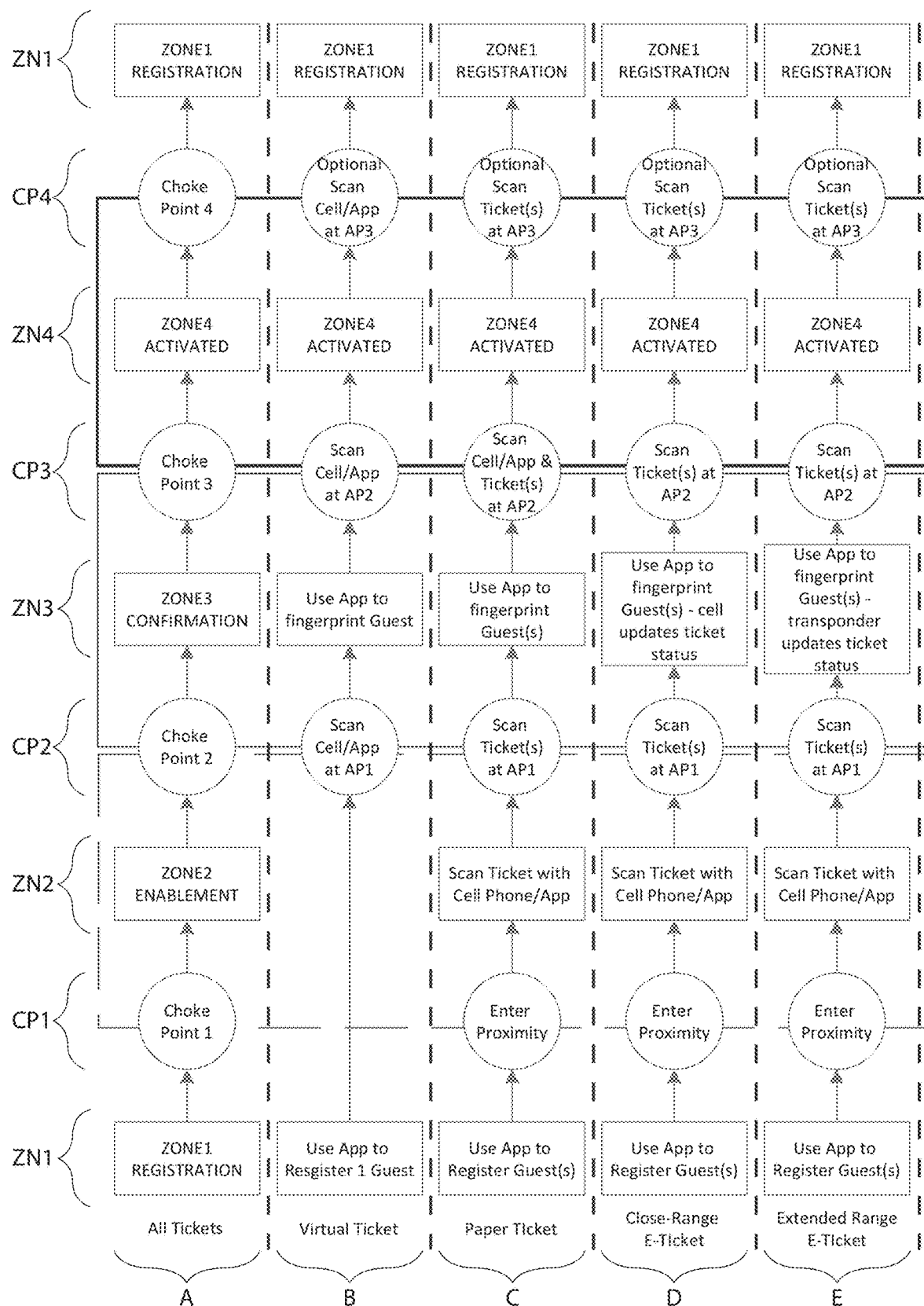

FIG. 4 is a flowchart of the progression of various smart ticket 2 implementations through the herein taught four ZONES: ZN1, ZN2, ZN3, ZN4. The progression flow is bottom-to-top and compares: (A) All Tickets, (B) Virtual Tickets comprising only cell phone and venue app 2a, (C) Paper Tickets comprising cell phone and venue app 2a combined with paper ticket 2b, (D) Close-Range E-Ticket comprising cell phone and venue app 2a combined with electronic ticket 2c readable at close ranges for example using near-field communications, and (E) Extended Ranges E-Ticket comprising cell phone and venue app 2a combined with electronic ticket 2c readable at extended ranges for example using RFID.

FIG. 5a depicts the PRIOR ART including an exciter mat 12 for emitting an electro-magnetic field that energizes a unique passive RFID within wearable 16, where the energizing results in reflections or "chirps" emitted by the passive RFID and received and decoded by the radio receiver 18a. The PRIOR ART allows individuals to be uniquely identified as they walk over mat 12.

FIG. 5b depicts a preferred adaptation of the PRIOR ART that additionally includes a pressure sensing mat 14 in combination with exciter mat 12 forming combined pressure sensor and exciter 20, where the combination of pressure data and RFID chirps emitted by wearable 16 are received, decoded and processing by radio receiver and pressure signal detector 18b.

FIG. 6a depicts a single seat 50a that comprises combined pressure and sensor mat 20 placed upon the floor area just outside the seat area where a guest is expected to stand just prior to occupying the seat 50a, where mat 20 in combination with detectors 18b-1 and 18b-2 serve to detect the unique ID of wearable 16 as well as the location of guest 1 in front of the seat. Seat 50a also comprises seat pressure sensor 14-1 and back rest pressure sensor 14-2, each capable of detecting guest 1 presence by way of pressure.

FIG. 6b depicts a bench seat 50b that like seat 50a comprises a combined mat 20a placed on the floor and a pressure sensor 15 placed upon the bench seat. Combined mat 20a, like pressure sensor 15, is depicted as comprising a multiplicity of independent sub-areas such as 14-3-1, each for independently detecting pressure. Detectors 18b-1 and 18b-2 serve to detect each of multiple guests 1 both entering and exiting bench seat 50b, where the final bench seat occupation of ride car 50b is determinable using any of pressure sensors with mat 20 or 15.

FIG. 7a depicts ride car with bench seat 50b such as found on a theme park ride where the car 50b is controllably transported on a guided rail system, and where position sensor 52 is capable of determining the current location of ride car 50b upon the guided rail system. Ride car 50b is further adapted to include one or more cameras 54 for imaging either or both the seat 50b for detecting the presence of a guest 1, or the guest 1 occupying the seat. Also depicted is positioned, timed special effect 56a, where effect 56a is alterable according to detected guest 1 information, and where cameras 54 capture images timed with special effects 56a.

FIG. 7b depicts free-floating ride car 50c such as a water raft found at a theme park where car 50c floats freely within a confined waterway, and where a multiplicity of camera such as 55-1, 55-2, 55-3 track the location and orientation of car 50c as it floats down the waterway. An imaging system receiving images from cameras such as 55-1, 55-2 and 55-3 determines the location and orientation of ride car 50c through the combination of the pre-known and calibrated location of each camera with respect to the waterway, as well as the pre-known relationships between natural fiducials and landmarks on ride car 50c, or applied markers 50c-m. Combination mat 20, seat sensor 14-1 and detectors 18b serve to determine the unique seating position of each guest 1 within ride car 50c. The combination of the determined location and orientation of ride car 50c within the waterway, along with the determination of the seating location of guest 1 within ride car 50c, allow for the prediction of interface moments between guests 1 and positioned un-timed special effects 56b, where the moments of interface can be imaged by cameras 54.

FIG. 8a depicts the serial car loading of a ride car 50d, where a multiplicity of guests such as 1a, 1b and 1c pass through exciter field 20ef emitted by combination mat 20, such that the identification of each guest is determined in entry sequence by detector 18b. Ride car 50d is shown with multiple means for identifying which guest 1 occupies each of SEATS 01, 02, 03 and 04 as for example, where multiple means includes seat pressure sensors 14-1 and cameras 54.

FIG. 8b depicts the parallel car loading of a ride car 50e, where a multiplicity of guests such as 1a, 1b and 1c pass through exciter field 20ef emitted by combination mat 20, such that the identification of each guest is determined in entry sequence by detector 18b. Ride car 50e is shown with multiple means for identifying which guest 1 occupies each of SEATS 01, 02, 03, 04, 05 and 06 as for example, where multiple means includes seat pressure sensors 14-1, floor pressure sensor 14 and cameras 54.

Figure 8C:
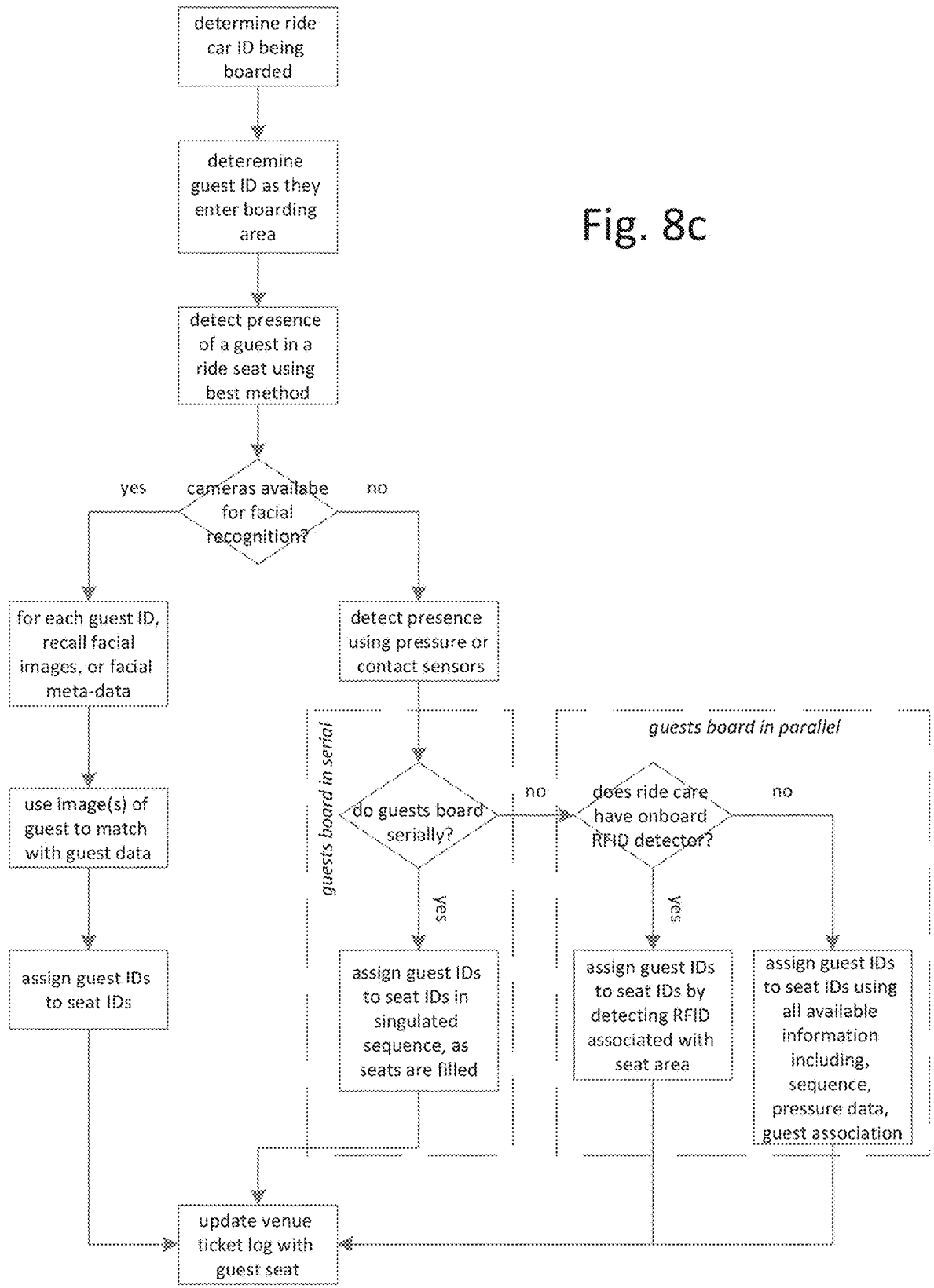

FIG. 8c is a flowchart reviewing the steps for determining the unique ride car seat occupancy based upon either the use of cameras versus pressure or contact sensors, and for the use of pressure or contact sensors the determination based upon guests 1 boarding in serial or in parallel.

FIG. 9 depicts the use of the present teachings in a convention all setting, where an attendee 1 goes through a sequence of steps A, B, C, D and E to acquire a ticket, self-register, confirm their ticket and identity, enter a restricted area and have their location monitored by pressure sensor 14 as they walk about a specific area, such as a trade show booth. Also depicted is employee 1e wearing unique resonance coils 15c for remote detection by resonance detection matric 15.

Figure 3:
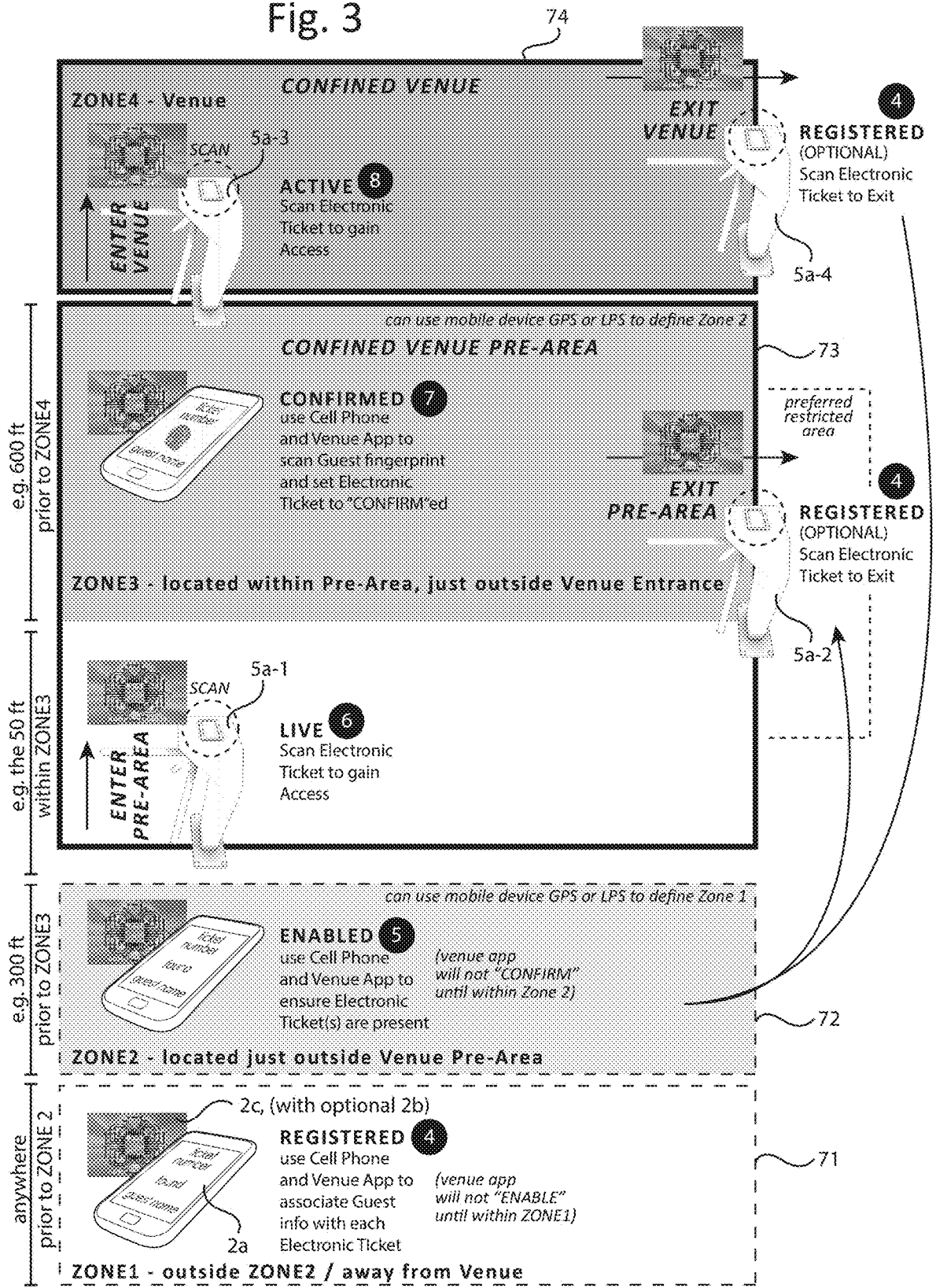
FIG. 3 is a pictorial-block diagram showing a progression of spatial zones within which the guest operates cell phone and venue app 2a in combination with at least electronic ticket 2c and optionally paper ticket 2b. The spatial zones include: ZONE1 71 where guests complete smart-ticket registration, ZONE2 72 where guests scan their smart-ticket(s) 2c with their phone and app 2a to enable the ticket 2c for use with a venue self-serve access point 5a-1, ZONE 3 73 where guests enter biometric data such as their fingerprint or facial image into cell phone and app 2a to confirm their smart-ticket(s) 2c prior to entering the venue, and ZONE4
Figure 10:
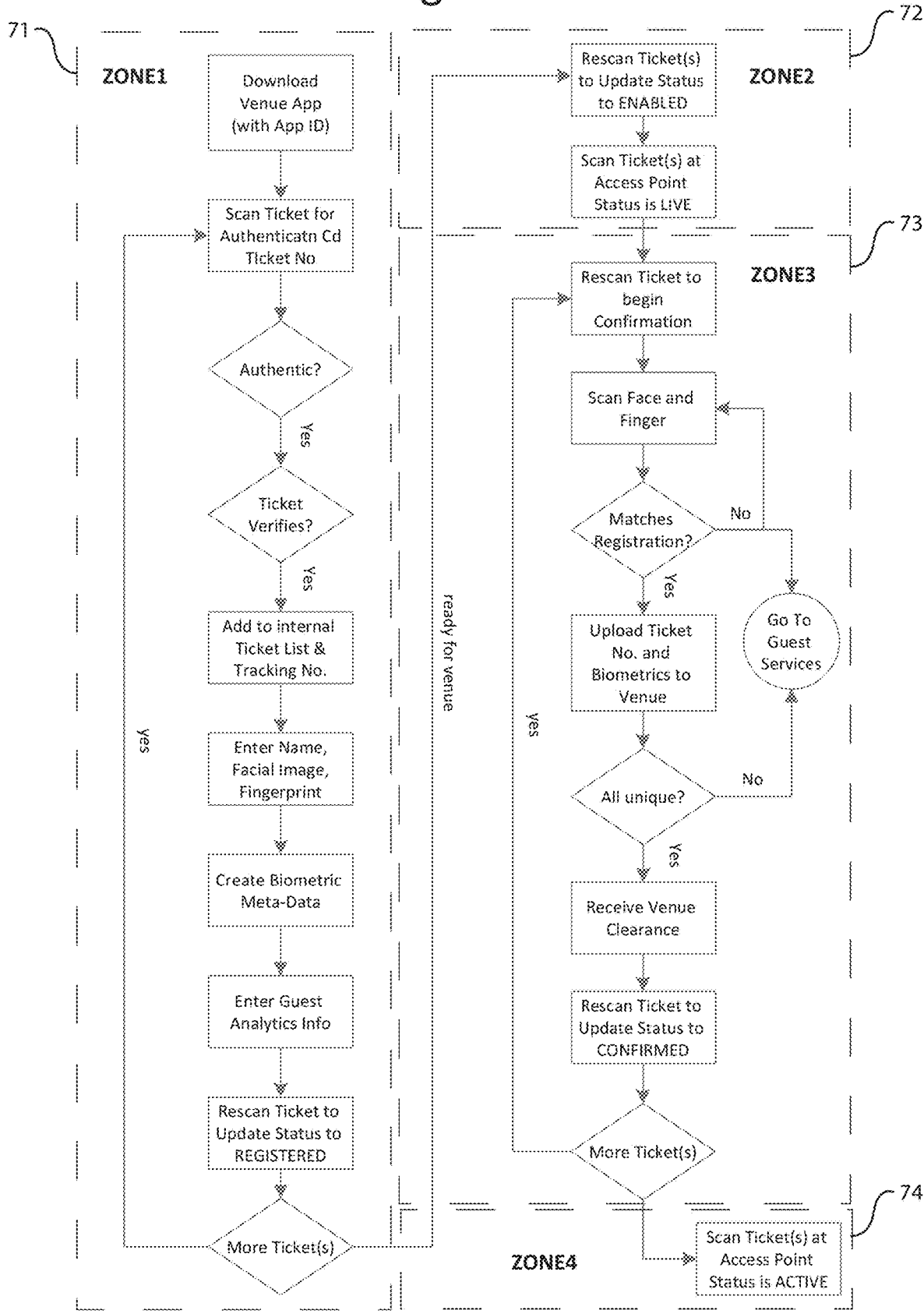

FIG. 10 depicts an alternate implementation for controlling unmanned secured guest 1 access into a venue providing a higher level of security than implemented especially in reference to FIGS. 3 and 4. The use of ZONEs 1, 2, 3 and 4 remains as originally taught, where guest 1 is now additionally required to provide at least facial images, and not necessarily finger prints, within both ZONE1 for ticket registration and within ZONE3 for venue access confirmation. Venue access confirmation includes real-time communication of at least facial meta-data to a venue access management system providing algorithms facial matching to determine if the guest 1 in ZONE3 requesting access into ZONE4 (the venue) has already been prior recognized as being confirmed and possibly already located within ZONE4. If the automatic verification of facial metadata determines a possible match for guest 1, were the possible match is already confirmed, then at least the facial images of guest 1 along with those of the possible match(es) are immediately presented to a venue agent for human evaluation and confirmation, providing the highest levels of security by combining stringent algorithmic matching combined with human evaluation to adjudicate possible access conflicts.

In the following description, numerous specific details are set forth, such as examples of specific components, types of usage scenarios, etc. in order to provide a thorough understanding of the present disclosure. It will be apparent, however, to one skilled in the art that the present disclosure may be practiced without these specific details and with alternative implementations, some of which are also described herein. In other instances, well known components or methods have not been described in detail to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

Figure 1:
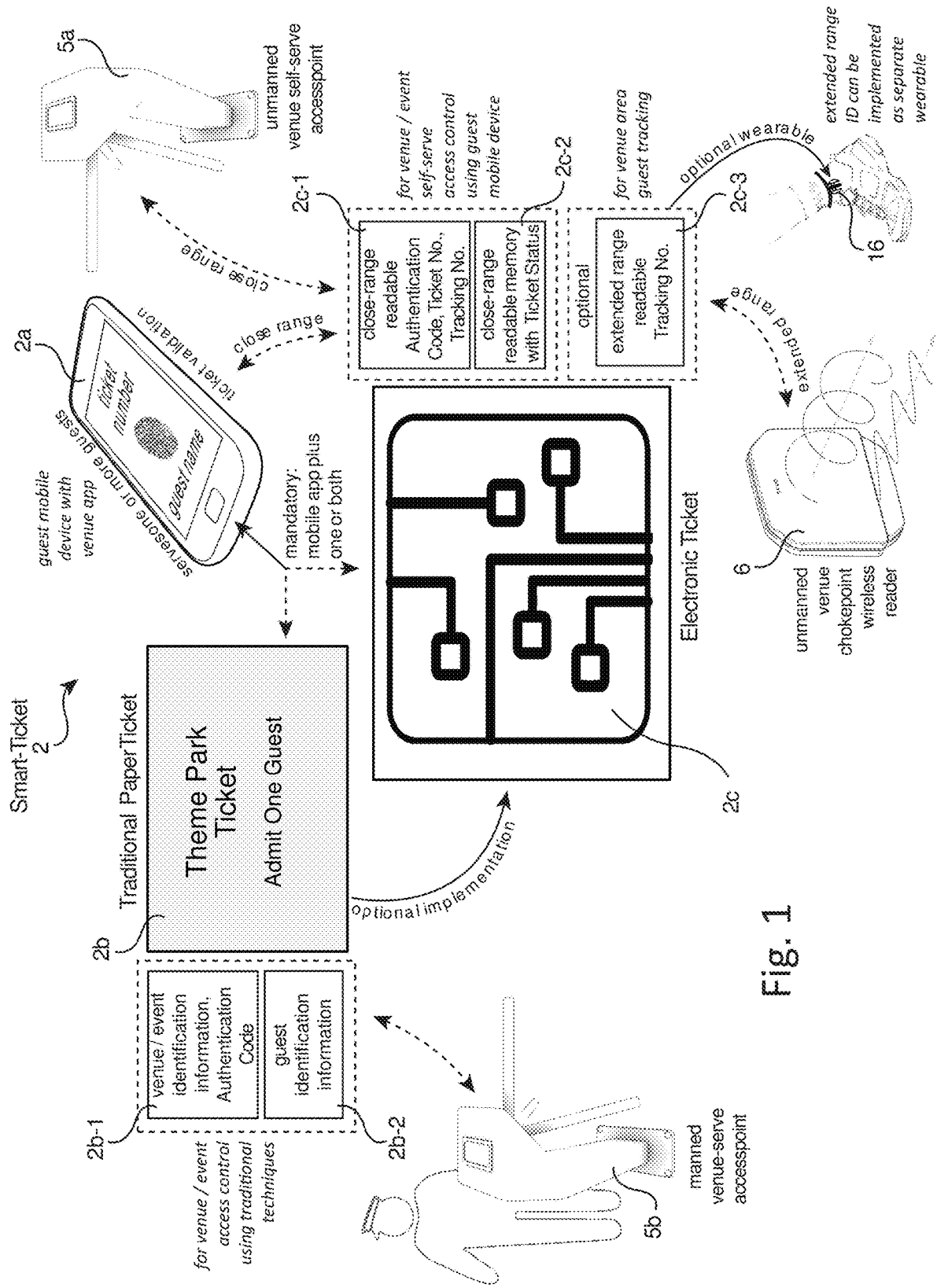
FIG. 1 is a pictorial-component diagram showing a smart-ticket 2 and its scanners including unmanned venue self-serve access point 5a and unmanned venue chokepoint wireless reader 6. Smart-ticket 2 comprises at least guest cell-phone and venue app 2a combined with either or both traditional paper ticket 2b or electronic ticket 2c. Paper ticket 2b comprises venue/event identification information 2b-1 and guest identification information 2b-2. Electronic ticket 2c comprises close-range readable authentication code, ticket number and tracking number 2c-1, close-range readable memory with ticket status 2c-2 and optional extended range readable tracking number 2c-3, where optional tracking number 2c-3 can alternatively be implemented in a wearable, such as anklet 16. Also shown is manned venue serve access point 5b for at least using the smart-ticket 2 to permit venue access.

Referring to FIG. 1 there is shown a pictorial-component diagram of a smart-ticket 2 for use by a guest 1 (not depicted until FIG. 2) of a venue to achieve self-serve access to a secured venue premise. Smart-ticket 2 minimally comprises cell phone and venue app 2a, with alternates comprising device 2a in combination with either or both of traditional paper ticket 2b or electronic ticket 2c. The preferred embodiment is a combined ticket that includes both traditional paper 2b and electronics 2c. While cell phone and app 2a in combination with electronic ticket 2c is the main focus especially of upcoming FIG. 2 and FIG. 3, the additional value of combining paper ticket 2b will be well understood by those skilled in the art of venue access management, as it offers valuable information to the guest 1 and provides value to several traditional guest services including venue assisted venue access and ticket replacement. Furthermore, especially with respect to upcoming FIG. 4, the present inventor will describe an alternative implementation of smart-ticket 2 that comprises only cell and app 2a combined with paper ticket 2b and not including electronic ticket 2c. This combination of 2a and 2b will also be shown to allow for guest 1 self-serve access to a secure venue. All combinations of ticket components 2a, 2b and 2c for forming smart-ticket 2 have significant value, where the combinations include: 2a combined with 2b, 2a combined with 2c, as well as 2a combined with 2b and 2c, and all combinations are considered to fall within the scope of the present invention.

Still referring to FIG. 1, as will be well understood by those skilled in the art of printed electronics, devices comprising circuits, antennas, memories, sensors, batteries, etc. traditionally implemented on silicon are now commercially available or soon to be available as electrical components printed onto various often flexible substrates using common printing equipment and processes including screen printing, flexography, gravure, offset lithography and inkjet. There are many commercial vendors supplying printed electronics including ThinFilm Electronics ASA with headquarters in Norway. ThinFilm's printed electronics include tags and labels that include memory, sensors, displays, and wireless communications. ThinFilms choice of wireless communications circuitry is Near Field Communications, or NFC, which typically exchanges information at ranges of sub-two inches. This close-range has advantages including lower transmission powers and increased security, all as is well known in the art. Specifically, the present invention prefers what ThinFilm refers to as its "NFC barcode," which is a barcode encoding readout using a wireless nearfield communication signal supplied by a reading device, such as a self-serve access points 5a or cell phone and venue app 2a, both to be discussed herein. A significant advantage of the ThinFilm solution is that the resulting printed electronics are passive, drawing upon the power provided by the NFC signal emitted by the reader. As is well known in the art of venue access management, passive tickets are preferred for many reasons including that they will never run out of power, tend to be smaller/thinner, and are also typically lower in cost. For example, the Thin Film smart labels (akin to a ticket) are anticipated to be available at costs of around $0.05.

Still referring to FIG. 1, the cell phone of cell phone and app 2a is presumed to belong to the guest 1, where the guest 1 has downloaded a venue app onto their cell phone to form 2a. Traditional paper ticket 2b is well-known to comprise at least venue/event identification information 2b-1 as well as guest identification information 2b-2. The present inventor prefers that venue/event identification information 2b-1 additionally include an authentication code, that may for example take the form of a 2-D bar code such as a QR code, representative of the venue/event. As will be discussed especially in relation to upcoming FIGS. 2 and 3, this printed authentication code can then have a proprietary algorithmic relationship to a second authentication code embedded along with the ticket number within close-range readable ID/ticket number data 2c-1, such that the two authentication codes are comparable for authenticating the ticket: 1) by and for the purchaser using cell phone and venue app 2a upon receiving their combination paper ticket 2b and electronic ticket 2c, and 2) by and for the venue or event management using access points 5a or 5b at the venue/event. As will be well understood by those familiar with anti-counterfeit measures, companies such as Hewlett Packard offer a global product authentication service, whereby at least the printed authentication code is validated via a cloud-based service accessed by either the purchaser/guest 1 using cell phone and venue app 2a or the venue/event management using access points 5a or 5b with sufficient connection to the internet, such that the ticket is instantly verified. As will also be well understood by those familiar with venue and event management, traditional paper ticket 2b is sufficient for providing the guest 1 with access to a venue/event via a manned venue service access point 5b.

Still referring to FIG. 1, electronic ticket 2c preferably includes close-range readable authentication code, ticket number and tracking number, 2c-1 as well as close-range readable memory 2c-2, where memory 2c-2 is used to at least hold the status of smart-ticket 2, all as will be discussed in greater detail especially in relation to upcoming FIG. 2. As prior mentioned, a close range is roughly 1.6" when using a reader technology such as NFC that is commonly available in most smart phones in today's marketplace. Electronic ticket 2c optionally includes extended range readable ID/tracking number 2c-3, which is preferably implemented as a passive RFID. As will be well understood by those familiar with RFID technology, passive UHF (ultra high frequency) RFID tags can be read at distances ranging from 3 feet (for "Gen1" tags) up to 37 feet (for "Gen2" tags) using currently available technology implemented as unmanned venue chokepoint wireless reader 6. As will be discussed especially with respect to upcoming FIGS. 5a, 5b, 6a, 6b, 7a and 7b, if the venue is for example a theme park or amusement park, the present inventor prefers that extended range readable datum 2c-3 is implemented as a separate wearable, such as anklet with passive RFID 16, as opposed to being implemented as a part of electronic ticket 2c. As will be well understood by those familiar with wireless reading of information, the preferred close-range NFC and extended range RFID are not mandatory as other technologies exist and are also anticipated to be developed in the future.

What is most important is that one or more technologies are implemented for close-range and extended-range reading, where the preferred features of the close-range reader technology are: 1) either active or (preferably) passive reading of digital information at short ranges that are essentially within the near proximity and therefore awareness of guest 1, e.g. less than 6 inches, 2) the ability to secure the read data 2c-1 and 2c-2 using protocols sufficient for, and commensurate with, the particular implementation of the smart-ticket 2, and 3) that it is a technology either commonly available in cell phones or easily adapted to a commonly available cell phone, and where the preferred features of the extended-range reader technology are: 1) either active or (preferably) passive reading of digital information at extended ranges that are essentially outside the near proximity and therefore awareness of guest 1, e.g. 3 feet and more, and 2) the ability to secure the read data 2c-1 and 2c-2 using protocols sufficient for, and commensurate with, the particular implementation of the smart-ticket 2. As will also be understood, much of the information being accessed or processed by smart-ticket 2 is personal and sensitive and as such all available percussions should be implemented to ensure privacy. Although some data privacy concerns are directly addressed by the present teachings, the scope of the current patent is meant to encompass any of the various data encryption technologies that are either currently available or will become available.

Figure 2:
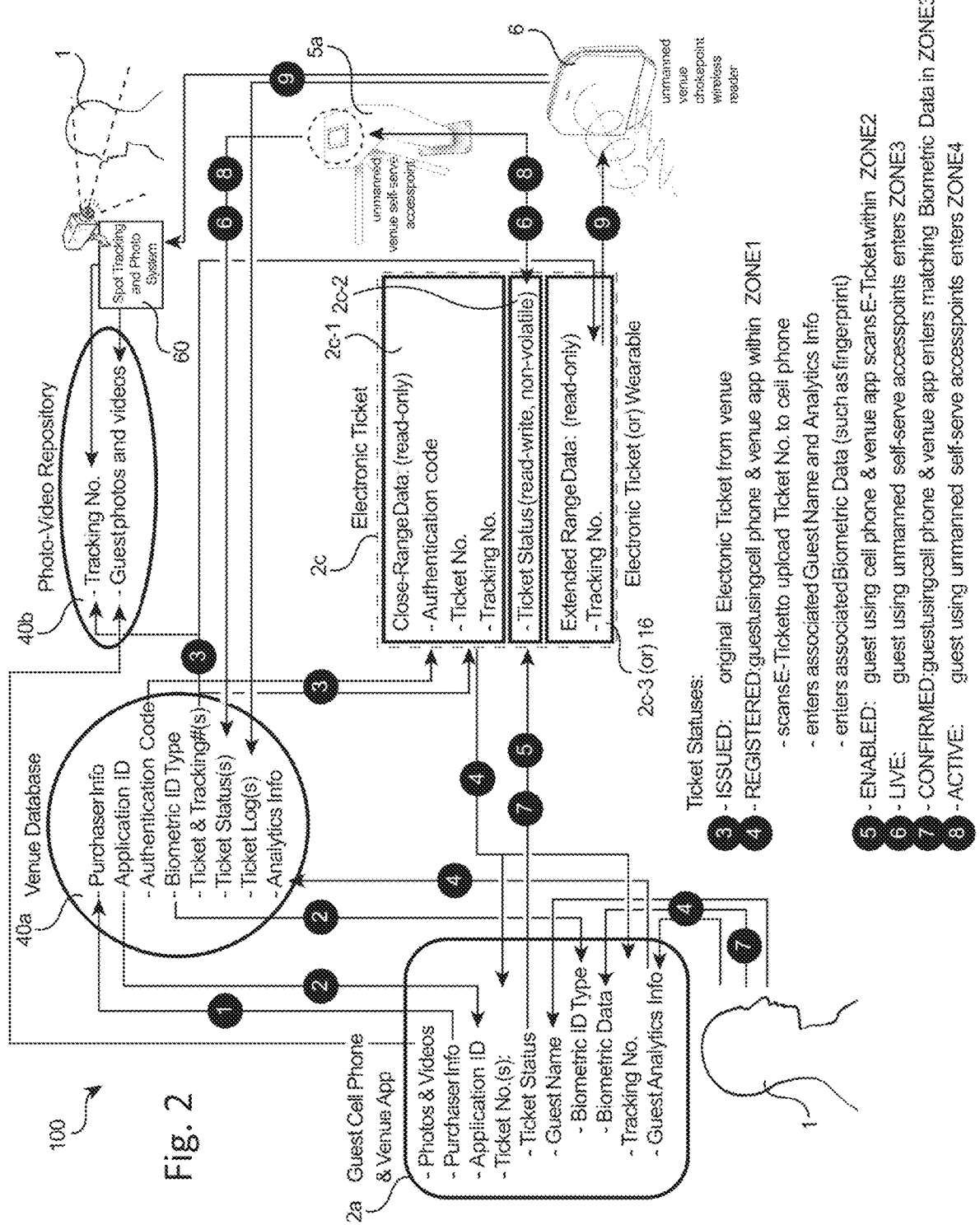
FIG. 2 is an entity-data diagram depicting the main data storage components of preferred system 100 including: venue database 40a, guest cell phone and venue app 2a, electronic ticket 2c and photo-video repository 40b. Also shown are unmanned venue self-serve access point 5a, unmanned venue chokepoint wireless reader 6 and spot tracking and photo system 60. Each of venue database 40a, guest phone and app 2a and electronic ticket 2c hold and exchange critical information to the cycling of the ticket statuses.

Referring next to FIG. 2, there is shown an entity-data diagram depicting the main data storage components of preferred system 100 including: venue database 40a, guest cell phone and venue app 2a, electronic ticket 2c and photo-video repository 40b, where phone and app 2a along with electronic ticket 2c form a preferred minimum smart-ticket 2 as prior discussed in relation to FIG. 1. With respect to venue database 40a, critical preferred data includes: 1) purchaser info such as name, billing information, payment information, etc., where the purchaser is anticipated but not required to also be a guest 1, 2) unique app ID that is assigned to the purchaser for ultimately using on cell phone and venue app 2a, the use including matching the venue app downloaded onto the guest 1's cell phone 2a with one or more purchased ticket numbers, 3) an authentication code for use in verifying that the electronic ticket is not a forgery, 4) biometric ID type, such as "Fingerprint," or "Face," for defining zero or more biometric datum for use especially when confirming guest 1 identity, where biometric data at least includes any one of, or any combination of: fingerprints, facial images, voice prints, retinal scans, etc., 5) unique ticket number(s) or equivalent for identifying one or more purchased ticket(s) for use by one or more guest(s) 1 along with optional unique tracking number(s) or equivalent for tracking the movements of the one or more guest(s) 1, 6) ticket status(es) for representing the status of each of the one or more ticket(s), 7) tracking log(s) for representing the status changes and venue related movements of the one or more guest(s) 1 associated with the ticket(s), where the venue related movements at least include the detection of the guest(s) 1's tracking number either passing through: a) any manned or unmanned access point 5a or 5b, b) any unmanned chokepoint wireless reader 6, c) any venue spots as detected by spot tracking system 60, and d) any location passed through or occupied by a guest 1 as detected by any apparatus, method or equivalents as herein described, and 8) any of optional analytics info especially for associating with the tracking log of each one or more guest(s) 1, where analytics info pertain to the guest 1 associated with a given ticket number, tracking number or combination thereof, and includes for example any information about the guest but preferably quasi-personal information such as age, sex, city, state, etc. that may be useful for determining important metrics and marketplace assessments for the venue/event management without compromising individual identity.

Still referring to FIG. 2, with respect to guest cell phone and venue app 2a, critical preferred data includes: 1) purchaser info such as name, billing information, payment information, etc., minimized to the extent that if the purchaser is not also the guest 1 with cell phone 2a, then purchaser info may alternately include nothing or simply a name and/or a transaction number useful for communicating with the venue, 2) a unique app ID that is used by the venue for uniquely matching the venue app downloaded onto the guest 1's cell phone 2a with one or more purchased ticket number(s), where the guest 1 owning cell phone 2a is anticipated but not required to also be the purchaser, 3) unique ticket number(s) or equivalent for identifying one or more ticket(s) for use by one or more guest(s) 1, 4) ticket status(es) for representing the status of each of the one or more ticket(s), 5) guest name(s) for associating with the one or more ticket(s), 6) biometric ID type, such as "Fingerprint," or "Face" required by the venue for confirming guest 1 identity, 7) biometric data including any data sensed, captured, entered or otherwise input by cell phone 2a for the confirmation of guest(s) 1 in accordance with the venue chosen biometric ID type, 8) guest analytics information including for example any information about the guest but preferably quasi-personal information such as age, sex, city, state, etc. that may be useful for any of: a) determining important metrics and marketplace assessments for the venue/event management without compromising individual identity, or b) at least in part causing a venue apparatus to adjust its output or timing, and 9) (shown at the top of 2a) photos and videos captured by the guest 1 using the venue app 2a that engages the cell phone's camera.

Still referring to FIG. 2, with respect to electronic ticket 2c close-range data, for read-only data 2c-1 the critical preferred data includes: 1) the venue/event authentication code or equivalent, 2) the unique ticket number or equivalent, and 3) the unique tracking number or equivalent, and for read-write data 2c-2, critical preferred data includes: 4) a ticket status for representing the process flow state of the ticket. With respect to electronic ticket 2c extended range data 2c-3, critical preferred data includes: 1) the unique tracking number or equivalent. As prior mentioned, extended range data may optionally be included within wearable 16 as opposed to electronic ticket 2c. And finally, with respect to photo-video repository 40b, this optional data storage component preferably maintains one or more photos or videos in association with at least the tracking number, where the tracking number matches a tracking number as found in venue database 40a associated with a ticket number, and where photos and videos are either automatically captured of guest 1 by spot tracking and photo system 60 or self-captured by guest 1 using cell phone and venue app 2a (data connection not depicted for simplicity and clarity reasons.) Spot tracking and photo system 60 will be discussed in greater detail with respect to upcoming FIGS. 7a, 7b, 8a and 8b, where the purpose of system 60 is to automatically determine the real-time location of a guest 1 within a limited spatial domain, within a venue, and then to also automatically photo/video guest 1 at one or more selected locations within the limited spatial domain, where for example the venue is a theme park and the limited spatial domain is a ride, ride line, public area of the park, etc. As guests 1 traverse the property of a venue, within which multiple limited spatial domains are available for entrance and exit, the present invention anticipates that at least these same entrances and preferably also exists will include unmanned wireless readers 6 for detecting extended range 2c-2 tracking numbers and transmitting associated information, including location, date and time of detection, to database 40a for logging of the associated guest 1 movements. The same associated information is anticipated as useful to the spot tracking and photo systems 60 for triggering functions, all as to be taught especially with respect to upcoming FIGS. 8a and 8b.

It is further anticipated that photo-video repository 40b is made continuously available to guest(s) 1 at least using cell phone and venue app 2a (e.g. database 40b is accessible from device 2a by selecting a guest name which is translated to the associated tracking number and then used to query database 40b, as will be well understood by those familiar with software systems,) and preferably also using other forms of internet access including web pages and social media, where notifications are also sent to guest(s) 1 via device 2a, preferably triggered by detection of their current location within the venue, for example by detection of a guest(s) 1's tracking numbers by extended range readers 6 as the guest(s) 1 are leaving a limited spatial domain, or the detection of the guests tracking number (in close-range data 2c-1) as they leave the venue though access points 5a-4 (see upcoming FIG. 3.) It is further anticipated that venue app 2a will allow guest(s) 1 to: 1) make decisions as to which photos and video to keep within or delete from database 40b, and 2) provide additional guest social media related information allowing accompanying venue or event management processing systems to further automatically disperse some or all of photos and videos under restrictions and limitations managed by the guest(s) 1, where restrictions and limitations at least include which social media outlets such as Facebook, Twitter, email, text-message, Instagram, etc. are to be posted with photos and videos, and/or which related-individuals are to be contacted (e.g. by email or text-message) with attached photos and videos.

Still referring to FIG. 2, it is also anticipated that the venue or event management will update photo-video repository 40b directly, or further associate with the tracking number found in repository 40b other relevant venue/event photos and videos related to the on-going experiences of guest(s) 1, where further associating will be well understood by those familiar with table-joins and other database relational techniques. For instance, when system 100 is used for a convention, examples of relevant photos and videos include guest speakers giving presentations to either the general audience or within exclusive convention areas being monitored by the system 100, where the guest(s) 1 presence has been detected in proximity with and during the relevant presentation. The present inventor further anticipates that system 100 will notify the guest 1 as they are detected leaving a relevant presentation area, either during or after the presentation has completed, where the notification comes to guest's cell phone and venue app 2a and the guest 1 uses venue app 2a to accept/reject the relevant photo or video. When system 100 is used at a theme park, examples of relevant photos and videos include: 1) themed characters speaking greetings or messages to a guest 1 using the name of the guest and/or other related guest information known to system 100, where the themed characters are related to venue locations and events where the guest(s) 1 were determined to have been present via the ticket (tracking) log, 2) venue presentations such as shows, parades, fireworks, etc. were the guest(s) 1 were determined to have been present via the ticket (tracking) log, or 3) promotional materials related to venue experiences such as rides, specific locations or buildings, restaurants, etc. were the guest(s) 1 were determined to have been present via the ticket (tracking) log.

Still referring to FIG. 2, there is an assumed and preferred set of transactions with a resulting flow of datum between venue database 40a, guest cell phone and venue app 2a and electronic ticket 2c. The initial transaction is a purchase of tickets by a purchaser. As is well known, such purchases are typically accomplished using a web-browser interface offered by the venue, or through a venue app downloaded by the purchaser to a mobile device, such as a cell phone. Regardless, what is important is that a purchaser acquire the rights to one or more tickets to a venue, venue event, conference, etc. of any type, and that these tickets have unique identifiers typically issued by the venue, or those managing the venue, venue event, conference, etc. While not mandatory, the present inventor prefers that prior to issuing ticket numbers, the venue or ticket issuer first assigns a unique app ID to the purchase. As is well known in cryptography and information systems, it is possible to use the unique app ID as a symmetric encryption key or similar for encrypting the assigned ticket numbers, digitally binding unique ticket number(s) to the unique app ID. This would be compared to a traditional technique of a ticket issuer simply numbering their tickets sequentially without any encryption or encoding. While the latter traditional technique is acceptable for the present invention in that these sequential ticket number(s) may then be associated with the unique app ID assigned to the purchase, it is again preferred that ticket numbers are encrypted and therefore more difficult to digitally forge.

Once the venue or purchase agent has completed the initial transaction with a purchaser, they will have minimally: (1) received purchaser info for storage in database 40a, (2) generated a unique App ID for storage in database 40a and transmission to cell phone and venue app 2a, (2) assigned zero or more preferred biometric ID types (such as "Fingerprint" or "Face") for storage in database 40a and transmission to cell phone and venue app 2a, and (3) issued one or more paper tickets 2b or electronic tickets 2c for the purchaser, where each paper ticket 2b and electronic ticket 2c includes: a) close-range read-only data such as 2c-1 comprising an authentication code associated with a ticket number and optionally a tracking number, where electronic ticket 2c further includes: b) close-range read-write data 2c-3 comprising a ticket status preferably set to "ISSUED" or some equivalent, and where paper ticket 2b and electronic ticket 2c further includes: c) optional extended range read-only data such as 2c-3 comprising preferably the same tracking number as in data 2c-1, where data 2c-3 may alternatively be provided by the venue in the form of a wearable 16. The preferred embodiment of the present invention anticipates that for each ticket purchased, one physical electronic ticket 2c will be generated and transferred to the purchaser, along with one or more optional wearables 16.

As will be clear from a careful reading of the present invention, there are many novel and useful features described herein, some of which may be excluded or included without detracting from the novelty and usefulness of other features of the present invention. One such example is the tracking number embedded within both extended range data 2c-3 (or wearable 16) and close-range data 2c-1.

As prior mentioned and to be discussed in further detail with respect to the remainder of the present invention, a tracking number especially when readable at extended ranges is extremely useful for tracking the movements of a guest 1 within a venue. For venues including theme parks and amusement parks, there is a substantial need for this tracking information. However, for some types of venues/events, this guest 1 tracking information may be less useful, undesirable to the guest, too expensive to collect (e.g. by installing venue chokepoint wireless readers 6 or equivalent,) or otherwise not acceptable. As such, the implementation of electronic ticket 2c may exclude a tracking number, whether in the form of 2c-3 or 16 (and then duplicated in 2c-1.) As the careful reader will see, even when the tracking number is excluded from ticket 2c, significant benefits remain to the self-serve venue access herein taught especially in relation to FIGS. 2, 3 and 10 that is fully accomplished using only close-range data 2c-1 (without a tracking number included) and close-range data 2c-2. Therefore, the inclusion or exclusion of a tracking number (and likewise extended range data) should be considered as exemplary rather than a limitation of the present invention. It should also be understood that if a purchaser is buying multiple tickets, not only is there no requirement that any given ticket include a tracking number, some tickets can include tracking numbers while others exclude tracking numbers. Furthermore, for those including tracking numbers, there is no requirement that each ticket choose the same physical form, for instance 2c-3 versus 16. Even within wearable 16, the present inventor anticipates multiple sub-forms including anklets (as preferred and shown within,) to wristbands, lanyards, necklaces, clothing pins, hats, etc.

Still referring to FIG. 2, subsequent to the purchase transaction conducted between the venue or its agent and the purchaser, where the transaction results in the flow of information (1), (2) and (3), it is assumed that a guest 1 being either the purchaser or recipient of the purchase either has already or does now download the venue's app onto their cell phone forming guest cell phone and venue app 2a. As is well understood by those skilled in the art of mobile software development, there are many ways for implementing the venue app, all of which are sufficient for the present invention. Some implementations include an embedded application (such a typically downloaded from an app store) or as a web-page (provided by the venue or venue representation) run on a browser found on the cell phone 2a. Furthermore, as will be obvious to those skilled in the art of mobile technology, the mobile device does not need to be a cell phone, but rather could also be a tablet or in the future some other category of mobile device such as a cross-over size that is in between a traditional cell phone and tablet, often referred to as a "phablet."

What is important is that the device running the venue app is portable allowing guest 1 to conduct transactions as herein taught both outside of, approaching and inside of the venue (or equivalent.) It is also important that this mobile device be capable of presenting a user interface to the guest 1 and also accepting any biometric data types (such as a fingerprint or facial image) required by the venue. The mobile device should also be capable of close-range data exchange, such as through near field communications and preferably includes GPS (global positioning system) tracking and/or some means for operating within an alternative LPS (local positioning system) tracking such as a WPS (wi-fi positioning system.) Such devices are also referred to as smart phones, where the present invention's use of the word cell phone is also considered interchangeable with smart phone.

While the present invention refers to a "venue app," it should be well understood that the app itself may be provided from any source and as such what is most important is that the app conducts the functions herein described, not that the app actually is made by, delivered by, maintained by, etc. the venue itself. And finally, with respect to the downloaded app and associated unique app ID, the present inventor prefers that the download of the app be performed after the purchase is complete and the associated unique app ID is generated by the venue (or alternatively the provider of the venue app.) As will be understood by those familiar with transaction security, ideally the app ID is embedded within the download and in that sense completely transparent to the guest 1 or "downloader." Keeping the unique ID as secret as possible, and then also preferably using the app ID as a key for generating unique (encrypted) ticket number(s), all increases the difficulty for anyone attempting to steal, copy or otherwise gain unauthorized access to at least the ticket number(s). However, it is also possible that the purchaser and/or guest 1 has already downloaded the venue app onto their mobile device 2a, and that the unique app ID is then transferred separately in any number of ways, for example: 1) by sending a code via email or text message, 2) by displaying a code on a purchase site for direct entry into the venue app, or 3) by electronically transmitting the code without display directly from the system managing the venue database (or equivalent) to the venue app, such that the guest 1 is unaware of the unique app ID. Once this venue app is download and installed on the guest 1 mobile device such as cell phone 2a, the unique app ID and biometric ID type(s) are assumed to also have been transmitted and made available to phone and venue app 2a.

Still referring to FIG. 2, subsequent to the download of the venue app onto the guest 1's mobile device, it is anticipated that guest 1 will receive one electronic ticket 2c (optionally and preferably including printed ticket information 2b) for each purchased ticket, where receiving includes picking up from the venue or its agent, or being delivered the ticket(s) using some delivery method such as USPO mailing, UPS, etc. It is also assumed that if extended range data was a part of the transacted ticket purchase, this is also received by the guest 1, again in any form including 2c-3 or 16. Once electronic ticket(s) are received, guest 1 is responsible for registering each ticket using cell phone and venue app 2a. For each purchased and received ticket, the process of registration minimally includes: 1) presenting electronic ticket 2c within close-range of venue app running on cell phone 2a, such that the venue app uses a close-range reader technology such as near field communication (NFC) to read at least the unique ticket number (or equivalent ID) off close-range data 2c-1, preferably also the ticket status off of the electronic ticket close-range data 2c-2, and optionally also the tracking number off close-range data 2c-1, where the ticket number, status and optionally tracking number are then stored within the cell phone and venue app 2a (process flow step (4),) and where the ticket status is confirmed to be some expected initial value as set by the venue, e.g. "ISSUED" or some equivalent encoding, 2) allowing the guest to associate with the ticket a guest name or description for the ticket, e.g. James, Kristine, David or Bo, 3) using device 2a to capture the required biometric data type, e.g.'s "James fingerprint . . . " or "James picture . . . " etc., and 4) optionally requesting or requiring that guest 1 provide guest analytics information including for example any information about the guest but preferably quasi-personal information such as age, sex, city, state, etc. that may be useful for determining important metrics and marketplace assessments for the venue/event management without compromising individual identity.

As will be discussed in more detail especially in relation to upcoming FIGS. 5a, 5b, 6a, 6b, 7a, 7b, 8a, 8b and 8c, the present invention will further teach means and methods for determining and tracking guest(s) 1 locations down to a granular level, e.g. a particular seat at a given time, where the seat could be on a ride in a theme park, at a sporting or music event, in a restaurant, etc., and where photos or video are automatically captured of the guest(s) 1, for example using spot tracking and photo system 60, and associated with their tracking number (but otherwise optionally not associated with any personal information that the venue database 40a preferably does not anyway include.) Captured photos and videos are stored in venue database 40b in association with venue database 40a, where the association at least includes the tracking number, as those familiar with database systems will understand.

In a simple use-case the purchaser is guest 1, and has purchased a single ticket, and it is possible that the guest name be already assigned to match the purchaser name and even that the ticket number has been electronically downloaded onto cell phone and venue app 2a. The only timing requirement for the entry of guest name, biometric data or optional analytics is that this information is preferably completed within ZONE1 prior to entering ZONE2, all to be discussed in greater detail with respect to upcoming FIG. 3. What is preferred however is that first a ticket is electronically scanned at close-range by cell phone 2a (step (4) in the process flow depicted,) thus confirming the minimal proper functioning of the electronic ticket 2c. Once scanned, a guest name and possibly analytics information are associated with the ticket number and therefore also the tracking number preferably at some spatial and temporal point prior to entering ZONE2 (to be discussed,) it is preferred but not mandatory that the named guest input their biometric data (e.g. their fingerprint) for association with the ticket number. In a more complex use-case, the purchaser is not a guest 1, and the guest 1 then is transferred the information and procedures necessary for downloading the venue app and then follows along with the remaining steps as being herein described. Another more complex variation is that multiple tickets are being processed by guest 1, e.g. in a family where the mother or father tracks and maintains all tickets for the family including children. In this multi-ticket use-case, it is preferred that the guest 1 scans each electronic ticket 2c and associates a guest (e.g. family member name) with each scanned ticket 2c, where then at some point each of these same guests use cell phone and venue app 2a to enter their required biometric data, e.g. fingerprint(s) or facial image(s) and possibly analytics information as prior discussed.

Still referring to FIG. 2, in any case, once the ticket number is scanned from ticket 2c into cell phone 2a, and a guest name, biometric data and analytics information are further associated with the ticket number and the tracking number, the status of the ticket as maintained internally on the cell phone and app 2a is updated, for example from "ISSUED" to "REGISTERED." It is then preferred that guest 1 rescan the electronic ticket 2c using cell phone and app 2a, which in this case the venue app recognizes the recent update in registration information and wirelessly updates the ticket status maintained on close-range ticket data 2c-2 from "ISSUED" to "REGISTERED," thus matching the "REGISTERED" status maintained on the cell phone 2a, (depicted as process flow step (5).)

Referring next to FIG. 3, there is shown a pictorial-block diagram showing a progression of spatial zones 71, 72, 73, and 74 within which guest 1 (not depicted) operates their smart-ticket 2 comprising cell phone and venue app 2a and at least electronic ticket 2c. Within the teachings as described with respect to FIG. 3, optional paper ticket 2b is unnecessary, however it is still preferred that electronic ticket 2c and paper ticket 2b are combined as this at least provides guest 1 with guest readable information and additionally provides support for the alternative access to venue via manned venue-serve access points 5b. (However, as will be understood by a careful reading of the present invention, even if smart ticket 2 only comprised 2a and 2c, and therefore had no guest readable information 2b, the electronic ticket 2c alone, even without the guest's cell phone and venue app 2a, could be used by a manned access point 5b that was capable of reading and updating electronic ticket 2c in the manner described herein especially with relation to the present FIG. 3.) The spatial zones 71, 72, 73 and 74 describe physical locations with geographic boundaries within which guest 1 operates and otherwise uses their smart-ticket 2 with unmanned venue self-service access points 5a-1 and 5a-3 in order to gain self-serve access to the venue/event. Guest 1 also uses smart-ticket 2 with self-service access points 5a-2 and 5a-4 to exit the venue, or the venue's pre-area.

Referring now to both FIG. 2 and FIG. 3, guest 1 preferably completes registration as prior discussed in relation to FIG. 2 within ZONE1 71, where ZONE1 71 is geographically anywhere other than ZONE4 74, the venue, ZONE3 73, a confined venue pre-area located just outside the venue, and ZONE2 72, an unconfined area located just outside the venue pre-area. The present inventor notes that while it is preferable that guest 1 completes registration in ZONE1 71, it is technically not necessary. However, since ZONE1 71 is essentially everywhere other than the venue or close to it, having the preferred system enforce this requirement helps to prevent a buildup of guests 1 in either ZONE2 72 or even possibly in ZONE3 73, wherein both spatial zones 72 and 73 it would also be technically possible to complete the registration of a guest's 1 electronic ticket 2c. As the careful reader will note, registration could be completed after the enable (5) and live (6) steps, but at least must be completed before the confirm (7) step, and therefore this described sequence of electronic ticket 2c status changes brought about by smart-ticket 2 operation steps as described especially with respect to FIGS. 2 and 3 are exemplary and should not be viewed as limitations of the present invention.

Preferably guest 1 enables electronic ticket(s) 2c in ZONE2 72, located presumably on venue property but just outside a confined venue pre-area, or ZONE3 73. To enable (step (5)) electronic ticket(s) 2c, guest 1 simply brings each one or more tickets 2c within close-range of cell phone and venue app 2a, where preferably venue app 2a prompts guest 1 accordingly. As each one or more electronic tickets 2c come into close-range communications, such as NFC, with cell phone and app 2a, then cell phone and app 2a: 1) reads the unique ticket number off close-range data 2c-1 and confirms that electronic ticket 2c belongs to guest 1, 2) confirms that ticket status as stored in close-range data 2c-2 is set to "REGISTERED" or some equivalent, and 3) resets the ticket status stored in close-range data 2c-2 to "ENABLED." The careful reader will see that this "enablement" step ensures that: 1) guest 1 has their cell phone and venue app 2a in their possession within close proximity to the venue, 2) guest 1 has all of their one or more electronic tickets 2c for which they intend to use to gain access to the venue (ZONE4 74) in their possession, and 3) that for each one or more electronic ticket 2c to be presently used by guest 1 (or other guests associated with guest 1,) at least the biometric data and preferably also the guest name are already entered into cell phone and app 2a.

Still referring to FIGS. 2 and 3 together, the present inventor notes three important understandings with respect to registration and enablement. First, by using a separate app ID as found on cell phone and app 2a that uniquely corresponds to a ticket number (as stored in close-range data 2c-1,) it is ensured that guest 1 only uses electronic ticket(s) 2c that were purchased by the purchaser related to, or being, guest 1 (refer to the prior teachings especially with respect to FIG. 2.) Likewise, it is ensured that if a first guest 1 loses or has any of their electronic tickets 2c stolen, where even the status of the lost or stolen tickets 2c is still set to "ISSUED," this "ISSUED" ticket cannot be used by any second guest 1 with a second cell phone and venue app 2a, since the second unique app ID on the second device 2a will not match the first unique app ID on the first device 2a and accordingly not associate with the electronic ticket(s) 2c lost or stolen by the first guest 1. Second, the guest 1 will be prepared to enter the venue premises starting with the venue pre-area ZONE3 73 assured to have both their cell phone and venue app 2a along with authenticated ticket(s) 2c. Third, the guest 1 controlling cell phone and venue app 2a will have already ensured that each ticket(s) 2c associated with their device 2a have been assigned to guest(s) 1, and that each of guest(s) 1 have entered initial biometric data (e.g. their fingerprint) essentially locking that authenticated ticket to themselves, thus at least saving time once entering ZONE3 73 and thereby reducing crowding within the confined venue pre-area.

While it is possible to implement ZONE3 73 as a physical area visually demarked for the guest, the present inventor prefers and teaches that cell phone and venue app 2a uses GPS to indicate via the app when the guest 1 is within ZONE2 72, and therefore to also not allow enablement unless within ZONE2 72. As the careful reader will see, by simply relying upon visual demarcation of ZONE2 72, guests 1 may ignore the requirement of conducting step (5) within ZONE2 72, for example conducting step (5) at home in ZONE1 71 and then perhaps forgetting to bring their cell phone 2a to the venue. As will be understood by those familiar with object tracking technologies, there are technologies other than GPS that are useable for cell phone with venue app 2a to determine when the guest 1 and device 2a is within ZONE2 72, for example at least including a local positioning system (LPS) such as (WPS) wi-fi positioning system or event Bluetooth. What is most important is that preferably cell phone and venue app 2a self-determine when the guest 1 and device 2a are within at least ZONE2 72 and ZONE3 73, and to restrict the user from enabling and confirming respectively their electronic ticket(s) 2c unless within these limited areas.

Still referring to FIGS. 2 and 3, as prior discussed and as will be understood by those familiar with symmetric encryption systems, the randomly assigned unique app ID may be used as both an encryptor and decryptor of all the one or more ticket number(s) purchased by a purchaser, regardless if multiple tickets were purchased on the same transaction or in separate transactions, as long as the purchaser is assigned only one unique app ID. After assigning the unique app ID, the venue uses this ID to encrypt at least each one of the venue's ticket numbers being assigned to the purchaser, thus creating for each electronic ticket 2c a unique string of binary bits representing the ticket number, where this unique string of binary bits is then transferred onto electronic ticket 2c close-range data 2c-1 and possibly extended range data 2c-3 (although a separate, distinct and likewise encrypted tracking number is preferred for data 2c-3.) The venue also and preferably with minimum exposure provides the app ID to the purchaser and therefore guest 1 for use inside of cell phone and venue app 2a. To confirm that any given electronic ticket 2c belongs to a given guest 1, a given cell phone and venue app 2a being operated by the given guest 1 then reads the unique string of binary bits representing the ticket number off close-range data 2c-1 on electronic ticket 2c and attempts to decrypt the string using the given app's 2a app ID. Upon attempted decryption, at least the format or some portion of the ticket number can be assessed by the given app 2a such that if the format or some portion of the decrypted ticket number does not conform to the pre-known format or portion, the electronic ticket 2c is determined to not belong to the given guest 1 and therefore its status cannot be changed, for example cannot be set to "REGISTERED," "LIVE," "ENABLED," "CONFIRMED," or "ACTIVE."

While a symmetric encryption system is preferred, including the assignment of a unique app ID by the venue to the purchaser, and the subsequent use of the app ID to encrypt and then decrypt at least the ticket number encoded onto electronic ticket 2c, other encryption techniques are possible as will be well known by those skilled in the art of cryptography. Furthermore, the preferred use of an app ID for encryption and decryption of at least the ticket numbers is not necessary for receiving significant other benefits from the present teachings and is therefore to be considered as an exemplification and not a limitation of the present invention. It is possible that for some venues tickets are free and therefore theft is of minimal or no concern, such that encryption is superfluous, but otherwise access to the event is limited or controlled such that the use of a system 100 for guest 1 self-serve access to an event using unmanned access points 5a is still beneficial. Furthermore, electronic ticket 2c especially with extended range tracking number data 2c-3 is useful for the tracking of guest 1 movements with the venue, regardless of the cost to enter the venue, e.g. at a convention. Again, for these reason as will be well understood by a careful reading of the present teachings and knowledge of a given venue and/or venue event type, the preferred use of app ID's and ticket number encryption, as well as therefore the process of ensuring that a given electronic ticket 2c belongs to a guest 1 during the enable step (5), may not be necessary while other remaining novel features of the present invention do still provide useful value.

Still referring to FIGS. 2 and 3, after guest 1 has enabled each of their one or more electronic tickets 2c while in ZONE2 72, they may proceed through any of one or more unmanned self-serve access points 5a-1 providing exclusive entrance into ZONE3 a confined venue pre-area 73; one guest 1 for each electronic ticket 2c, where exclusive entrance implies at least that: 1) a guest 1 has no other reasonable option for entering pre-area 73 except through an access point 5a-1 (hence the pre-area is "confined",) and 2) a guest 1 must present an electronic ticket 2c to pass through the access point 5a-1. In the use-case of a guest 1 such as a mother or a father who is managing all a family's tickets with their cell phone and venue app 2a, the present invention anticipates that after enabling each ticket(s) 2c, the ticket(s) 2c are distributed to the associated and named guest 1 who then scans their ticket 2c on an appropriate area of the self-serve access point 5a-1. As each one or more electronic tickets 2c come into close-range communications, such as NFC, with access point 5a-1, then access point 5a-1: 1) confirms that electronic ticket 2c is both: a) authentic, and b) valid, 2) confirms that ticket status as stored in close-range data 2c-2 is set to "ENABLED" or some equivalent, and 3) resets the ticket status stored in close-range data 2c-2 to "LIVE" (process flow step (6).) With respect to ticket counterfeit protection, the present inventor restates that there are at least two means anticipated herein. First, the authentication code embedded within close range data 2c-1 is readable by a close-range communication technology such as NFC, preferably adapted within at least all unmanned access points 5a. Either the access point 5a itself, or in connection to a network for example including a connection to a third-party cloud based anti-counterfeiting service such a provided by Hewlett Packard, can use the embedded authentication code to verify the ticket 2c. Second, if as preferred, paper ticket 2b is combined with electronic ticket 2c, and also as preferred paper ticket 2b includes an additional and distinct printed variation of the authentication code such as by using a QR code, than access points 5a could be further adapted to include QR code scanners for automatically inputting the printed authentication code for verification against the embedded authentication code, all as will be well understood by those familiar with anti-counterfeiting systems.

Still referring to FIGS. 2 and 3, once guest(s) 1 have entered the confined venue pre-area 73, it is preferred but not necessary that a ZONE3 is spatially limited to a section of pre-area 73 closest to the access point(s) 5a-3 into venue 74. As will be understood by those familiar with crowd management and venue access control, by limiting ZONE3 to a portion of pre-area 73, e.g. 50 feet beyond the access point(s) 5a-1 leading into pre-area 73 at least two non-technical goals are accomplished: 1) already entered guests 1 will tend to continue moving forward and therefore not impeding other guests 1 still entering through point(s) 5a-1 behind them, until the entered guests 1 at least reach ZONE3 where they may then confirm their tickets (to be discussed shortly,) and 2) guests 1 will be not be tempted to consider passing either their cell phones and venue apps 2a or their electronic tickets 2c back across access point(s) 5a-1 to perhaps their friends behind them, where the guest 1 might be thinking that this would allow their friends to also enter the venue 74. With respect to the first accomplished non-technical goal, the present invention anticipates that most cell phones being used as device 2a include GPS and that the GPS signal will be sufficiently strong such that the venue app on device 2a can self-detect using GPS coordinates pre-associated to ZONE3 within 73 (exactly like the approach preferred for ZONE2 72.) As an alternative, the venue app on device 2a could coordinate its location using a LPS such as WPS (wi-fi positioning system) or even by becoming in range of a pre-known Bluetooth signal. In any case, the venue app on device 2a will not allow guest 1 to initiate or complete the confirmation of ticket 2s until it has detected the presence of device 2a (and therefore also guest 1) to be within ZONE3 of pre-area 73.

With respect to the second accomplished non-technical goal, the present inventor notes that even if some misguided guest 1 should successfully pass their cell phone and venue app 2a, by itself, back from ZONE3 within pre-area 73, over one of access point(s) 5a-1 and into ZONE2, this will only result in: 1) this misguided guest 1 will then not be able to confirm their own electronic ticket 2c without their cell phone and venue app 2a, and 2) any other accomplice guests 1 receiving the cell phone and venue app 2a from the misguided guest 1 will only be able to enable an authentic electronic ticket 2c that is registered with device 2a and therefore also fully paid for and known to the venue system. Should the misguided guest keep their cell phone and venue app 2a with them in ZONE3 within pre-area 73 but successfully pass their electronic ticket 2c back to an accomplice guest 1, this will only result in: 1) misguided guest 1 without electronic ticket 2c will neither be able to enter ZONE4 74 the venue through access point(s) 5a-3 nor exit ZONE3 within pre-area 73 using access point(s) 5a-2, and 2) the accomplice guest 1 will be unable to enter into ZONE3 from ZONE2 where they received the misguided guest 1's electronic ticket 2c, because the status on the misguided guest 1's ticket is already set to "LIVE" and is no longer set to the "ENABLED" status requisite for entering the pre-area 73 through access point(s) 5a-1. And finally, should the misguided guest 1 standing in pre-area 73 manage to successfully pass both their cell phone and venue app 2a along with electronic ticket 2c back to an accomplice guest 1 standing in ZONE2 72, as will be obvious from the above description, all that will be accomplished is that the misguided guest 1 will be stranded within the confined area 73 and the accomplice guest 1 will be unable to use the electronic ticket 2c to enter pre-area 73 through access point(s) 5a-1.

Still referring to FIGS. 2 and 3, once a guest 1 has both entered pre-area 73 and proceeded into preferably spatially restricted ZONE3 closer to ZONE4 74, then guest 1 will find that venue app on device 2a will now either automatically prompt after automatically detecting the presence of guest 1 and device 2a within ZONE3, or otherwise now accept confirmation by guest(s) 1 of any one or more electronic tickets 2c that were also successfully brought into ZONE3. The present inventor also notes that by describing preferred information such as that disclosed in relation to the teaching of FIG. 2, hence including the information maintained in venue database 40a, cell phone and venue app 2a, electronic ticket 2c and paper ticket 2b, the careful reader should not construe any lack of information as a limitation of the present invention. For example, it is a well-known practice that transactions are benefited by recording a date and time which access point 5a-1 could capture at the time of scanning an electronic ticket 2c and then update any one of, or any combination of: 1) venue database 40a, 2) cell phone and venue app 2a, or 3) electronic ticket 2c. Those skilled in the art of venue access management will understand that other information (as just exemplified) may be desirable for maintaining, and that any such information is anticipated and therefore also considered to fall within the scope of the present invention.

Still referring to FIGS. 2 and 3, the process of confirming an electronic ticket 2c using cell phone and venue app 2a is preferred to include: 1) detecting valid presence of device 2a within ZONE3 for example by determining GPS coordinates for comparison to the pre-known location of ZONE3 within pre-area 73, 2) brining an electronic ticket 2c in close range of device 2a such that device 2a using a communication method such as NFC is able to: a) read close range data 2c-1 comprising at least a unique ticket number and also preferably an authentication code, where both the ticket number using the app ID is confirmed and the preferable authentication code is verified using some method such as printed QR code included on combined printed ticket 2b and/or an anti-counterfeit process running locally or remotely through a third-party system, and b) read close range data 2c-2 and confirm that the ticket status is set to "LIVE," 3) prompting or otherwise allowing the guest associated with ticket 2c to enter their required biometric data, such as a finger print, and confirming that this newly entered biometric data matches the pre-known biometric data for the guest 1 as input during the registration step (preferably conducted prior to entering ZONE3,) and 4) bringing the electronic ticket 2c back into close range of device 2a such that device 2a using a communication method such as NFC is able to: 1) reconfirm that the now detected ticket 2c has the proper ticket number and status (as just described) and 2) reset the ticket status to "CONFIRMED" (step (7) in the process flow.)

Still referring to FIGS. 2 and 3, after guest 1 has confirmed each of their one or more electronic tickets 2c while in ZONE3 73, they may proceed through any of one or more unmanned self-serve access points 5a-3 providing exclusive entrance into a confined venue 74; one guest 1 for each electronic ticket 2c, where exclusive entrance implies at least that: 1) a guest 1 has no other reasonable option for entering venue 74 except through an access point 5a-3 (hence the venue is "confined",) and 2) a guest 1 must present an electronic ticket 2c to pass through the access point 5a-3. In the use-case of a guest 1 such as a mother or a father who is managing all a family's tickets with their cell phone and venue app 2a, the present invention anticipates that after confirming each ticket(s) 2c, the ticket(s) 2c are distributed to the associated and named guest 1 who then scans their ticket 2c on an appropriate area of the self-serve access point 5a-3. As each one or more electronic tickets 2c come into close-range communications, such as NFC, with access point 5a-3, access point 5a-3: 1) confirms that electronic ticket 2c is both: a) authentic, and b) valid, 2) confirms that ticket status as stored in close-range data 2c-2 is set to "CONFIRMED" or some equivalent, and 3) resets the ticket status stored in close-range data 2c-2 to "ACTIVE" (step (8) in the process flow.) Where authentication (a) and validation (b) are preferably equivalent (and therefore also redundant) to the operations performed with respect to access point(s) 5a-1.

Still referring to FIGS. 2 and 3, access point(s) 5a-2 and 5a-4 are available to guest(s) 1 for self-serve exiting of either the venue pre-area 73 or the venue 74, respectively. At any time guest(s) 1 may proceed through any of one or more unmanned self-serve access points 5a-2 or 5a-4 providing exclusive exit from venue pre-area 73 and venue 74, respectively; one guest 1 for each electronic ticket 2c, where exclusive exit implies at least that: 1) a guest 1 has no other reasonable option for exiting pre-area 73 or venue 74 except through an access point 5a-2 or 5a-4 respectively, and 2) a guest 1 must present an electronic ticket 2c to pass through any of access points 5a-2 or 5a-4. As each one or more electronic tickets 2c come into close-range communications, such as NFC, with access points 5a-2 or 5a-4, access points 5a-2 and 5a-4: 1) confirm that the ticket status as stored in close-range data 2c-2 is set to "CONFIRMED" or some equivalent (if access point is 5a-2) or "ACTIVE" or some equivalent (if access point is 5a-4), and 3) resets the ticket status stored in close-range data 2c-2 to "REGISTERED." The present inventor also anticipates that at this exit time it is possible for the system 100 to determine if a given electronic ticket 2c is "fully consumed" with respect to the dates and times of use purchased for the venue/event, and as such could then reset the ticket status to "INACTIVE" or some equivalent as opposed to "REGISTERED." However, the present inventor prefers "REGISTERED" since that allows the guest(s) 1 to return immediately into the venue/event (e.g. if they forgot some article,) even if there is only e.g. 5 minutes left in their purchased time, without having to go through a manned access point(s) 5b.

Still referring to FIG. 2 and FIG. 3, as a careful reader will see, the data depicted within venue database 40a, cell phone and app 2a, and electronic ticket 2c is sufficient for the processing and functions thus far described, while other data may be useful to capture and maintain within 40a, 2a or 2c without departing from the scope of the present invention, as will be well understood by those familiar with information systems. For example, the present inventor anticipates that a venue might require all guests within ZONE3 to capture one or more facial images and one or more body images, where the body images will provide important additional features (such as clothing colors and surface textures,) and where the one or more facial images and one or more body images are uploaded from the cell phone and venue app 2a to venue database 40a as biometric data to be stored in addition to the biometric ID type. This additional biometric data is useful for identifying individual guests 1 while within the venue by use of one or more venue cameras, for example when the guest 1 enters, occupies or leaves an area including a venue vehicle, or a venue vehicle seat, thereby for example allowing a venue to restrict access and/or track access, including tracking the ongoing location of an individual guest 1 by first determining which seat on a vehicle they are occupying and then tracking the vehicle, all as to be discussed in greater detail especially in relation to upcoming FIGS. 8a and 8b. As will also be understood by those familiar with issues related to sensitive personal information (SPI), some guest(s) 1 may object to providing their facial or body images to the venue. The present inventor also anticipates that meta-data at least including distinct image features as will be well understood by those familiar with facial recognition and/or pattern matching, is extracted by venue app 2a from the facial and body images and alternately uploaded to venue database 40a rather than the original facial and body images that remain within device 2a or are deleted by venue app 2a, where the meta-data is more private than the original images and is not recognizable by human observation.

Still referring to FIG. 2 and FIG. 3, as just stated, the present invention anticipates that for venues that host groups with younger children optionally allowing, if not requiring, all guests within ZONE3 to capture one or more facial images and one or more body images of all guest(s) 1 in the registered group of guest(s) 1 along with an indication of which one or more guest(s) 1 in the group are guardians versus non-guardians, and for all guardians requiring contact information including cell phone numbers, where groups are for example families that are sharing a single cell phone and venue app 2a as the ticket controlling device, or school groups that might be sharing purchaser info but using multiple cell phone and venue app 2a devices, where each of the multiple devices 2a additionally accepts at least a group code or similar that is stored in the venue database 40a and otherwise serves to join all of the guardian and non-guardian guest(s) of a group together in the venue database 40a.

As those familiar with theme and amusement parks will understand, it is possible for a younger child to become separated from parent(s) or guardian(s). As the careful reader will see, the present teachings provide for the following security and safety measures, including any one of, or any combination of: 1) allowing any guest(s) 1 with cell phone and venue app 2a to use the venue app in 2a to report any other guest(s) 1 missing, where the reporting action notifies the venue, e.g. via a global eco-system 40 or similar as described in the parent patent, and where: a) venue personal are notified for example on their mobile devices providing pictures, last known whereabouts, as well as the picture and contact information of the reporting guest 1, and b) the information of missing guests ticket numbers are providing to all venue exit manned and unmanned access points such as 5*a*-2, 5*a*-4 and 5*b*, where all exit access points will not allow these missing ticket numbers to be scanned successfully for exit and will alert the venue if an attempt to exit is made, 2) notifying a guest(s) 1 selected within the venue app 2*a* as a guardian whenever a non-guardian guest(s) 1, registered through the same app or otherwise associated within venue database 2*a* for example using a group code, enters or exits a confined structure some time before all of any guardian guest(s) 1, where a confined structure includes any of the venue, sub-venue, sub-sub venue, etc. as defined herein, where for a theme park confined structures would include the entire park, gated sections within the park such as sub-parks, rides, restaurants, shops, movie theaters, rest rooms, etc., or 3) if another guest 1 or venue agent finds a guest 1 who appears to be lost, they can capture an image(s) of the apparently lost guest 1 using their cell phone and venue app 2*a*, where the image(s) of the apparently lost guest are transferred to the venue database 40*a* and processed using facial and/or other pattern recognition to locate all possible best matches from amongst all known guest(s) 1 in venue database 40*a*, where the venue system then uses the contact information associated with the guardians of the best matching guest(s) 1 to notify and provide the guardians with the location of the missing guest(s) 1, current images of the missing guest(s) 1, as well as venue personnel contact information.

And lastly with respect to FIG. 3, as will be well understood by those familiar with venue access management, it is not necessary nor even preferred that access to the venue ZONE4 74 is only allowed through the combination of self-serve access points 5*a*-1 and 5*a*-3. The present inventor prefers that one or more manned venue-serve access points 5*b* (not depicted) are made available through which a guest 1 may enter ZONE4 74 directly by proceeding through point 5*b*, where access points 5*b* preferably connect ZONE2 72 with ZONE4 74 not passing through ZONE3 73. The present invention is also "nestable," meaning that within a given venue, there may conceptually be sub-venues, and when those sub-sub-venues, etc., where for each venue, sub-venue and sub-sub-venue, etc. the present system 100, or any of its alternatives and variants previously described or to be described especially in relation to upcoming FIG. 4 and FIG. 10, operates to provide self-serve access in the same manner as described in relation to FIGS. 1, 2 and 3 with the exception that the functions of ZONE1 and ZONE2 are immaterial. Using a theme park as an example, within the theme park (i.e. venue) there may be one or more rides that include a special entrance that is commonly referred and will be well-known to those skilled in the art of theme parks as a "fast lane" (i.e. sub-venue.)

Like the theme park, access to the fast-lane is typically purchased, represented in the ticket, and monitored by manned access points (such as 5*b*.) As will be appreciated by a careful reading of the present invention, in this theme park/fast lane nested situation, after a guest 1 has entered the park their electronic ticket is now "ACTIVE" (all as prior described.) Within the park, the guest many then come upon a ride with two entrances: 1) a normal lane entrance where no additional payment was required and no monitoring is necessarily provided, and 2) a fast-lane entrance where additional payment was required and monitoring is necessary. Any guest 1, whether they purchased fast-lane access or not, can enter the normal lane entrance (1) without need for any monitoring, although the present invention anticipates detecting the entrance of a guest 1 by scanning extended range data 2*c*-3 with chokepoint wireless reader 6. If the fast lane is set up with a first unmanned access point 5*a*-1, then any guest 1 may attempt self-entry. A guest 1 that has not purchased an electronic ticket 2*c* that is valid for access to this "sub-venue" will be denied. A guest 1 with a ticket 2*c* that includes access to this fast lane will be allowed to enter, at which point access point 5*a*-1 also resets the ticket 2*c*'s status 2*c*-2 from "ACTIVE" to "LIVE."

Upon entering what is now effectively ZONE3 for the fast lane, the guest 1 will be required to confirm that the ticket 2*c* they used to enter through access point 5*a*-1 was in fact their ticket, where the confirmation is for example rescanning their fingerprint using the cell phone and venue app 2*a*. If the guest 1 entering the fast lane is using someone's else's ticket 2*c* in an attempt to gain unauthorized access to the fast lane, either: 1) their cell phone and venue app 2*a* will not recognize the ticket 2*c* as belonging to their device 2*a* (because for example it was given to them by another purchaser and the ticket 2*c*, although authentic, does not match the list of tickets 2*c* internally stored on device 2*a*,) 2) their cell phone and venue app 2*a* will recognize the ticket but not confirm the ticket because its status is "ACTIVE" and not "LIVE," (because for example the guest entered with their own ticket 2*c* but then was handed another ticket 2*c* that was purchased by the same purchaser and registered by the same device 2*a*, but was not used to enter the fast lane and therefore was never updated to a status of "LIVE",) or 3) their cell phone and venue app 2*a* will recognize the ticket but not confirm the ticket because their fingerprint does not match the fingerprint associated with the ticket 2*c* as registered on device 2*a* (because for example the guest entered with their own ticket 2*c* but then was handed another ticket 2*c* that was purchased by the same purchaser and registered by the same device 2*a*, and was used by some other guest 1 to enter the fast lane and was therefore set to "LIVE," but fails because of the mismatch in fingerprints.)

The present inventor notes that it would be possible for a single purchaser to but 2 tickets 2*c*, one with fast lane privileges and the other without, with the idea of trying to swap tickets now and then between guests 1. However, as the careful reader will see, 1) the ticket without fast lane privileges will never gain fast lane access through point 5*a*-1 (or 5*a*-3,) and 2) the ticket with fast lane privileges can only be confirmed by one guest 1. Once a valid ticket 2*c* is scanned at fast lane access point 5*a*-1, and the guest 1's finger print is confirmed to match the ticket 2*c* while within fast lane ZONE3, the device 2*a* will update the ticket 2*c*'s status 2*c*-2 from "LIVE" to "CONFIRMED" and the guest 1 may then use the ticket 2*c* to pass through the second access point 5*a*-3 to enter the ride, where access point 5*a*-3 then changes the status 5*c*-2 on the ticket 2*c* from "CONFIRMED" to back to the original "ACTIVE." As with accessing the non-fast lane, the present invention anticipates detecting the entrance of a guest 1 into the fast lane by scanning extended range data 2*c*-3 with chokepoint wireless reader 6. Furthermore, the present inventor prefers additionally detecting guest(s) 1 by scanning their extended range data 2*c*-3 using scanner 6, (regardless of the non-fast lane or fast lane path they took to arrive at the ride,) as they enter the ride and even combining with other technology to be further explained with respect to upcoming FIGS. 8*a*, 8*b* and 8*c* as they take an individual seat on a ride, and then also as they exit the ride area and enter into a shop, and then also as they exit the shop—the value of which will be well understood to those skilled in the art of theme park management.

Referring now to FIG. 4, there is shown a row/column matrix, where columns represent the preferred and alternate smart ticket 2 implementations, and the rows represent the progression of zones and chokepoints (inclusive of access points 5a-1 and 5a-3) taught in FIG. 3. As prior stated in relation to FIG. 1, a preferred smart ticket 2 as herein taught is either cell phone and venue app 2a alone, or cell phone and venue app 2a combined with either or both paper ticket 2b and electronic ticket 2c. In this regard, FIG. 4 discusses the following implementations of smart ticket 2: (B) "Virtual Ticket," which is cell phone and venue app 2a being used without either a paper ticket 2b or electronic ticket 2c, (C) "Paper Ticket," which is cell phone and venue app 2a being used in combination with paper ticket 2b, (D) "Close-Range E-Ticket," which is cell phone and venue app 2a being used in combination with electronic ticket 2c (as primarily discussed in relation to FIGS. 2 and 3,) and (E) "Extended Range E-Ticket," which is cell phone and venue app 2a being used in combination with electronic ticket 2c (as primarily discussed in relation to FIGS. 2 and 3 except that all of the close range data 2c-1 and 2c-2 is implemented as extended range data 2c-3, e.g. where the authentication code, ticket number and ticket status are all combined with the tracking number for implementation using a passive extended range technology such as passive UHF RFID, as will be well understood by those skilled in the art of at least RFID systems.) The present inventor notes that while it is possible, there is no limitation that a given system 100 work exclusively with any one type of smart ticket 2, i.e. (B), (C), (D) or (E), or any other the alternates or variations, as the preferred system 100 accommodates its guest 1's needs which may range such that support any combination of smart tickets 2 is desirable.

Still referring to FIG. 4, before describing each of the embodiments of smart ticket 2 in more detail, such as (B) Virtual Ticket, (C) Paper Ticket, (D) Close-Range E-Ticket and (E) Extended Range E-Ticket, the present inventor notes generic (A) "All Tickets" is representative of all embodiments (B), (C), (D) and (E) as they progress through the steps and states of: ZN1 (ZONE1 Registration,) CP1 (Choke Point 1,) ZN2 (ZONE2 Enablement,) CP2 (Choke Point 2,) ZN3 (ZONE3 Confirmation,) CP3 (Choke Point 3,) ZN4 (ZONE4 Activated,) CP4 (Choke Point 4,) and ZN5 (ZONE 5 Registration,) where the careful reader will note these same steps and states to be those detailed in FIG. 3 with respect to (D) close-range e-ticket (that preferably included extended range data 2c-3 for the purposes of guest tracking once arriving within the venue.) What is important is that system 100 comprises any of the smart ticket 2 embodiments (or alternates and variations discussed directly by the inventor herein or as will be obvious to others based upon the teachings herein and the application of new and advancing technologies,) being taken through the sequences of ZONEs and Chokepoints herein described, where the combination of the smart ticket 2 and sequence of ZONEs and Chokepoints providing at least some of the novel and important benefits of the present invention.

Still referring to FIG. 4, Virtual Ticket (B) comprises cell phone and venue app 2a and conveniently excludes the use of a paper ticket 2b or electronic ticket 2c. While it is possible to further adapt a typical cell phone (i.e. smart phone) with an RFID reader, it is preferable that Virtual Ticket (B) use a cell phone that includes a close-range communications technology such as near field communications (NFC.) One of the limitations of Virtual Ticket (B) is that it is only practical for use as a single guest 1 ticket, as serving multiple guest(s) 1 would become problematic especially when attempting to pass through single-file chokepoints. With Virtual Ticket (B), close range data 2c-1 and 2c-2 resides within cell phone and venue app 2a rather than within the electronic ticket 2c as described in relation to FIGS. 1, 2 and 3. Other than this distinction, Virtual Ticket (B) operates exactly like the teachings in relation to FIGS. 1, 2 and 3 describing device 2a in combination with electronic ticket 2c. As the careful reader will note, access points 5a-1, 5a-2, 5a-3, 5a-4 and 5b all read and write to close range data 2c-1 and 2c-2 using a close-range technology such as NFC, and otherwise cannot detect any different in data 2c-1 and 2c-2 being located on device 2a (as with the Virtual Ticket (B)) or on the electronic ticket 2c (as with FIGS. 1, 2 and 3.) The present inventor notes that a misguided guest 1 might wish to provide their Virtual Ticket (B) to an accomplice guest 1 for use at a venue. To attempt this both the misguided guest 1 and accomplice guest 1 must have some embodiment of smart ticket 2 in order to pass chokepoint 2 (which is access point 5a-1,) for entering into ZONE3 Confirmation. Since both guests 1 would need a valid ticket, the only potential benefit would be that the misguided guest 1 was attempting to provide to the accomplice guest 1 an upgraded ticket, e.g. in a theme park setting the upgrade could allow for fast lane access. However, even if the misguided guest 1 swapped their Virtual Ticket (B) with the accomplice guest 1, while both guests 1 would be able to cross chokepoint 3 (access point 5a-3) into Zone4 the venue, only the accomplice guest 1 holding the upgraded Virtual Ticket (B) would for example be able to enter a fast lane, after which they would not then also be able to confirm the Virtual Ticket (B) with a valid biometric such as a fingerprint.

Still referring to FIG. 4, Paper Ticket (C) comprises cell phone and venue app 2a in combination with paper ticket 2b but excludes electronic ticket 2c. Unlike Virtual Ticket (B), Paper Ticket (C) has the benefit of allowing one guest 1 (assumed, but not required to be the purchaser,) to register and otherwise confirm multiple Paper Tickets (C) using a single cell phone and venue app 2a, which at least in the case of theme parks and families with young children is a significant advantage. (The present inventor notes that just as there is no limitation that system 100 work exclusively with one type of smart ticket 2 such as (B), (C), (D) or (E), likewise there is no limitation that a single cell phone and venue app 2a can't be both a Virtual Ticket (B) for one guest 1 and work with any combination of one or more Paper Tickets (C), Close-Range Electronic Tickets (D) and Extended Range Electronic Tickets (E), as will become better understood with the remaining description of FIG. 4.) Another advantage of Paper Ticket (C), at least with respect to Virtual Ticket (B), is that a Paper Ticket (B) preferably comprises a printed version of the ticket number (e.g. as a bar code,) as well as possibly also an authentication code (e.g. as a QR code, or a 2D bar code.) As prior discussed, the authentication code could be the same as the authentication code in the cell phone and venue app 2, in which case these codes would need to match just like the ticket number(s) on the one or more Paper Tickets (C), although it is also possible that the authentication code printed on the Paper Ticket (C) was first encrypted using the device 2a app ID, in which case it is a harder code to forge, and it serves to protect both the venue and purchaser from theft and ticket loss. Similarly, while not mandatory, if the ticket numbers assigned to the purchaser by the venue are first encoded using the purchaser's unique (and preferably secret) app ID, then this makes it significantly more difficult for a forger to create counterfeit tickets, let alone counterfeit tickets that work with a counterfeit App ID properly embedded into a valid venue app 2a.

Still referring to FIG. 4, using Paper Ticket (C) is exactly like using Virtual Ticket (B) with the following somewhat problematic exception. Specifically, if there is a single guest 1 that is controlling cell phone and venue app 2a for which their own Paper Ticket (C) is registered, then this single guest 1 has the option of scanning either their device 2a or their Paper Ticket (C) when passing through any access point 5a-1, 5a-2, 5a-3, 5a-4 or 5b. This of course assumes that these access points have been adapted to include both a close-range communication technology such as NFC, for reading the ticket number and status off device 2a, or a bar code or QR code scanner for reading the ticket number of Paper Ticket (C). The problem is that Paper Ticket (C) cannot be updated to include the ticket status which is critical in system 100. In this case, this single guest 1 would clearly need to scan their device 2a obviating the need for a Paper Ticket (C). However, in the family situation prior mentioned, for which a single controlling device 2a with multiple Paper Tickets (C) is preferable, one alternate preferred variation of an unmanned access point 5a is to include a display that shows one or more "allowed" ticket numbers, where "allowed" ticket numbers are those ticket numbers found to be on the controlling device 2a and to have the appropriately valid data, e.g. ticket number, ticket status and possibly authentication code. For example, if a family of four guests is approaching choke point 2, i.e. access point 5a-1, then the first guest is preferably the operator of the controlling device 2a who scans their device 2a accomplishing two main goals: 1) validating their own (in this case) Virtual Ticket (B), and 2) providing a list of 3 additional validated Paper Tickets (C), where in the present teachings for access point 5a-1 the ticket status maintained on the controlling device 2a for each of the 3 additional Paper Tickets (C) is also set to "ENABLED," as is the first guests Virtual Ticket (B).

At this point, as each of the 3-remaining family (really group) members proceeds to pass through access point 5a-1, their Paper Ticket (C) number is matched and accepted, allowing them to pass, and then removed from the list. The present inventor notes that it is not even necessary that all of the 3-remaining guests pass through access point 5a-1 directly after the first guest, as the access point 5a-1 can also be connect to all other access points 5a-1 and the 3-remaining validated tickets continue to be acceptable to system 100 until the 3-remaining guests do pass through in this example choke point 2, irrespective of which of multiple possible access points 5a-1 they use or whether or not they are directly following each other as opposed to being proceeded by some other guest(s) 1. However, as will be obvious to the careful reader, once the first guest has crossed from ZONE 2 through choke point 2 (access point 5a-1) into ZONE 3, then any of the 3-remaining guests will need to enter into ZONE3 before the first guest confirms themselves and enters into ZONE4 via chokepoint 3 (access point 5a-3.) One interesting note is that once all of the example family is within ZONE3 and all of their respective tickets have been confirmed using the device 2a controlled by the first guest of the family, than all other 3-remaining paper tickets are now confirmed and any of these 3-remaining guests could for example tarry in ZONE3 (perhaps to use the restrooms or go into a shop,) while all of the remaining family proceeded into ZONE4, all as will be well understood by a careful reading of the present invention.

As will also be appreciated from a careful reading of the present invention, paper ticket (C) does not include extended range data such as the tracking number of data 2c-3. As prior mentioned, any guest 1 with a paper ticket (C) may also receive a wearable 16 that does include the extended range data and therefore will receive all the other benefits herein taught for at least tracking individual guests 1 to specific venue locations including confined areas that are fixed (like a building or room in a building,) and confined areas that are movable (like a seat or spot to occupy on a vehicle or transport mechanism.) As is well known in the art, passive RFID's come in forms that are paper thin and flexible. It is also possible and anticipated that the paper ticket (C) (2b of FIG. 1) as issued by the venue already comprise a passive RFID and therefore be equivalent to wearable 16 for providing extended range data 2c-3 as herein taught. The present inventor further notes that in such a case, paper ticket (C) may benefit by including a water proof surface, of which they are many well-known options including lamination, and some less well-known options including the use of a hydrophobic coating. Those familiar with hydrophobic coatings will understand that these coatings fully repel water and can bind to the surfaces such as paper and plastics. Example products include Rain Guard's "Hydro-Lok," or a paper that is referred to as "super hydrophobic paper."

Referring still to FIG. 4, using Close-Range E-Ticket (D) is exactly as described in especially in relation to FIGS. 2 and 3, electronic ticket 2c is a preferred implementation of (D), e.g. preferred because ticket 2c uses NFC for reading data 2c-1 and 2c-2 at close-range. However, the choice of reader technology is immaterial to the novelty and benefits herein described, e.g. RFIDs can also be used for close range reading with the drawback that cell phones are not normally found with this capability. All as prior described, Close-Range E-Ticket (D) (e.g. implemented as electronic ticket 2c) has significant advantages including: 1) it is easy to support multiple tickets (D) with a single device 2a, where after device 2a sets the appropriate ticket status codes 2c-2 on each of multiple tickets (D), each ticket (D) may be used by one guest 1 to pass through an access point such as 5a-1, 5a-2, 5a-3, 5a-4 or 5b without requiring the presence of controlling device 2a, and 2) because ticket 2c uses close-range readable data, it is hard to "snoop" (illicitly remove sense or reset information) from a distance beyond 2-3 inches, which is well within the guest 1's awareness and control. Also, as prior mentioned, the present inventor prefers combining Paper Ticket (C) with Close-Range E-Ticket (D), although this is not mandatory.

Referring still to FIG. 4, using Extended Range E-Ticket (E) is like using Close Range E-Ticket (D), where the zone and checkpoint steps are identical. As an extended range technology, the present inventor prefers passive UHF RFIDs that can be read to and written to at distances of 10 to 20 feet with standard antennas and up to 60 feet or more with phased array antennas, all of which will be well understood by those familiar with RFID technology and especially UHF Gen 2 RFID technology. (Shortly, the present inventor will provide a description of using Bluetooth as an alternative extended range read/write technology, were the main drawback is that as of today's market, Bluetooth does not support passive Tickets (E).) While the present system 100 could use active RF technology to implement Tickets (E) at greater ranges from the antennas, the present inventor still prefers to use for example a UHF RFID system to read/write passive Tickets (E) which are lower in cost and smaller in size. In each Zone such as where the Ticket (E) must have at least its ticket number 2c-1 and status 2c-2 read, and its status 2c-2 written, a sufficient RFID antenna array must be provided, all of which is outside of the scope of the present invention and well known to those skilled in the art of RFID systems.

In this scenario, a guest 1 for example controlling 4 E-Tickets (E) with a single device 2a would perform the necessary venue app inputs as prior described in relation to FIGS. 2 and 3 depending upon the zone, after which device 2a would preferably communicate over a local wireless network to the venue's system 100, which would then send out the appropriate signals to read or write E-Ticket (E) data 2c-1 or 2c-2. In at least one way, this is easier for the guest(s) 1 in that this removes the requirement of brining the E-Ticket (E) to within close range of device 2a to check the initial status or set the final status (which is required for Close-Range E-Ticket (D).) One anticipated use of Extended Range E-Tickets (E) is when the data 2c-1 and 2c-2 is implemented on a wearable such as 16, prior described in relation to FIGS. 1 and 2. If for instance, the venue was a water park and the wearables 16 were implemented as anklets on each guest 1, then it would be very convenient for each guest 1 to be walking through the zones with their RFID wearables 16 remaining in place around one of their ankles. Within each zone, all guests 1 must use a cell phone and venue app 2a to perform all the prior taught operations, with the exclusion of bringing their wearable 16 into proximity of their device 2a (i.e. so that data 2c-1 or 2c-2 can be read or written.) Furthermore, access points 5a-1, 5a-2, 5a-3, 5a-4 and possible manned access point 5b would preferably be implemented as a RFID reader at ground level that the guest 1 would first hold their ankle near and then second proceed through the turnstiles once so directed by the access point after confirmation of the valid and properly set E-Ticket (E).

Still referring to FIG. 4, an alternative extended range technology is Bluetooth, where the E-Tickets (E) in any form, e.g. a ticket similar to electronic ticket 2c or a wearable such as 16, are in communications with both the controlling guest 1's cell phone and venue app 2a and the access points 5a-1, 5a-2, 5a-3, 5a-4 and 5b. Blue Spark Technologies of Ohio, currently develops thin film, flexible, printed power solutions for printed electronic systems that include Bluetooth communications. This or similar technology can be used to implement a Bluetooth Extended Range E-Ticket (E) with the advantage of eliminating the RFID antenna system requirements for implementing an E-Ticket (E) using RFID for data 2c-1 and 2c-2 (unless the guest 1 is still wearing an optional extended range tracking number 2c-3 or 16 implemented in RFID.) One disadvantage as prior stated is that the Blue Spark technology is active, and therefore relies upon batteries which can run out. However, the present inventor notes the rise in wireless power solutions and anticipates that guests 1 could be standing within the range of a wireless power solution that energized their Bluetooth E-Ticket (E) sufficient for performing data exchange with both the controlling guest 1's device 2a and any access point 5a-1, 5a-2, 5a-3, 5a-4 and 5b. This is especially true when considering that in a ticket-like form, E-Ticket (E) can be laid onto, therefore in proximity, a wireless power emitter provided by the venue while the guests 1 use their cell phone and venue app 2a to make reads and writes, and likewise laid onto the access points 5a and 5b for reading and writing, all as will be well understood by those skilled in the art of wireless power technologies. And finally, if the E-Ticket (E) is implemented in a Bluetooth wearable 16 form such as an anklet, that anklet form would allow the guest 1 to stand over or near a wireless power emitter energizing the Bluetooth wearable E-Ticket 16 for the herein taught uses.

Still referring to FIG. 4, it is also possible to implement an extended range E-Ticket (E) using wi-fi technology, where the E-Ticket (E) includes a wireless power receiver as just described, or includes a battery, and additional includes printed electronics that are readable over wi-fi communications. As will be appreciated by those skilled in the art of wireless communications protocols and internet-of-things devices, implementing a wi-fi communications E-Ticket (E) becomes problematic because the algorithmic complexity of the wi-fi protocols is currently beyond printable (and therefore ultra-low cost, low power, minimum size) electronics. While future technologies will ultimately impact the best choice for implementing extended range readable implementations of an E-Ticket (E) comprising at least data 2c-1 and 2c-2, the present inventor considers two questions to be critical for the present invention. First, is the extended range readable technology available on the typical cell phone without further adaptation? Currently RFID is not, while Bluetooth is, (and so is NFC but this is close range readable.) Second, can the extended range readable technology be used to build the preferably passive, low cost, minimum size E-Ticket (E) either in the size or form of a normal ticket or a wearable 16? Currently RFID can, but Bluetooth cannot, (while NFC can.) However, the present invention anticipates using at least close range wireless power transmission (WPT) to energize a printable electronics E-Ticket (E) like the products currently in production from Blue Spark Technologies, where the WPT effectively removes the printed battery solution now in production from Blue Spark—thus creating "passive wearable Bluetooth." As previously stated, as long as the guest 1 placed their E-Ticket (E) (in any form such as 2c or 16) in close proximity to the WPT preferably provided by the venue, they would then use their cell phone and venue app 2a to perform all of the functions taught herein with respect to the close-range readable ticket 2c discussed especially in relation to FIGS. 1, 2 and 3, and referred to as "Close-Range E-Ticket (D)" in FIG. 4.

Therefore, while the present inventor has taught certain preferences, the exact choices of technology for implementing either Close-Range E-Tickets (D) or Extended Range E-Tickets (E) are immaterial and as those skilled in the art of these various technologies will understand, new options are likely to arise that can be implemented without straying from the novel teaching herein. As such, the present teachings with respect to especially FIG. 4 and the implementation of tickets (D) and (E) should be considered as exemplifications rather than limitations of the present invention.

Referring next to FIG. 5a, there is shown the PRIOR ART use of wearable 16 implemented as a passive RFID transponder that is energized by an electro-magnetic field emitted by exciter mat 12, whereupon wearable 16 generates a unique reflection of the field referred to as a "chip" that is detectable using a radio receiver 18a with decoder circuitry and logic, all as is well known the in art of RFID systems. This particular arrangement has been in use for many years especially with respect to road race timing systems, such as provided by ChampionChip, including the equipment (receiver's 18a, mats 12 and wearables 16) along with software services. What is important to note about the PRIOR ART systems is that: 1) tracking individual guests 1 using passive UHF RFID at ranges 3 to 6 feet as they cross over a surface is well established, and 2) what is tracked is the real-time at which a particular guest 1 crossed over mat 12 (comprising a single exciter/antenna,) typically where the mat 12 is arranged with a longitudinal axis perpendicular to the expected direction of guest 1 transversal, and the particular longitudinal point at which guest 1 crossed an individual mat 12 (and therefore single antenna) is not known or knowable.

Referring now to FIGS. 5a and 5b, in the parent patent of which the present application is a continuation-in-part, the present inventor disclosed an INTERACTIVE OBJECT TRACKING MIRROR-DISPLAY AND ENTERTAINMENT SYSTEM, wherein a new type of display was disclosed that is capable of simultaneously outputting both a public image viewable by all guests 1 with the unaided eye, and a private image, viewable to guests 1 with special glasses. In this base application, this display was further adapted to include a transflective surface for varying between a full mirror, to half-mirror half-display and then to a full display. The mirror-display was then further adapted to include object tracking of an article, e.g. a Wizard's Wand, for allowing a guest 1 to move the wand to indicate spells for giving commands to a local environment system 30 and for participating in a park-wide gaming system controlled through global environment system 40. Both eco-systems 30 and 40 were extensively described in the prior parent application and will not be further described herein. What is important to understand is that a park wide gaming system can greatly benefit from the tracking of guests 1 throughout a theme or amusement park as is taught herein. It is also important to understand that the teachings of the present invention work to both extend and enhance the teachings of the parent patent, as well to stand alone as beneficial apparatus and methods for many applications beyond theme and amusement parks. It is also important to understand that the present teachings have significant value to theme and amusement parks even when not combined with any of the teachings of the parent patent, including eco-systems 30 and 40. Much of the remainder of the present application is directed to understanding guest 1 movements within a theme or amusement park, even how to detect their location down to individual ride seats. Again, as will be well understood by those skilled in the art of theme and amusement parks, while this tracking information offers significant value for logistics and customer service, it also provides significant value for creating an interactive, personalized physical-virtual parkwide gaming system.

Now referring to FIG. 5b, there is shown a further adaptation to the PRIOR ART receiver's 18a, mats 12 and wearables 16 including the combination of a spatially co-located pressure sensing mat 14, where receiver 18a is further adapted to become radio receiver and pressure signal decoder 18b, which like receiver 18a communicates its tracking information to either or both of eco-systems 30 and 40. Regarding pressure sensitive mat 14, the present inventor notes the following technologies present in today's marketplace. Kwang II Textiles Co of Gyeonggi Province, South Korea, currently sells a category of products they refer to as "conductive fabric," with a specialized implementation forming a fitness mat they refer to as "conformal pressure mapping sensor." Kwang describes the data output from their conductive fabric system as a "heat map," which those skilled in the art of imaging systems will understand as three-dimensional information, where two dimensions represent the spatial location of the applied pressure, while the third dimension represents the amount of pressure.

The Kwang technology is not unique and generally fits into a technology referred to as piezoresistive materials, where the electrical resistivity of these materials (typically a semiconductor or metal) changes in response to mechanical strain, or pressure. At least some of the Kwang products use a copper polyester composite yarn woven into a fabric, while other companies such as EeonTex coat a fabric substrate with a lightweight conductive polymer. Still another approach has been implemented by MedTex that uses a silver-plated nylon acting as the piezoresistive materials. Other individuals have built similar pressure sensing grids using what is known as ESD form, or anti-static foam, which is a polyurethane foam that is chemically doped with an anti-static agent (surfactant,) all as will be well understood by those familiar with piezoresistive materials. Several individuals working at the School for Engineering of Innovative Textiles have developed what they refer to as "smart carpet." Their solution is a "low-cost intelligent carpet system for footstep detection," where "the carpet consists of activated carbon nonwoven material sandwiched between a pair of cross-aligned conductive wires to form in situ piezoresistive sensors." What is most important, and what the careful reader will see, is that there are many available technologies for sensing pressure, where these technologies can be implemented on many surfaces with many materials and additional coverings for example to add strength and waterproofing for outdoor use. The present invention teaches that while a mat 12 with a single antenna can successfully detect the crossing of wearable 16 somewhere across is full spatial detection range, by adding the additional pressure sensing mat 14, a higher degree of location granularity is available—all as will be discussed further.

Referring next to FIG. 6a, there is shown a single seat 50a further adapted with the combination of back rest pressure sensor 14-2, seat pressure sensor 14-1, combined floor pressure sensor and exciter 20 and radio receiver and pressure signal detectors 18b-1 and 18b-2, where the seat 50a is for example a ride seat at a theme park, or a seat in a movie theater. Radio receiver and pressure signal decoders 18b-1 and 18b-2 are preferably situated to best detect the presence of wearable 16 as guest 1 enters the floor area in preparation for sitting in seat 50a. As will be appreciated by those skilled in the art of RFID systems, while the data from multiple readers, especially three readers, can be used to better determine an X, Y, Z location for transponder 16, a primary use such as herein depicted also includes redundancy. For example, in some cases transponder 16 may be resting at an angle so as not to be sufficiently reflective of the exciter signal from mat 12, such that one of the two receivers 18b-1 or 18b-2 is unable to detect or identify the unique transponder 16, therefore having multiple readers is useful.

As will also be well understood by those skilled in the art of RFID systems, mat 12 is not required if the receiver's such as 18b-1 and 18b-2 are also themselves the electromagnetic field emitters, which is an alternative configuration well known in the PRIOR ART and also available from companies such as ChampionChip. As will also be well understood by those skilled in sensor devices and software systems, using a configuration such as depicted in FIG. 6a, it is possible to determine: 1) when a guest 1 enters or exits the floor area of seat 50a based upon either feet pressure detected by mat 12 within combined mat 20 and/or based upon the detection of a RFID wearable 16 by detectors such as 18b-1 and 18b-2, 2) the unique tracking number representing the identity of the guest 1 based upon the detection of a RFID wearable 16 by detectors such as 18b-1 and 18b-2, and 3) the time of both sitting and then standing by guest 1 based upon either back pressure detected by mat 14-2 or buttocks pressure detected by mat 14-1. This is especially useful in theme parks as it provides tracking information regarding: 1) which guest 1 is in which ride seat 50a, 2) when the guest 1 entered the ride seat and sat down, and 3)

when the guest stood up and exited the ride seat 50*a*. As will be well understood by those familiar with theme and amusement park rides, for some rides it is possible for a guest 1 to attempt to stand up in the middle of the ride which is dangerous, where the present invention teaches a novel means of detecting this situation for immediate response.

Referring next to FIG. 6*b*, single seat 50*a* has been expanded to a bench seat 50*b*, e.g. as might be on a theme park ride or a restaurant seat. Two important variations are depicted as compared to single seat 50*a*. First, the bench seat 50*b* is optionally shown without a backrest pressure sensor (such as 14-2.) As will be understood by a careful reflection on the act of sitting, detecting guest 1 presence is possible in many ways, including: a) detecting pressure applied to some or all of a seat area such as with 14-1 that covers all of the seat, b) detecting pressure applied to some or all of a back rest area such as with 14-2 that covers all of the back rest, c) detecting foot pressure on the area underneath and in front of a seat where it is known that a guest 1 must traverse in order to get in and out of their seat as with combined pressure sensor-exciter mat 20, d) detecting pressure on the floor/support structure underneath a seat applied by a surface of the seat, e) detecting pressure on a surface of a seat where it has fixed or free contact with a floor/support structure, f) detecting pressure on arm rests to either side of a seat, or any other means for translating the downward pressure created by the presence of a guest 1 within a resting or standing place by using the technologies herein preferred or similar.

Regarding alternative technologies for detecting pressure or presence of a guest 1 at a specific resting or standing location, the present inventor notes several alternatives including but not limited to: 1) as previously mentioned using various forms of what are referred to as textile sensors, similar to Kwang such as manufactured by Plug&Wear of Florence, Italy, that can detect any of guest 1 touch, applied mechanical pressure from guest 1, or strain (fabric stretching) caused by guest 1, 2) using a conductive Acrylonitrile Butadiene Styrene (ABS) material, which is a common thermoplastic polymer often used in 3D printing or for molding into various shapes (such as the well-known LEGO bricks) and exhibits the useful properties of: a) toughness and high impact resistance idea for theme park ride seating, b) changes its resistive properties even with small applications of pressure or bending which can then be detected by for example applying a charge across the conductive ABS material and measuring any change in electrical potential as an indication of guest 1 presence, where it is possible to for example use the conductive ABS along a fulcrum point underneath a seat (or similar resting area) such that as the guest 1 (the load) places a downward force upon the seat (the fulcrum) undergoes significant pressure as the seating structure applies an opposing upward force (effort,) and where this pressure effects at least the resistivity of the conductive material which then is easily measured by applying a voltage along the fulcrum axis all as will be well understood by those familiar with both mechanical and electrical engineering as well as conductive polymers, or 3) using air pressure detectors similar to technology produced by Sensor Products, Inc. of Madison, N.J., whose "Tactilus Technology" employs a "unique air bladder based sensor" to detect and measure pressure between any two contacting or mating surfaces, where existing products include a golf glove with one bladder on each finger for detecting grip pressure from a golfer's hand on a golf club, and where these same air bladders could be placed on any of seat 50*a* areas expected to undergo pressure from a guest 1 for sufficiently detecting their presence. What is most important is not the particular sensing method, but the use of a sensing apparatus ultimately activated by the application of force by a guest 1, such as by fluctuations in standing, walking, sitting, etc., as herein described, and therefore the technology herein discussed as preferred or alternative embodiments should be considered exemplary rather than limitations of the present invention.

Still referring to FIG. 6*b*, the second important variation between seat 50*a* and 50*b* is that seat pressure sensor 14-1 that includes a single "on/off" sensing area for seat 50*a*, has been sub-divided into individual area detectors such as 14-3-1, 14-3-2, 14-3-3, 14-3-4, through 14-3-17 (collectively 15) for bench seat 50*b*, where each area provides its own "on/off" signal. What is important to understand is that pressure fabrics and mats such as prior described from Kwang and Plug&Wear can create a single pressure "map" of an entire surface such as bench seat, without sub-divisions, such that the individual map of pressure is spatially calibrated to the entire area of the bench seat (i.e. the entire area encompassed by sub-divisions 14-3-1 through 14-3-17,) where the map is interpretable as guest 1 locations across the entire bench area. As will be well understood by those familiar with bench seat rides, without guest restraints it is possible that a single guest 1 may occupy a space directly next to a second guest 1 such that the exact locality of two guests may be difficult to identify. As will be well understood by those familiar with object tracking systems and software, using pre-knowns such as typical guest side-to-side width (e.g. 17-18 inches,) it is possible to digitally sub-divide a single map into rough approximations of guest 1 locations. Another approach is to use coincident information for example as determined by pressure sensors 12 in the floor area where the guest 1's feet are expected to rest. While during a typical amusement ride, it is possible that: 1) a small guest's 1 feet do not touch the floor, or 2) a single guest's feet are at any time lifted or resting on a rail off the floor, such that in either case the detection of possible feet location is not continuous (whereas the detection of the seat, such as 14-1, or back rest area, such as 14-2, is expected to indicate continuous guest 1 presence,) it is non-the-less noted that while a guest 1 is moving to their seat, there will be detectable floor pressure (from the guest 1's feet) that can be used to laterally bound an area detected on the seat or back rest pressure map, such that the presence of two feet generally limit the left-right bounds of the pressure map thus serving to indicate a more-or-less centered location for each guest 1 in a situation with guest 1 placement is not restricted to sub-sections of the bench seat.

Another approach is to sub-divide the entire continuous movement area of the bench into sub-divisions such as 14-3-1 through 14-3-17, where each sub-division might then measure a collective total pressure across its entire sub-division surface, and where the total pressure of neighboring sub-areas is indicative of the centering of individual guests 1 as the pressure they exert on the seat will tend to decrease towards the lateral edges. Another advantage to measuring "on/off" pressure per single sub-division such as 14-3-4 as opposed to an entire bench area pressure map is that the expected sophistication of pressure sensing and corresponding circuitry and data processing requirements can be lowered, all of which is important to both cost and system servicing. Regarding the concept of a full-area pressure map, it is also useful to understand that the existing pressure mats such as from Kwang can be modeled as having a row/col (e.g. long axis/short axis) resolution, similar to a camera sensor that forms an image. For example, a given pressure sensor implemented as 14-1 in seat 50*a* or 14-3-15 in seat 50*b* may provide a "high resolution" pressure map, e.g. such as 500 horizontal×500 vertical pressure points, or a binary output for the entire surface 14-1 or 14-3-15, such as "0"=sufficient pressure not detected to "1" sufficient pressure detected. As will be obvious to those skilled in sensors and software systems, the resolution of a sensor needs to be best matched to the needs of the system and as such, these combinations should be considered as exemplifications and not limitations of the present invention as many alternatives are possible and useful.

Still referring to FIG. 6*b*, it is also possible that bench seat 50*b* has for example a single set of receiver detectors 18*b*-1 and 18*b*-2 capable of sensing multiple guests entering the seat 50*b* from an "enter direction." As will be obvious to those skilled in the art of theme and amusement parks, it is often the case that rides are loaded from one side and unloaded from the opposite ("exit direction") side. In this example, a single pair (or even just one detector such as 18*b*-1 or 18*b*-2) is sufficient for detecting each guest 1 as they proceed single-file to take their seats, then resting upon some sections such as 14-3-4 or 14-3-15 (or equivalent area in a full bench seat pressure map.) Whether the bench seat 50*a* is sub-divided into 17 segments as depicted or left as a single "high resolution" seat such as 14-1 is immaterial, what is important is that first guest(s) 1 are identified using their RFIDs (such as wearable 16 but not limited to a particular form such as an anklet,) and then positioned at a specific location of seat 50*b*. As will also be appreciated by those skilled in the art of park rides, typically multi-seat rides are physically divided such that there are only a few possible locations (e.g. bench 50*b* might be divided into 4 individual seats (such as 50*a*) all side-by-side as an integrated unit, but each with its own guest 1 restraints. In that case, using one pressure sensor such as 14-1 on each of multiple seats is preferable, where also using only one set of detectors 18*b*-1 and 18*b*-2 to identify guests as they enter the multi-seat ride is preferred, since after entering the guests must take seats in the first to last order, possibly skipping a seat if for example only 3 guests are being loaded into a 4-seat ride.

As will be discussed further with respect to upcoming FIGS. 8*a* and 8*b*, it is also possible and preferable that the arrangement of detectors 18*b*-1 and 18*b*-2 for uniquely identifying guests 1 as they enter a single or multi-seat ride, are affixed to a ride platform rather than the ride seat. As will be appreciated by those skilled in the art of theme park rides, this reduces the total number of detectors 18*b*-1 and 18*b*-2 necessary since a single detector arrangement can then serve a single row of ride seats within any of a multiplicity of ride cars (where each ride car typically includes multiple rows of ride seats.) Hence, if there are 5 total ride cars, each with 6 rows of 4 ride seats, requiring a set of one or more detectors such as 18*b*-1 or 18*b*-2 for each individual ride seat (therefore attached within each ride car seat) would yield a total of 120 sets of detectors, whereas requiring one set for each row of each ride car (therefore attached on the entering direction side of each ride car row) reduces the total to 30 detectors, whereas moving the set of detectors off the ride cars and onto e.g. the platform servicing the ride car results in only 6 sets of detectors. Moving the detectors 18*b*-1 and/or 18*b*-2 off the ride cars also reduces the sophistication of the electronics on each individual ride car, as will be appreciated by those familiar with ride car construction. In this alternate embodiment, since the detectors 18*b*-1 and 18*b*-2 would be serving multiple ride cars, the present invention is further adapted through any of well-known means to detect the ride car (e.g. ride car 01, 02, 03, 04 or 05) that is presently located next to detectors affixed to the loading platform, such as 18*b*-1 and 18*b*-2. Using such an arrangement, guests 1 entering from the loading platform onto a detected specific car into for example any 1 to 6 possible rows of seats, may be detected and uniquely identified. After each guest 1 is detected entering a specific car row (e.g. row 05) on a specific ride car (e.g. car 03,) using any of the detection means herein specified, guest 1 is detected as sitting in any of for example 1-4 possible seats in the car row (e.g. seat 1.) With respect to the exemplary theme and amusement park ride use case, what is important to understand is the combination of possible apparatus and methods herein disclosed that detect and determine information providing the unique ride car, row number and seat number in association with guest 1 tracking number/ID (as well as any associated information.)

Referring next to FIG. 7*a*, there is shown ride car 50*b* of FIG. 6*b* that has been further adapted to include one or more cameras 54, e.g. in a linear array such that there is one camera facing each of the pre-known seat areas within ride car 50*b*. As will be appreciated by those skilled in the art of theme parks and amusement rides, by determining which unique guest 1 is in which unique ride car, seat row and seat, as prior discussed, it is then also possible to track the movements of each ride car 50*b* along its guided rail apparatus, of which there is known a multiplicity of solutions all mandatory for ride safety and performance, any of which are sufficient for the teachings of the present application. What is important is that the ride system, knowing where each ride car is on the guided rail system using its own or further adapted position sensor(s) 52, can capture images of individual guest(s) 1 in their detected and known seats at least timed with special effects 56*a* or particular points on the ride where the guest(s) 1 are anticipated to perceive increased interest or excitement. As will also be well understood, some of these particular points such as 56*a* may be in darkened areas, where infra-red imaging may be advantageous. The present invention anticipates any type or configuration of cameras 54 and what is most important is that these cameras capture images of a particular guest 1, preferably for transmitting to the photo-video repository 40*b* (see FIG. 2,) where the images or video remain in association to at least the unique tracking number detected and associated with the particular guest 1.

Referring next to FIG. 7*b*, there is shown free-floating ride car 50*c*, such as a circular raft floating along a water path at a theme or amusement park. What is different about ride car 50*c* as opposed to 50*b* includes: 1) even if free-floating ride car 50*c* is boarded one guest 1 at a time, guests 1 may move amongst the car seats choosing them in any sequence, and not necessarily in order as with ride car 50*b*, therefore detecting individual guest(s) 1 requires sensing final seating positions using for example seat pressure sensors 14-1 as well as guest identities using combination pressure sensor and exciter mat 20 in further combination with one or more detectors 18*b*, where the arrangement for seating positions and detected wearables 16 on guests 1 provides information combinable for determining which guest 1 is sitting in what ride car 50*c* seat, 2) free-floating ride car 50*c* is not attached to a guided rail system as used with ride car 50*b* and therefore preferably includes unique fiducials either present in the existing structure and appearance of the car 50*c*, or as added or affixed to ride car 50*c* such as ride car marker 50*c-m*, where the preferably existing structure fiducials or added ride car markers 50*c-m* are detectable by one or more tracking cameras such as 55-1, 55-2 and 55-3 situated along and calibrated with the ride car 50c's potential route, and where the detected fiducials or markers 50c-m are translated into sufficient 3d locations and orientations of ride car 50c and therefore as well all locations and orientations of guests 1 detected and known to be seated at fixed locations within ride car 50c, as will be well understood by those familiar with object tracking systems, and 3) special effects such as 56b (in this case a water emitter) are positioned at known points along the possible ride path of free-floating car 50c but are then preferably timed by the tracking of the free floating car 50c using the techniques prior mentioned in (2), such that for example they emit water only at certain times selected to splash onto one or more selected guests 1, where the guests 1 are selected by first determining that they will be within the emission range of the water effect and then second algorithmically choosing to emit water so as to splash a selected guest 1 and then also to preferably capture an image or video of the moment of splashing using any of cameras 54, where the photos or videos are then transmitted to photo-video repository 40b (see FIG. 2.)

Still referring to FIG. 7b, as will be well understood by those skilled in the art of RFID systems and data analysis of detected RFID signals, pressure maps and other sensors, there are several key variables to be understood and adjusted to the particular construction and needs of ride car 50c at least including any one of, or any combination of: a) the physical construction of each antenna for emitting an exciter signal that can be altered to shape the spatial volume of the exciter signal, b) the power provided to each antenna that can be varied to alter the shape of the spatial volume of the exciter signal, c) the arrangement of a multiplicity of antennas that can be altered so as to create a combined spatial volume for encompassing some or all the three dimensional space within which a guest 1 wearable 16 is expected to pass through or remain within for a given ride duration, d) the timing for activating each individual antenna within the multiplicity of antenna, e) the trigger for the timing of activation including any one or combination of: i) in unison across all antennas and synchronous at a fixed rate per second, ii) individuated at a fixed rate, where each individuated antenna is activated alone or in synchronicity with other antennas by not all antennas, and iii) in response to other signals such as but not limited to: 1) detection by a pressure sensing mat such as 14, 14-1, 14-2, 2) detection by any existing theme park ride sensors, or any of well-known sensors further adapted to a park ride, where the existing or adapted sensors indicate any of the ride car states including; a car has stopped, is being boarded, is fully boarded, is in motion, or is being disembarked, f) the degree of overlap of any two spatial volumes as emitted by any two antenna within the multiplicity of antenna, and g) the comparison of wearable "chirp" response signals received simultaneously or sequentially by any one or more detectors 18b, where the comparison results in the locating of a wearable 16 to be within one or more spatial volumes corresponding with one or more antennas, where each spatial volume is relatable to a position and ideally ride seat within a ride car such as 50b or 50c. As prior mentioned and as will also be well understood, there is no technological requirement that the emitted exciter signals come from mat 20, as these same signals may also be emitted by a further adapted detector 18b. Furthermore, any of the prior related key variables or similar as well known by those skilled in the art of the various technologies, may be adjusted such that on any given ride car configuration, such as 50b or 50c, the variables optimize the efficient and cost-effective locating of guests 1 to car seats while meeting the system requirements and needs of the venue without departing from the scope of the present invention. With respect to the key variables and whether the exciter signals are emitted by further adapted detectors 18b or mat 20, any such preferences of the present invention should be considered as exemplarily rather than as a limitation.

Still referring to FIG. 7b, as prior discussed, pressure sensing mat 14-1 either encompasses the entire seating area of a car such as 50b or 50c, providing a pressure map for calibration and guest 1 location interpretation as prior discussed, or is sub-divided into individuated seats, such as 50a that each have their own guest restraint, or is otherwise sub-divided or limited into sub-seat sections like the teachings of 14-3-1 through 14-3-17 of FIG. 6b. As depicted in relation to ride car 50c, sensors 18b for sensing the unique guest 1 identity from e.g. an anklet wearable such as 16 may be in any sufficient arrangement, including a central and circular arrangement of detectors 18b as depicted, where it is important to understand that combined mat 20 (comprising a multiplicity of individually controllable antenna) emits exciter signals while the multiplicity of detectors 18b receive "chirps" from the guest 1's tracking RFIDs as implemented in any form in response to the signals for interpretation as to the location and seating of guest 1, and where the multiplicity of signal emitting antennas (either located within mat 20 or further adapted detectors 18b,) and signal receiving detectors 18b are controllably activated either in unison or in any individualized sequence for searching the ride car such as 50b or 50c for the location of wearables 16 in association with any other information such as pressure maps providing by any pressure sensors including within mat 20 on a ride car floor, or pressure sensors 14-1 or 14-2 affixed on a ride seat or back rest respectively.

Still referring to FIG. 7b, detectors 18b may either: 1) cause all antenna to simultaneously emit signals, or 2) cause one or more antennas to selectively emit signals in some sequence. For simultaneously emitted signals, all RFID wearables 16 chirp in response at substantially the same time and the multiplicity of detectors 18b are then able to analyze the received chirps in combination with the pressure maps provided by combined floor mat 20 and seat pressure sensor 14-1. The simultaneously emitted signals and therefor received chirps, along with the receiving of pressure maps from mat 20 and sensor 14-1, may be emitted and received in any timing sequence, such as but not limited to: a) continuously at some rate per second, starting at least before guests 1 are expected to enter the ride car (such as 50c,) continuing at least up to the time when all guests 1 are detected or indicated to be seated and secured, and optionally continuing throughout the entire ride duration, or b) at a fixed or limited set of times, where a fixed time might be the time when all guests 1 are detected or indicated to be seated and secured. The present inventor notes that the present invention provides several ways of determining when guests 1: a) begin boarding a ride car such as 50b or 50c, b) are finally seated and secured, c) the ride has commenced, d) the ride has completed, e) guests are disembarking the ride car and f) the ride car is empty of guests 1, other solutions of which are possible and combinable with the present teachings. Any apparatus and methods are sufficient for combining information with the herein taught apparatus and methods at least including RFID detectors 18b, combination mat 20 and seating mats 14-1.

Referring to both FIGS. 7a and 7b, as will be appreciated by those skilled in the art of theme and amusement park rides, there are many ways of interacting with guests 1 while they are on either a guided ride such as car 5b, a free-floating car 50c, or a free-ranging car (such as a go cart on a race track being self-directed by the guest 1,) where these ways include controllably emitting any one or, or any combination of: water (such as device 56*b*,) air, heat, light (such as device 56*a*,) sound, scent, etc., all of which may be actuated, timed, and otherwise controlled using any of the information described herein especially including the ongoing tracked position of a guest 1, within a tracked ride car such as 50*b* or 50*c*, with respect to the pre-known location of the effect, all as will be well understood by those skilled in automation systems.

For example, with respect to floating car 50*c*, the present inventor anticipates: 1) equipping each seat with some form of indicator lights such as LEDs that are plainly visible to the guest(s) 1, 2) tracking the location of the ride car 50*c* for example using cameras such as 55-1, 55-2, 55-3 and one or more markers 50*c-m* or natural ride car 50*c* features, such that an algorithm predicts which of the seats within the ride car 50*c* is most likely to get water dumped upon it by an upcoming water effect 56*b*, 3) continually activating the lights on the most likely seat as the ride car 50*c* proceeds down the waterway, 4) making some additional indication such as perhaps illuminating more LEDs or flashing the LEDs on the most likely seat as the water effect 56*b* draws near, and 5) providing a countdown clock with a short amount of time and a button to press for each guest 1 in the ride car 50*c* for indicating that an extra amount of water should be output by water effect 56*b*, such that the guest(s) 1 in the car 50*c* are effectively voting on how much water to dump on the most likely seat and therefore guest 1, where: a) the countdown is timed to end a certain short amount of time before the car 50*c* reaches the water effect 56*b*, and b) in that short amount of time after the countdown has expired and therefore after guest(s) 1 have indicated and can no longer change their indications, the ride car 50*c* may still randomly reposition such that a different seat than the most likely seat is actually the one that gets water dumped upon it and therefore the guest 1 sitting in it.

As the careful reader will see, there are a significant number of possibilities for this type of guest-ride interactivity that is enabled by the many novel features of the present invention to support tracking of an individual guest 1 in a known seat as a ride car is tracked along its ride path, whether the car is guided, free-floating, or free-ranging. What is important to note is that the ride effects can be further individualized to the guest 1 using any one of, or any combination of: 1) determining the guest(s) 1 path with respect to a ride effects, 2) retrieving additional guest information such as but not limited to the guest name for providing to a ride effect for output, 3) accepting real-time indications (such as pushing a button) from a guest on the ride for providing to a ride effect, 4) receiving information from a venue database such as eco-system 40 regarding the state of a park-wide game for which one or more of the guest(s) 1 is involved, including the status and points of an involved guest 1, and 5) altering the direction, timing, or quantity of output from a given effect based upon any of (1), (2), (3) and (4). Ride effects are understood to belong to the general category of venue effects devices, where venue effects devices include any automated or otherwise controlled device for outputting any one of, or any combination of light, sound, water, air, vibration, etc., where the venue effect device is either: a) permanently affixed to a venue structure or fixed or movable asset, where the affixed device is electronically and controllably movable in zero or more degrees of freedom, or b) free-floating under wireless control for moving the effect device to any number of positions and orientations with respect to the guest, where free-floating effect devices includes drones.

Regarding the use of the status and points from a park-wide game of a guest 1 on a ride to alter a ride effect, the prior example could be enhanced by: 1) providing a ring of squirting devices centered in the car 50*c* such that one squirting device is pointing at each seat in the ride, 2) determining if the guest 1 in the seat that is calculated to be positioned to have water dumped upon it from effect 56*b* has a certain status or points, and 3) if the guest 1 in the positioned seat has sufficient status or points, then causing the water effect 56*b* to not dump water on the positioned guest while then also causing each guest 1 in another seat to be squirted if that guest 1 also had prior selected to dump additional water on the positioned guest 1.

Referring next to FIG. 8*a*, there are depicted three guests 1*a*, 1*b* and 1*c* entering a ride car 50*d*, where guests A, B and C pass through an exciter field 20*ef* in succession prior to boarding the car 50*d*, the procedure herein being referred to as "serial car loading." Guest 1*a* has wearable 16 in a wristband form, guest 1*b* has wearable 16 in an anklet form and guest 1*c* has wearable 16 in a lanyard form, where all wearables 16 include a preferably passive RFID for detecting by the combination of exciter mat 20 and detector 18*b*. As prior mentioned, all forms of wearable 16 are acceptable for use with the present invention. Also, as prior mentioned, while FIG. 8*a* depicts exciter field 20*ef* as being emitted from mat 20 underfoot of guests 1*a*, 1*b* and 1*c*, this same field 20*ef* could be emitted by any arrangement of one or more further adapted detectors 18*b* for instance projecting field 20*ef* from the side or even from above guests 1*a*, 1*b* and 1*c* as they begin to board car 50*d*, all as is well known in the art. Unlike ride cars 50*b* and 50*c*, ride car 50*d* is shown as not including either a combined mat 20 or a pressure sensor mat like 14-1 or 14-2 placed upon the floor of the ride car 50*d*, and as such ride car 50*d* is not equipped to track the footsteps of guests 1*a*, 1*b* and 1*c* as they enter, walk through and sit down within car 50*d*. However, ride car 50*d* does include pressure sensors such as 14-1 (using any technology all as previously discussed) adapted to each of a multiplicity of available seats, for example "SEAT 01," "SEAT 02," "SEAT 03," and "SEAT 04." Each seat in ride car 50*d* is also viewable by an onboard camera such as 54, where camera 54 is depicted as having a field-of-view substantially limited to a single seat, SEAT 02. As will be appreciated by those skilled in the art of cameras and camera systems, any one or more cameras may be adapted with the proper lenses for viewing any of the one or more seats such as SEAT 01, SEAT 02, SEAT 03, and SEAT 04. What is most important is that when using cameras 54, either through physical arrangement and/or calibration, each of the multiplicity of ride car 50*d* seats is associated with some or all pixels in images captured by any one or more cameras 54, such that each of a ride car such as 50*d* seats either substantially comprise the entire captured image or comprise some cropped portion of the captured image, where the captured images serve either or both of two distinct purposes including: 1) determining when a guest 1 such as 1*a*, 1*b* or 1*c*, enters, sits, stands or exits a seat such as SEAT 01, SEAT 02, SEAT 03, and SEAT 04, or 2) capturing one or more images of guest 1 while in e.g. SEAT 03 during their ride, either time with ride effects, locations, sensations, etc. or upon guest 1 actuation, e.g. when they push a "selfie-button," where the captured images are then preferably uploaded to photo-video repository 40*b*, wherein FIG. 2 refers to this apparatus and functionality as spot tracking and photo system 60.

The present inventor anticipates that a guest-couple in adjacent car seats such as SEATs 02 and 03 will press the selfie-button in their ride car, for example while they are kissing, and that after the ride completes and the guests 1 disembark, they are sent proofs of these self-activated pictures to their venue app 2*a* that vibrates with a notification. The guest's 1 then decide using their venue app 2*a* if they would like to have immediately printed copies of their selected pictures, for example in a wallet sized format, that they can pick up in the shop associated with the ride or similar. This functionality is like the enjoyment people receive using a carnival picture booth as will be well understood by those familiar with amusement parks. The present inventor notes that the proofs are communicated to the guest 1 through the venue app 2*a*, and as such are not yet stored in the common photo area of the guest 1's cell phone. If the guest 1 chooses to purchase the pictures after viewing the proofs, the venue app 2*a* for example allows the guest 1 to choose: 1) a digital format where the pictures are then saved on their cell phone in the common picture folder, and/or 2) a printed form such as the wallet sized format prior mentioned. If the guest 1 chooses not to purchase the pictures, then it is possible that the venue app 2*a* at some point automatically deletes the proofs from internal storage on cell phone and venue app 2*a*.

The present inventor anticipates that the venue app will automatically charge the transaction according to the billing information provided in association with either of the guests 1 in the photo, and preferably the guest who is sitting in the seat associated with the pushed selfie-button. It is further possible for the present system to only enable the selfie-buttons in front of guests 1 who have included their billing information or in some way arranged for payment, all of which can be known to the venue database 40*a* and available as information within a ride car after the ride car has detected the presence and/or final seat of the guest 1, where the enabled selfie-buttons are for example indicated by lighting them up.

Still referring to FIG. 8*a*, as first guest A 1*a*, passes through exciter field 20*ef*, their tracking number is read off the extended range data on wearable 16 after which guest A will proceed to and select a seat, typically selecting that seat farthest away from the car entrance, in this example SEAT 01. Even if the second guest B 1*b* passes through exciter field 20*ef*, boards ride 50*d*, and sits in a seat before guest A, it is generally not possible for guest B to get in front of guest A such that guest B sits in a seat (like SEAT 01) that is farther away from the ride car entrance than the seat guest A ultimately selects, all as will be well understood by those skilled in the art of theme and amusement park rides. Typically, with serial car loading, each next guest A, B and C enter in sequence, select seats in sequence, where the selected seat is the first available seat farthest away from the ride car entrance. In this example, in order to successfully associate a detected tracking number from a wearable 16 with a ride car seat such as SEAT 01, SEAT 02, SEAT 03, and SEAT 04, all that is required is additionally determining which seats are ultimately occupied after boarding and prior to the start of the ride, and then to assign those occupied seats to the guests 1 in order of the farthest unassigned seat from the entrance associated with the next guest in order of entry onto the ride car 50*d*. For example, if sensors such as 14-1 or 54 determine that SEAT 01, SEAT 03 and SEAT 04 are occupied, while SEAT 02 is not, then with serial car loading guests A, B and C are assigned to the occupied seats 01, 03 and 04 in order, therefore A sits farthest away in SEAT 01, B sits next farthest away in SEAT 03 and C sits next farthest away in SEAT 04, all as will be well understood by those familiar with theme and amusement park rides.

In order to detect seat occupation, the present invention has disclosed several apparatus that may be used individually or in any combination, including: 1) seat sensors 14-1 using any technology and form for covering any sufficient area of a given seat for engaging guest 1, where the sensor is activated at least in part by the downward pressure of the guest 1 sitting upon the seat, 2) feet pressure sensors 14 either combined into a mat 20 or implemented without exciter 12, using any technology and form for covering any sufficient area of the ride car floor near to a given ride car seat for engaging guest 1, where the sensor is activated at least in part by the downward pressure of the guest 1 standing upon the floor in the sufficient area, 3) an imaging system analyzing images to detect the presence of guests 1 comprising camera(s) 54 for capturing images of ride car seat(s), or 4) any other sensor that changes state as a result of the physical presence of a guest 1 in a given seat.

Still referring to FIG. 8*a*, but now also in conjunction with FIG. 2, the present inventor notes that a preferred implementation of the spot tracking and photo system 60 of FIG. 2 includes any combination of technologies for: a) detecting that guests 1 are boarding a ride car, b) optionally tracking a guest 1 as they approach any given seat, c) detecting that a guest 1 has entered or set down upon a given seat, and d) then directing a camera to take pictures of the guest 1 at any time thereafter up through the time at which the guest 1 disembarks, including directing in coordination with events timed and planned along the ride or directing at the request of the guest 1 sitting in the seat, as for example in response to pressing a "selfie-button" or making a sound over a certain threshold. The present inventor also notes that guest cell phone and venue app 2*a* comprise guest 1 information such as a guest name, where it is also possible to include with the name a name pronunciation token(s), and that this guest name, pronunciation token(s) and or any other guest information desired by the venue can be uploaded by the device 2*a* to the venue database 40*a* for associating with a given combination of ticket & tracking numbers. Also, as prior mentioned, the parent patent of which the present patent is a continuation-in-part, teaches that guest tracking is a part of a global eco-system 40 and contributes critical guest tracking information in support of a park-wide game.

While additional details of this teaching can be found in the parent patent, the careful reader will note that if a guest 1 uploads to the venue database 40*a* personal information such as their name and even information indicating how to best pronounce their name, this information could then be made available to individual ride cars systems as herein taught that are preferably tracking the on-going location of each guest 1 as they occupy a specific seat in a ride car and where the ride car location is continuously tracked. The present invention anticipates that the ride car system as described will use then use the guest 1 name information especially with pronunciation to audibly "call out" to a guest 1 at some moment along the ride, where the spot tracking and photo system 60 is timed in coordination with the ride car and "call out" moment to then also capture a photo or video of the guest 1. The present inventor additionally prefers that this "call out" moment is a part of the park-wide game such that the call out includes a clue or otherwise some game information along with the guest 1's name. Furthermore, the present invention and parent patent together anticipate that a "secret message" video is output along with the "call out" name and clue, where the secret message is only seen by the guest 1 who is wearing special park glasses.

Regardless of whether the output video directed to the guest b is a secret message or publicly viewable, the video is preferred to be themed, for example a character like Harry Potter, that is calling out to the guest 1 right at the moment that the photo system 60 is capturing an image. In another variation, the timing of any output image or otherwise at least the guest 1's name is coordinated with a specific time on a ride, for example right before a major drop on a roller coaster, such that the guest 1 is further surprised while they are already in a heighted emotional state at the same time the image is captured. The present inventor notes that there are several companies such as Acapela Group of Belgium that offer services for creating customized digital voices, where some real individual like Daniel Radcliffe who played Harry Potter in the Harry Potter movie series, has their voice digitally mimicked such that this matched voice is then usable for speaking out any text-to-speech. As is also well-known in the animation industry, it is possible and preferably to have the animated character's mouth open appropriately to match their speech during the call out, which is referred to as "lip-synching." Furthermore, the output image is anticipated to optionally include at least the face of the guest as extracted from a guest 1 image uploaded via the cell phone and venue app 2a through which the guest was registered and confirmed. The extraction of the facial surface is a well-known image processing technique and is anticipated to be built into the venue app 2a such that the guest sees and approves of the extracted facial surface(s) prior to uploading to the venue systems for use in any of the ride effect devices that output images.

The present inventor anticipates that a feature of the preferred park-wide gaming system includes displays that output video of animated characters that respond directly to individual guest(s) 1 while potentially also coordinating with the spot tracking and photo system 60 to capture an image of the guest(s) 1 during the times of this output, where the displays are preferably the dual image displays taught in the parent patent and the output video of the animated characters are what the parent patent referred to as "secret messages," where otherwise the display is any display, where the animated characters are preferably themed to match the venue such as a theme park or theme park ride, where the animated characters preferably use a digital voice matching the voice already known to the public for that character, where the animation preferably uses a lip-synching method such that the characters mouth movements coordinate with the characters spoken words including a guest 1's name, and where the display system uses information about either the guest 1's proximity to the display or any other guest 1 tracking information all as taught herein or otherwise already known to the marketplace for timing or an any fashion adjusting the animated character such that the guest 1 receives an individualized experience including the output of the guest 1's own facial image.

There are then at least two ways to address audio messages to the guest 1 while situated in their ride seat, before, during or after the ride, including: 1) audible messages emitted within the ride surroundings and therefore heard by all guests 1 in a ride car, where the messages are emitted for example by animatronics or audio/video projections, or 2) audible messages emitted and largely confined to the ride seat and therefore substantially heard only by the guest 1 in the ride seat, where the messages are emitting for example by small directional speakers situated near the guest 1's head in the ride seat. The present inventor anticipates that a given guest 1 is engaging in a park wide game and while on the ride is given audible instructions to remember what a certain animatronic or projected character says or does, and that as soon as the guest 1 is detected leaving the ride their cell phone and venue app 2a vibrates and then asks them a question for which they must provide the answer, perhaps within a limited amount of time. As the careful reader will see, many variations of gaming are possible especially when including the display technology of the parent patent that teaches means for providing private visual message or images to an individual guest wearing special park glasses.

Referring still to both FIG. 8a and FIG. 2, the present inventor notes that in addition to the biometric ID type of "fingerprint" discussed in detail with respect to FIGS. 1, 2 and 3, a venue such as a theme park might also request either: 1) facial images captured using the cell phone and venue app 2a, or 2) facial image meta data sufficient for supporting facial image matching, where for example the meta data is a set of facial features for use in any facial recognition algorithm that are extracted by the venue app 2a during the analysis of a captured facial image of the guest, all as will be well understood by those skilled in the art. What is important to note is that the guest 1 during the registration step (see especially FIGS. 2 and 3) that is completed prior to entering the venue, captures and uploads to venue database 40a via device 2a either their facial images or preferably only the facial image meta-data, such that any spot tracking and photo system 60 within the venue, for example as taught in FIG. 8a, can retrieve the set of facial images or facial meta data for each guest 1 detected as entering in a given ride car, using for example the detected tracking number of the guest 1 wearable and then associating this with the guest 1 ticket number and therefore also biometric data. Using this information, cameras 54 in spot photo system 60, for example on the ride car 50d, can determine or confirm each guest 1 in each ride seat by capturing current facial images of the guest for facial recognition comparison with the set of facial images or facial meta data stored in the venue database 40a.

Referring next exclusively to FIG. 8a, tracking a guest 1 to a particular seat in ride car 50d has multiple solutions are herein described. One alternate for serial car loading is to simply track guest 1 footsteps using a pressure sensor 14 placed upon the floor of the ride car 50d, thereby obviating any need for seat pressure sensors 14-1 or cameras 54, at least cameras as used for seat occupancy detection. As the careful reader will note, as guests 1 A, B and C are detected passing through exciter field 20ef, their feet may be tracked by a pressure senor 14 in temporal sequence as each guest A, B and C walks down the short aisle of the ride car 50d to take a seat such as SEAT 01, 02, 03 or 04. Since guests A, B and C cannot effectively pass each other in their footsteps, it is a straightforward object tracking task to follow the spatio-temporal sequence of pressure data creates by floor pressure sensor 14 and determine for example in front of which SEAT 01, 02, 03 and 04 each guest A, B and C stopped at, all as will be well understood by those familiar with software systems and especially object tracking algorithms. Regardless of the method used for confirming a guest 1 has set upon a particular ride seat, these same sensors can provide critical safety information for example by creating an alert signal if any guest 1 attempts to or does leave their seat during the ride, all as will be well understood by those skilled in the art of theme and amusement parks.

Referring next to FIG. 8b, there are depicted three guests 1a, 1b and 1c entering a ride car 50e, where guests A, B and C pass through an exciter field 20ef in succession prior to boarding the car 50e, the procedure herein being referred to as "parallel car loading." (The present inventor notes that in some situations it is conceivable that a ride car such as 50e has multiple entry points for guests A, B and C, in which case each entry point would be equipped with one of the herein taught apparatus and methods for detecting the extended data tracking number in wearable 16 worn by guests A, B and C as they cross any of the available entry points, where for example the apparatus and method are any of: 1) a detector 18a or 18b to detect an exciter field 20ef emitted by either of mat 12 or mat 20 respectively, or 2) a detector 18a or 18b to detect an exciter field 20er, where the detector 18a or 18b is further adapted to also emit field 20ef. As taught in relation to FIG. 8a, guest 1a has wearable 16 in a wristband form, guest 1b has wearable 16 in an anklet form and guest 1c has wearable 16 in a lanyard form, where all wearables 16 include a preferably passive RFID for causing reflected "chirps" in response to the exciter field 20ef. As prior mentioned, all forms of wearable 16 are acceptable for use with the present invention. Also, as prior mentioned, while FIG. 8b depicts exciter field 20ef as being emitted from mat 20 underfoot of guests 1a, 1b and 1c, this same field 20ef could be emitted by any arrangement of one or more further adapted detectors 18b for instance projecting field 20ef from the side or even from above guests 1a, 1b and 1c as they begin to board car 50e, all as is well known in the art.

Still referring to FIG. 8b, like ride car 50d, car 50e preferably includes pressure sensors 14-1 on all SEATS 01, 02, 03, 04, 05 and 06, as well as one or more cameras 54 for observing and capturing images of all SEATS 01, 02, 03, 04, 05 and 06. Unlike ride car 50d as depicted, car 50e also includes pressure sensor 14 on the floor of the ride car. As prior mentioned, seat pressure sensors 14-1 can be of any technology and form. What is most important is that sensors 14-1 cover a sufficient area of a given seat for engaging the guest 1, where the sensor is activated at least in part by the downward pressure of the guest 1 sitting upon the seat. Likewise, floor pressure sensors 14 use any technology and form, and what is most important is that sensors 14 cover any sufficient area of the ride car floor near to a given ride car seat for engaging guest 1, where the sensor is activated at least in part by the downward pressure of the guest 1 standing upon the floor in the sufficient area. Also, camera(s) 54 may be of any arrangement and with any lensing system, for example it is well known that a single camera 54 could be placed in the center of ride car 50e for simultaneously viewing all seats in car 50e, where the single camera 54 is located at a sufficient height, pointed upward and equipped with what is generally referred to as a 360 degree lens, such as sold by several companies including Sphere Optics Company of New Hampshire, and BubblePix of London, England, all as will be well understood by those skilled in the art of camera systems. It is also possible to use a single camera enclosure with multiple integrated sensors such as the "Ozo" sold by Nokia, where this type of camera uses multiple sensors but outputs a single image dataset and is typically used for VR systems, all as will be well understood by those familiar with cameras and VR technology. Another arrangement of multiple individual cameras 54, each situated so as to view a single car seat, is as depicted in the present figure. What is most important is that an imaging system for analyzing images to detect the presence of guests 1 comprise camera(s) 54 for capturing images of ride car seat(s), where for example the imaging system is preferably spot tracking and photo system 60 of FIG. 2 that also functions to take photos and videos of guest(s) 1 during their ride, all as prior taught in detail especially in relation to FIGS. 2 and 8a.

Still referring to FIG. 8b, as will be evident from a careful reading of the present invention and especially FIG. 8a, what is most important is that any of ride cars such as 50a, 50b, 50c, 50d and 50e sufficiently determines which of multiple possible guests 1 is sitting in multiple possible seats, for which many various apparatus and methods have been herein disclosed. As the careful reader will also see, ride car 50e represents the most complex of all cars 50a, 50b, 50c, 50d and 50e for making such a determination. Using the most complex ride car 50e as a representation of what apparatus and methods are useable for identifying and associating a guest 1 with a car seat on all possible ride cars, car 50e as depicted could perform this necessary and sufficient determination using a guest boarding detection system for identifying guests 1 as they board the ride car, for example mat 20 and detector 18b or its alternatives, combined with any one of, or any combination of the following preferred solutions for determining the final guest-to-seat association including: 1) seat (or back rest) pressure sensors 14-1 (or 14-2 respectively) for determining when a guest 1 sits upon a given seat and floor pressure sensors 14 for tracking an identified guest 1 to the given seat, such that the last known guest to be present in front of a seat when it is sat upon is the guest 1 assigned to the seat, 2) floor pressure sensors 14 for tracking an identified guest 1 to a given seat and sensor means for identifying that the ride car 50e is loaded and therefore all guests 1 are seated, such that the last known seat to which a given guest 1 was tracked is the seat that guest 1 is assigned to, or 3) an imaging system such as spot tracking system 60 comprising some arrangement of camera(s) 54 for capturing images of seats 1 and performing facial recognition to identified guest(s) 1, where the short list of tracking numbers of guest(s) 1 located within the ride car as determined by the car boarding detection system is used to retrieve from venue database 2a pre-stored facial images or preferably facial meta-data regarding each of the possible guest(s) 1 for use in performing facial recognition and therefore final guest-to-seat association.

Still referring to FIG. 8b, regarding the use of floor pressure sensors 14 for tracking the movement of an identified guest 1 as they board and walk about in a ride car such as 50e, as will be clear to those skilled in the art of object tracking, it is beneficial to understand that the foot pressure data is spatio-temporal in nature. Using this understanding it is possible to connect each next foot step of a first entering guest A, B or C with their prior footstep, especially when understanding that second entering guest B, C or no one respectively, is unlikely to enter between the feet of a first guest at the same time and place. It is then possible to create a vector of points representing the space and time sequence of a guest 1's footsteps, where the vector ultimately stops in front of a given SEAT 01, 02, 03, 04, 05 or 06 and can therefore be interpreted as the guest-to-seat relationship.

As the careful reader will see, other combinations of the herein taught apparatus and methods are possible for sufficiently determining the final guest-to-seat association, including for example using the imaging system 60 by itself without also using a guest boarding detection system for identifying guests 1 as they board the ride car, for example mat 20 and detector 18b or its alternatives. In this example, imaging system 60 would capture facial images of each guest 1 sitting in a seat and then use these one or more images to search the venue database 2a of known guest 1 facial images in order to select the best match. Other system information could be used to further confirm a given semi-recognized guest 1, where the given semi-recognized guest 1 is a guest 1 whose captured image from a camera 54 yields two or more potential matches in the list of all guests 1 known to be at the park as found in venue database 2a. The other system information usable for confirming a given semi-recognized guest at least includes any one of, or combination of: 1) checking other recognized and semi-recognized guest(s) 1 also determined to be present or possibly present respectively on the car such as 50e, so as to determine if any of these other recognized or semi-recognized guests 1 are related to the given semi-recognized guest and if a relationship is confirmed, selecting the one of the two or more potential matches for the given semi-recognized guest 1 that is related to other recognized or semi-recognized guest 1, where guests 1 are considered to be related if they are found in the venue database 40a associated with any one of, or any combination of the same application ID, purchaser info, authentication code, group code, or other unifying datum, or in any way otherwise known within database 40a (or data relatable with database 40a) to be visiting the venue as a group, and 2) checking the last known location of a given semi-recognized guest 1 and using some formula at least including the estimated time between the current ride car location and the last known location to select a best match for the given semi-recognized guest 1 from amongst the two or more potential matches.

Referring next to FIG. 8c, there is shown a flow chart reviewing the preferred steps for associating a ride seat with a guest 1, where the description of each step in the flow chart is considered to be self-explanatory given the teachings thus far provided.

Referring next to FIG. 9, there is shown steps A through E when using an implementation of the present teachings for a business convention. In Step A, attendee 1 acquires a smart ticket 2 through any of several means including: 1) in mail, 2) at kiosk, or 3) from venue host-register. What is most important is the attendee 1 download the venue app onto their cell phone, the combination forming 2a, and preferably that the venue issue either a paper ticket 2b that preferably has been further adapted to include a passive RFID and therefore extended range data 2c-3 such that paper ticket 2b can also be scanned by readers 6 at extended distances, all as previously taught (see Paper Ticket (C) in FIG. 4.) It is also possible that the venue issues an electronic ticket 2c including both close range data 2c-1, 2c-2 and extended range data 2c-3 or 16, all as prior taught especially in relation to FIGS. 1, 2, 3 and 4. Step A can be done on or off the venue premises. In Step B, attendee 1 performs self-registration as herein described especially in relation to FIGS. 2 and 3. During self-registration, the attendee 1 alternately provides a self-image for biometric data as captured using the cell phone and venue app 2a rather than, or in addition to providing their fingerprint. As previously described, this facial image of the attendee is the either transmitted to venue database 40a as-is, or is first converted into facial meta-data that is uploaded to database 40a thus preserving attendee privacy. As will also be evident from a careful reading of the present invention although not presently depicted, while attendee 1 may perform this registration process on the venue premises, the attendee 1 is effectively within a ZONE2 that is located outside of a venue pre-area ZONE3. Like Step A, Step B can be done on or off the venue premises.

Still referring to FIG. 9, in Step C attendee 1 is confirmed in a variation of the teachings with respect to FIGS. 2 and 3, where guest 1 used cell phone and venue app 2a to self-confirm by inputting and matching their fingerprint. In Step C of FIG. 9, although not shown, is it imperative that attendee 1 not be able to pass through the confirmation location (i.e. ZONE3 of FIG. 3) without actually being confirmed. As prior taught although not depicted in FIG. 9, Step C could begin by having attendee 1 scan their ticket such as 2b in order to pass through an access point 5a-1 (see FIG. 3) for entering into ZONE3 where confirmation is performed. In this case, it is also assumed that ZONE3 is confined and that the only way out for attendee 1 is to either: 1) be successfully confirmed and then pass through the second access 5a-3 to enter the venue (ZONE4 of FIG. 3,) or 2) exit ZONE3 through an access point 5a-2. However, in FIG. 9 the present inventor is teaching a variation of the description in FIGS. 2 and 3 with respect to ZONE3. Specifically, ZONE3 is the location of mat 12 and assumed to be a chokepoint monitored by a venue staff member. In this case, all registered attendees are lining up just prior to stepping onto exciter mat 12. Once upon the exciter mat 12 the attendee stops, preferably seeing a visual indicator such as a red light while possibly also being watched by the venue staff. Once stopped upon mat 12 that emits an exciter field, decoder 18a receives RF reflections or "chirps" off the RFID on ticket 2b detecting the unique attendee tracking number, all as prior taught herein. Using this unique tracking number, the venue system then retrieves either facial data or facial meta-data associated with the attendee 1. The venue system then also directs camera 55 to image the attendee at least capturing their face for facial recognition using the either facial data or facial meta-data retrieved from the venue database 40a. Once confirmed, preferably the attendee sees a green light and then proceeds into the venue (ZONE4 74 of FIG. 3,) with or without a venue staff watching the ZONE4 entrance chokepoint.

Still referring to FIG. 9 and Step C, the careful reader will note that mat 12 for emitting an exciter field could also be a combined mat 20 that also senses pressure and therefore the moment at which an attendee arrives for confirmation. Using this information, the exciter field could then be selectively emitted once the arrival pressure is detected. As will also be understood, there are many alternate configurations for scanning extended range RFID as both prior discussed and as well known in the art. For example, decoder 18a can be further adapted to also emit the exciter field thus obviating the need for a mat 12 or 20, where the further adapted decoder 18a could be in any proximate position with respect to ZONE3 for scanning the attendee 1 including to the side or above the attendee 1. What is most important is that the shape of the exciter field (depicted as 20ef in FIGS. 8a and 8b) is shaped in such a way so as to cover only a limited area where the attendee 1 is directed to stand during confirmation so as to avoid detecting multiple other RFID's from other attendees 1 presumably waiting nearby to also be confirmed.

The careful reader will also note that mat 12 or 20 combined with detector 18a could be fully eliminated, where attendee 1 is for example using their cell phone and venue app 2a as a virtual ticket and is not otherwise wearing extended range readable data 2c-3. In this case, during registration using device 2a attendee 1 has uploaded their facial data or preferably meta-data to venue database 2a to serve as a "template" such that when attendee 1 walks to or by camera 55 the system captures their facial image and uses this to perform facial recognition against all known templates in database 40a, rejecting the attendee 1 if an insufficient match is found. As those familiar with facial recognition algorithms will understand, there are two basic concepts referred to as FAR and FRR. FAR is known as the "false acceptance rate" while FRR is known as the "false recognition rate." False acceptance is when the system incorrectly authorizes a non-authorized attendee, due to incorrectly matching the facial image captured by camera 55 with a template found within venue database 40*a*. Typically, this happens because the matching algorithm is not strict enough, and/or not considering enough facial features. In this case, by using a method for also inputting the attendee 1's ticket number or tracking number, this second form of information can be used to ensure that the facial recognition matches the facial data/template for the valid ticket number, thus reducing the FAR. As depicted in FIG. 9 and preferred, one apparatus for collecting the tracking number to improve FAR is the exciter mat 12 (or 20) in combination with detector 18*a*, or some prior mentioned and well-known RFID reader alternative. Another apparatus for determining the ticket number (and not the tracking number) for example as printed on a paper ticket 2*b* would be a scanning station that reads a bar code or QR code, where the attendee scans their paper ticket 2*b* while also getting their facial image taken by camera 55, the combination of which will lower the FAR rate. If the attendee 1 has an electronic ticket 2*c*, then a scanning station could also be provided using a NFC reader, all a prior taught. What is most important to understand is that facial recognition alone will have a higher rate of false acceptance than combining facial recognition with ticket validation, hence confirming that either a detected ticket number of tracking number known to be in the current possession of the attendee 1 also matches the accepted facial recognition.

Still referring to FIG. 9 and Step C, false recognition is when the system incorrectly rejects access to an authorized person, due to failing to match the facial image captured by camera 55 with the template of attendee 1. Typically, this happens because the matching algorithm is too strict, and/or considering to many facial features. As those skilled in the art of facial recognition systems will understand, optimizing a system to minimize the FAR tends to increase the FRR, and vice versa. As those skilled in the art of biometrics will also understand, and as will be understood by a careful reading of the present invention, by providing two forms of verification (i.e. both a biometric such as a facial scan of fingerprint) as well as a valid ID (such as a ticket number or tracking number) it is possible to lower the FRR rate by for instance relaxing the number of feature points that must match for a given facial image as captured by camera 55 to be considered as matching a template of the attendee associated with a scanned, valid and matching ID (e.g. ticket number or tracking number.) The present inventor also notes that in many instances facial recognition is highly dependent upon several factors including: 1) lighting differences between when the template image(s) were captured and when the access-grant image is captured by camera 55, 2) changes to the attendee face between when the template image(s) were captured and when the access-grant image is captured by camera 55, and 3) differences in camera settings and features including resolution, color representation and the pixel-to-facial area ratio between when the template image(s) were captured and when the access-grant image is captured by camera 55. The present inventor notes that the present teaching provides for the cell phone and venue app 2*a* to use either the internal GPS or some LPS such as forming a Bluetooth connection at the venue (which is therefore within 30-100 feet) or a wi-fi positioning system, where either the GPS or LPS ensures that attendee 1 is within a ZONE2 that is on the venue's premises and has sufficient light similar to the lighting that will be available at Step C for camera 55. The venue app 2*a* will also ensure that attendee 1 is registering within a certain amount of time prior to attempting to enter, for example 15-30 minutes. As those familiar with facial recognition will understand, enforcing that as a part of self-registration the attendee 1 scan their face on the same day and on premises in the same lighting as camera 55 is expected to help reduce those prior stated negative factors that tend to reduce the accuracy of facial recognition. Therefore, while facial recognition alone is possible for venue admittance checking, the present inventor prefers a biometric check combined with a ticket/tracking number check.

Furthermore, when using the biometric of a finger print as discussed especially in relation to FIGS. 2, 3 and 4, the present invention requires a confined ZONE3 where the guest 1 uses their own cell phone and venue app 2*a* to verify that the currently entered fingerprint matches the original fingerprint provided during registration. If there is no match than the guest 1 must leave through a ZONE3 exit that for example logs their attempt and also resets the status on their smart ticket 2 from "LIVE" back to "REGISTERED." In this prior teaching, the guest 1 can register at any time even within ZONE3 although it is preferred that they register prior to ZONE3 in a ZONE1, all as previously described. However, when using the biometric of a facial scan as discussed in relation to the present FIG. 9, the present invention uses a venue mechanism (i.e. camera 54) to confirm the attendee 1, rather than allowing the attendee to use their own cell phone and app 2*a*. In this case, what is preferred is that self-registration ZONE1 (which can normally be anywhere including off premises at any time including days before a venue event,) is combined into ZONE2 (which is restricted to on-premises, at least the day off the venue event if not within for example 15-30 minutes of entering ZONE3 for confirmation.) As prior taught, the cell phone and venue app 2*a* can be set by the venue as to when and where each ZONE 1, 2, and 3 activities of REGISTERING, ENABLING and CONFIRMING, respectively are allowed. By requiring that the attendee 1 register just prior and near to entering ZONE3 for confirmation, where registering includes capturing a facial image, the facial image is less likely to be affected by changes in at least the attendee's 1 face over time or lighting.

Still referring to FIG. 9 Step C, the present inventor anticipates that the venue app 2*a* enforces ZONE1/ZONE2 self-registration and enablement for a guest 1, where this guest 1 is only allowed to manage a single ticket with their cell phone and venue app 2*a*. The guest 1 is still preferred to have at least a paper ticket 2*b*, but in any case, a paper ticket 2*b* or electronic ticket 2*c* that includes extended range datum, such as the tracking number. In this variation, ZONE3 that is normally confined, is now limited to only access point 5*a*-3, as access point 5*a*-1 is removed such that any attendee 1 after self-registering in the ZONE1/ZONE2 location as detected by the venue app, may then proceed freely to a modified venue access point 5*a*-3. Preferably, at modified access point 5*a*-3 the guest walks up to and stands within an exciter field (20*ef* of FIGS. 8*a* and 8*b*,) such as emitted by a mat 12 or 20, or by a further adapted detector 18*a*. Once standing within exciter field 20*ef*, which preferably is clearly marked, the attendees progress forward is block using any appropriate method including: 1) a red light, 2) a mechanical device such as a turnstile that will not turn or a gate that remains closed, or 3) a sign with instructions and a person standing in watch. Regardless, once within the exciter field 20*ef*, the attendee's 1 tracking number is read and this is used by the venue's access management system to determine the unique app ID of the venue app 2*a* running on the attendee's 1 cell phone, along with any other appropriate device pairing information, such that the venue system then captures an image of the attendee with camera 55 which is transmitted either as-is to the attendee's 1 venue app 2*a*, or first converted to facial meta-data by the venue system, where the meta-data is then transmitted to the attendee's venue app 2*a*, such that the venue app 2*a* then performs the facial comparison and sends back a confirmation acceptance or rejection.

Still referring to FIG. 9 Step C, this last alternative off-loads processing to the attendee's cell phone as well as maximizing the attendee's privacy, such that it is even possible that the camera 55 is set up as a shared network device that the venue app 2*a* running on the cell phone automatically connects with and operates to capture a self-image, thus completely assuring that the attendee's facial image is never stored as data on the venue's access management system. Alternatively, once the attendee 1 has stopped within the exciter field, an indication could then be given to attendee 1 to capture a self-image using their cell phone and venue app 2*a*, where the indication could be any one of, or any combination of a visual or audible cue, but where preferably the attendee's cell phone 2*a* vibrates and the venue app instructs the attendee 1 to capture the self-image. After capturing, the venue app 2*a* confirms that the attendee's current facial image matches registration and is either confirmed or rejected.

What is most important to see is that the cell phone and venue app 2*a* enforces that: 1) each attendee 1 self-registers in a ZONE1 or ZONE2 prior to entering a ZONE3, where self-registration includes entering any and all information requested by the venue within a controlled area at a set time, where the controlled area is known based upon the cell phone and venue app's use of either GPS or LPS, and where self-registration locks a single ticket number/tracking number to a single attendee 1 and includes capturing biometric information such as a facial image and/or a finger print, 2) each attendee stops at a specific ZONE3-to-ZONE4 access point 5*a*-3 (with or without passing through a ZONE2-to-ZONE3 access point 5*a*-1) where the extended range data from the attendee's paper 2*b* or electronic ticket 2*c* is automatically scanned providing the venue access management system with the attendee's 1 tracking number, 3) confirmation biometric data is received by the venue app for comparison with the biometric data entered during self-registration, where the confirmation biometric data is preferably a self-image captured by the attendee standing within a ZONE3 access point 5*a*-3 using their cell phone and venue app 2*a* such that all personal and private data remains on the attendee's cell phone and venue app 2*a*, 4) the venue app 2*a* provides confirmation to the venue access management system in some manner including any of: a) updating the ticket status on an electronic ticket 2*c* that is then scanned by an NFC scanner within access point 5*a*-3, updating the ticket status within the venue app and then communicating this status electronically to the access point 5*a*-3 or the venue access management system for example using any communication technology such as NFC, wi-fi or Bluetooth, and 5) the attendee 1 is then prompted and/or allowed passage through access point 5*a*-3 into the venue (or sub-venue as the careful reader will understand.)

As the careful reader will also understand, if the attendee's ticket is for a multi-day event, then the registration that happens on day 1 does not necessarily have to be repeated, and as such on each next day the attendee simply proceeds direction to confirmation at access point 5*a*-3. The present inventor anticipates a further variation where an attendee 1 acquires their paper ticket with extended range data (such as a UHF RFID) and then proceeds directly to an access point 5*a*-3, without any requirements for pre-self-registration. Upon arriving at access point 5*a*-3 for the first time, 1) the system scans the extended range data RFID and transmits this tracking number through any wireless communication means to the attendee's venue app 2*a*, possibly along with the associated ticket number as known to the venue that provided the ticket to the attendee, 2) the venue app 2*a* directs the attendee to capture a self-image which is then used as the registration image and the venue app then sets the ticket status to confirmed, and 3) the access point 5*a*-3 allows the attendee 1 to pass into the venue. Every next time the attendee desires to pass through another access point 5*a*-3, for example upon a next day of a conference or upon entering a sub-venue such as an exclusive meeting or presentation room, they are stopped and the venue app 2*a* either detects its location at access point 5*a*-3 using any of GPS or LPS technology, or the attendee's path is blocked and the venue app 2*a* is wireless connected to the access point 5*a*-3 and receives information that the attendee's tracking number has been scanned for possible admission, such that the venue app 2*a* then prompts the attendee 1 to capture a self-image with then must match the image first captured and associated with the tracking number and/or ticket number during self-registration.

Still referring to FIG. 9 Step C, the following variation of the present invention minimizes the technology costs required by the venue, the attendee gains access to a secured location that is manually staffed, where: 1) the attendee 1 either acquires a paper ticket and scans its bar code or similar using their cell phone and venue app 2*a*, or completes a wireless transaction and receives their ticket number electronically, where after in any approach their ticket number is help as data within their venue app 2*a*, 2) the attendee 1 then proceeds to any venue (or afterwards sub-venue) entrance that was prior taught as an access point 5*a*-3 but is now simply a staffed entrance where no extra equipment such as access point 5*a*-3 is required, 3) the attendee 1 using the venue app 2*a* captures a nearby posted image of a QR Code or similar representing a unique identification of the area into which the attendee is attempting to enter, 4) the venue app 2*a* confirms using either internal information or information obtained through a wireless connection to the venue access system, that the attendee 1's ticket number stored within their cell phone and venue app 2*a* permits access to the secured area, and a) if access is permitted prompts the attendee 1 to capture a self-image, where: i) if there is no self-image yet associated with the ticket number than the venue app 2*a* associates this image and sets the ticket status to "CONFIRMED," or ii) if a self-image has already been registered to the ticket number than the venue app 2*a* ensures that the newly captured image matches the first self-register image prior to setting the ticket status to "CONFIRMED," and b) if access is not permitted for the attendee's ticket number or if the attendee 1's current image does not match a first registration image, than the ticket status is set to some other value than "CONFIRMED," such as "DENIED," 5) if the ticket status is set to "CONFIRMED" then the venue app 2*a* outputs the just captured image of the attendee 1 along with some visual indication of acceptance—for example a check mark or a boarder around the self-image that is green, and 6) where the attendee 1 then holds up their cell phone and venue app 2*a* displaying their image with the visual indication of acceptance such that the staff member manning the entrance can visually confirm the attendee's acceptance and then allows the attendee to pass into the restricted area.

As the careful reader will see, rather than, or even in addition to capturing the facial image, this same sequence can work using a finger print, where the final display of acceptance can be some set image, and where this set image may even be communicated to the venue app 2a via either a wireless connection with the venue management system or as encoded for example within the secured areas QR code that was original scanned in prior step (3).

Still referring to FIG. 9 and now Step D, once attendee 1 has passed confirmation Step C and entered into the venue (ZONE4 74 in FIG. 3,) it is preferred that the venue have various choke points for monitoring the flow of attendees 1. These chokepoints are essentially "transparent" to attendee 1 in that they do not realize that their extended range data found on ticket 2b or 2c has been scanned. As prior discussed, there are several herein taught variations for chokepoint RFID scanning and these are similar to those technologies currently available in the market place of detecting runners passing a chokepoint in a race, as will be well understood by those skilled in the art of RFID systems. While it is possible to transparently track the attendee 1's cell phone using for example a wi-fi positioning system, these are problematic due to the number of wi-fi nodes required and the resulting interference patterns created by the venue's permanent and temporary structures, such as would be found in a large convention hall with many ad-hoc booths. Furthermore, while wi-fi position provides a current x, y location for each attendee 1 within a certain accuracy, it is sufficient for many analytics to simple track the presence of an attendee 1 in a confined location or passing a chokepoint. For example, the chokepoint of Step D could be an entry into a separate and confined conference room where a talk is to be given.

The present inventor also teaches that in a convention hall setting it is typical that a vendor is given some for example rectangular space. As is eluded to in Step E, the present invention teaches that the entire perimeter of that rectangular space is monitored by extended range data readers such that all attendees 1 entering and then ultimately exiting the rectangular space (e.g. a vendor's booth) are detected, and therefore the vendor may receive this and all related information for analytics and sales purposes. Where the information minimally includes each attendee with related information as collected by the venue app 2a, for example including name, company, title, etc. along with the date/time of perimeter entry and exit. The present inventor additionally prefers that the rectangular (or any geometric shape) area is covered with floor pressure sensors 14, such that all of the combined movements of any attendees 1 walking and standing within a rectangular area (such as a vendor booth, a venue information area, a venue store, etc.) are captured.

As will be well understood by those familiar with data analytics, this pressure map provided by mat 14 provides significant information for understanding traffic flow, such as which displays are causing attendees to linger and for how long, how long an attendee 1 lingers to watch a live presentation, etc. It is also possible to sub-divide an area of pressure sensor flooring 14 to be associated with or assigned to some actuated device for outputting some effect or information. For example, in a convention setting, the sub-divided area might be in front of a display showing company product information where the video being output typically loops continuously, as will be well understood by those familiar with trade show booths. Using the present teaching, and for example, if a video is looping and no attendees 1 are detected to be present, then when a next attendee is detected within the sub-divided display area, rather than simply continuing the display loop as is typical, the loop could be reset back to the beginning. As the careful reader will see, there are many possibilities for using the real-time pressure map, both with and without parameters for sensing attendee 1 identity, in order to cause any controllable device to alter, redirect, restart, etc. its potential behaviors and outputs. The present inventor has provided many examples for different types of pressure sensors, all of which are sufficient. What is most important is that an area is any one of, or combination of: 1) monitored on its perimeter to detect attendee 1 ingress and egress by reading extended range data, and 2) monitored on its interior using floor pressure sensors.

Still referring to FIG. 9 and Step E, in U.S. patent Ser. No. 09/345,593 entitled DEVICE FOR DETECTING PLAYING PIECES ON A BOARD, Bulsink teaches a matrix of transmit and receive coils for detecting resonance coils placed on the bottom of movable game pieces, where each resonance coil was electronically distinguishable such that the system is able to track each game piece within the row/col squares of the matrix. The present inventor prefers additionally including an inductive matrix 15 either below or above pressure sensor mat 14, where employees 1e (such as working for the venue or a vendor in the case of a trade show, etc.) wear passive resonance coils 15c within or affixed to their shoes such that the coils 15c are in sufficient proximity of inductive matrix 15 so that they can be accurately sensed and located. As will be well understood by those skilled in the art of at least conventions, the tracking of employee 1e movements as provided by matrix 15 and coils 15c provides valuable data by itself and even more so when combined with the attendee 1 tracking information provided by pressure mat 14 and chokepoint readers 12 and 18a (or alternatives as herein taught.) In the case where the area to be tracked is for example limited only to the employees, then matrix 15 and coils 15c worn by employees, for example on the bottom of their shoes, is sufficient and hence pressure mat 14 is not necessary. The present inventor anticipates that this type of employee movement tracking floor has many uses within industry and business as this provides continuous information on the location of each employee that has many valuable uses. It is also possible for security reasons that employees 1e wear badges that are exactly like either of the paper 2b or electronic ticket 2c in functionality for restricting and monitoring access to confined areas within a building. The employees would then use these badges to progress through any of ZONEs 2, 3 and 4 as herein described for guests 1, where ZONE 1 can be inside or outside of the venue/building premises and is necessary only at the times of initial registration or re-registration.

The present inventor notes that employees can also be mandated to carry a cell phone with venue app 2a, essentially acting as a Virtual Ticket (B) (see FIG. 4,) where they must then confirm their identity by self-inputting biometric data such as fingerprints and/or facial images within and confined area ZONE3 prior to entering a restricted area ZONE4, all as will be well understood by a careful reading of the present invention. Such a system would also be beneficial for schools or military compounds wherever unmanned security and transparent people tracking is desired. The present inventor also anticipates that a modern stage for acting or otherwise choreographed performances would benefit by using at least matrix 15 and coils 15c on the actor's feet, where this actor-tracking floor can then be used to both for practicing and perfecting choreographed movements and for example causing interactive effects, whereby the presence of an actor at a given location causes the actuation of a device, including lighting, sound, robotic curtains, etc. As those familiar with imaging systems will appreciate, this type of people tracking is not susceptible to ambient lighting situations or occlusions, all of which have significant benefits.

Still referring to FIG. 9, using pressure sensor flooring 14 it is further possible to correlate the real-time location data of attendees 1 with real-time activities taking place within a given tracked area, for example including: 1) a live-recorded or pre-recorded presentation, where the presentation can be replayed along with a graphic depicting attendee 1 information such as but not limited to: a) how many attendees are present, entering and exiting moment by moment during the presentation, b) how long does the average attendee linger, additionally as a function of when the attendee first arrives, c) where for the live-recorded or pre-recorded presentation, statistics are created by date/time along with total venue attendees that show attendee traffic and attention related to key moments in the repeating presentation, amongst other things describing how many attendees received a specific message, and d) how long do the attendees linger after a presentation. As the careful reader will see, the apparatus and methods taught herein have significant value for providing at least: 1) efficient self-serve and biometrically confirmed access to a venue and secured areas, 2) traffic and movement data throughout fixed confined areas and moveable confined areas such as a vehicle or transport mechanism, and 3) individualized information about a guest/attendee 1 for causing automatic responses by a venue output mechanism such as a display, sound system, actuated mechanism, etc.

Referring now to FIG. 10, there is shown a flow chart of a variation of present invention as used in ZONE1 71, ZONE2 72, ZONE3 73 and ZONE4 74, where the variation adds more security to prevent ticket theft. All of ZONEs 71, 72, 73 and 74 remain as described especially in relation to FIG. 3, where the ZONEs represent physical areas positioned with respect to ZONE 74, the confined venue into which the guest 1 would like to gain unmanned access. As with the prior teachings, once a guest 1 has been permitted into ZONE 74, there may be additional sub-venues, and sub-sub-venues, etc. all as prior described, where essentially each interior, nested sub area is a confined space (representing a "ZONE 4") through which a guest 1 must enter via a "ZONE 3." Also, as prior discussed, in the case where a theme park is a venue, an interior nested sub area can be a ride, where the ride (i.e. "ZONE 4") may be directly accessible without going through a "ZONE 3," representative of a typical ride line, or may be accessed via a "ZONE 3," representative of what is generally referred to as a "fast lane," which requires an upgraded ticket.

Still referring to FIG. 10, after a purchaser has purchased one or more tickets from a venue through any number of means including a venue web-site, the venue app of device 2a, or a physical venue guest services counter, they must register these tickets, which the present inventor refers to as a ZONE1 71 activity. The present invention has specified that all of ZONEs 71, 72, 73 and 74 have known geo-graphic areas and that by using either GPS or LPS a given cell phone being used for cell phone and venue app 2a is able to determine in which ZONE the guest is located and to alter its functionality accordingly. ZONE1 71 is any geographic location outside of ZONE2, ZONE3 and ZONE4. As the flowchart indicates, the first step is to ensure that the guest 1's cell phone has been loaded with the venue app forming device 2a of smart-ticket 2. As prior mentioned, the downloaded app will include a unique identifier that is preferably undetected and hidden from the guest 1. Regardless of how the tickets are acquired, eventually the guest 1 will receive the ticket(s) that are: 1) either paper ticket 2b, electronic ticket 2c, or a combination thereof, and 2) where each ticket minimally includes a ticket number that has been preferably encrypted using the purchaser/guest 1's app ID. Once the guest 1 has possession of their ticket(s), they "scan each guest 1 ticket," where scanning uses a camera if the ticket is paper ticket 2b, or an NFC reader if the ticket is electronic ticket 2c. As the ticket is scanned, venue app of device 2a minimally receives the ticket number, and preferably also a venue authentication code.

Still referring to FIG. 10, if the venue ticket system is using an authentication code, the next step is to determine if the ticket is "authentic?", meaning that the ticket is from the venue and not a counterfeit. As those familiar in counterfeit protection system will understand, there are many well-known authentication techniques, such as for printed tickets: 1) using both a QR code and a bar code, where the two are related through a guarded algorithm only known to the venue but accessible or embedded within the venue app 2a, where the QR code and the bar code must match or have some defined relationship when processed by the venue app 2a using the guarded algorithm, 2) using some form of a unique image, hologram, etc. that is hard to reproduce but preferably can be read and measured by the cell phone and venue app 2a using the cell phone 2a camera, or 3) using an on-line anti-counterfeiting service such as prior discussed from a venue agent such as Hewlett Packard or the venue itself. For electronic tickets 2c, at least measures (1) and (3) above may also be used, where if the ticket is a combined printed ticket 2b and electronic ticket 2c, at least measure (1) is increased in security by using the combination of paper scanning and NFC code scanning, all as will be well understood by those skilled in the art of anti-counterfeiting products. As will be well understood by those familiar with ticketing systems, many venues do not use a ticket authentication system and as such the authentication code as herein described along with this authentication check is optional and should be considered as exemplary of the present invention, and not as a limitation.

Still referring to FIG. 10, assuming that the ticket is authentic, the next step is to determine if the "ticket verifies?" and therefore that the ticket number is valid for the guest 1/app ID. There are at least two ways of performing this check including: 1) having the venue app 2a make an online connection with the venue database 40a to verify that the received tickets coincide with the purchaser/guest 1 and/or the app ID, and 2) having the venue app 2a decrypt the ticket number using the hidden app ID as a key, where the decrypted ticket number must then for example match a particular format or include an embedded code, where for example the embedded code is, or is relatable to, the authentication code. Regardless of the method, once the ticket number is validated, it is added to an "internal ticket list" maintained by the venue app 2a. Also, as prior mentioned the present inventor prefers that extended range data is included with either the paper ticket 2b (e.g. by further adapting the paper ticket 2b to include a flexible passive RFID,) or the electronic ticket 2c (e.g. by including an RFID in the form of 2c-3 or separate wearable 16.) As prior discussed, when an electronic ticket 2c is used, the ticket should be received with a ticket status in close range data 2c-2 set to "ISSUED" (or some equivalent) that is readable and verifiable using for example NFC.

Well not mandatory for many of the present invention's novel and useful functions, in the case where extended range data is included, the cell phone and venue app 2a also scans the tracking number, e.g. printed on the paper ticket 2b as another bar code or embedded in the electronic ticket close range data 2c-1, for storage in the internal ticket list in association with the ticket number. As will be well understood by those familiar with ticketing systems, many venues do not use a ticket number verification system and as such this "ticket verifies?" check is optional and should be considered as exemplary of the present invention, and not as a limitation.

Still referring to FIG. 10, in this more stringent implementation of the present invention as compared to the teachings related to FIGS. 2 and 3, after a ticket number has been added to the internal list at some point in time preferably prior to entering ZONE2 72 and ZONE3 73, but mandatory before entering ZONE4 74, the guest 1 must enter at least: 1) a facial image, and optionally enters: 2) a finger print, and 3) a name. As will be well understood by those familiar with mobile application development, the venue app 2a can control all of the functions on the cell phone associated with 2a, including the camera, finger sensor, GPS, wi-fi settings, Bluetooth settings, etc. In this step, it is preferred that one or more images of the guest 1 (who may or may not be the purchaser) are captured, stored and converted into meta-data. After capturing the one or more facial images, the venue app 2a also checks to see if these images are a match for any of the images captured in association with any other ticket numbers already added to this cell phone and venue app 2a's internal ticket list. As the careful reader will understand, if a purchaser/guest 1 is managing for example four (4) tickets with the same cell phone and venue app 2a, then each ticket will require a distinct facial image (i.e. a different guest 1.) As will also be understood by those skilled in the art of security systems, it is also helpful (but not mandatory) to have fingerprint associated with each ticket that is preferably entered at this time and also must be unique.

Still referring to FIG. 10, after venue app 2a captures images and optionally fingerprints of an optionally named guest 1, this same information is then converted into "biometric meta-data." As is well known in the art of facial recognition, a facial image is convertible into a set of image features with dimensions and landmarks, with distances between these landmarks. This information tends to be smaller in size for wireless transmission and more readily comparable between a database of similar information than comparing the original facial image data. However, the original facial image data often includes other features including blemishes and wrinkles that are typically not processed in facial algorithms, but are very noticeable to human facial evaluators. Like with fingerprints, the print image is convertible into what are typically referred to as minutiae, or the major features such as: a delta, a spur, a ridge ending, etc. While then encoding of the minutiae represents significantly less information than the finger print image which is useful when transmitting data wireless over a network connection, having the finger print image is valuable as it provides for a more accurate comparison for human evaluation. The present inventor prefers that all stored biometric data is encrypted using the hidden app ID to ensure guest 1 privacy. As will be well understood by those familiar with security systems, the use of meta-data is optional and should be considered as exemplary of the present invention, and not as a limitation.

Still referring to FIG. 10, venue app 2a preferably accepts "guest analytics info" from guest 1 including any information for helping to at least understand guest 1 preferences and movements within the venue, such as a theme park. As those familiar with data analytics will understand, using the example of a theme park, it can be very beneficial to compare the guest analytics datum in light of the captured guest 1 tracking data as herein described, especially including visits to restaurants, theaters, shops, individual rides, etc., of which there are many possible analyses. Preferred guest analytic datum is not sufficient for personal identification and therefore protects guest 1 privacy while still providing venues with useful information and includes, but is not limited to: age, sex, city, state, etc., and can even include information such as: favorite sport, team, tv show, character, etc. The use of guest analytic information is optional and should be considered as exemplary of the present invention, and not as a limitation.

Still referring to FIG. 10, after accepting any of guest analytics information, the venue app 2a will set the internal status code of the present ticket to "REGISTERED." If the present ticket is an electronic ticket 2c, then guest 1 will be prompted by the venue app 2a to rescan the electronic ticket 2c, at which point the ticket status maintained in close range data 2c-2 is reset to "REGISTERED." The purchaser/guest 1 then repeats these steps for each unique ticket, where each unique ticket must have at least a unique facial image and optionally also a unique finger print, name, biometric meta-data and analytics info. This completes the alternate preferred operation of the herein disclosed smart-ticket 2 within ZONE1 71. Once guest 1 has registered all of their one or more tickets, they may proceed to ZONE2 72, where it is preferred that this ZONE2 72 physically borders ZONE3 73, where ZONE3 73 then physically borders ZONE4 74, the venue itself. One key aspect of the present invention to note is that the venue app of device 2a preferably uses it internal GPS functionality to determine that the cell phone and venue app 2a, and therefore also the guest 1, is within any given ZONE1, 2, 3 and 4. In so doing, the venue app 2a provides different functionality to match the processing requirements of each respective ZONE. ZONE1 is essentially anywhere but the venue and its confirmation area ZONE3, where ZONE2 is preferred to be a small area outside of ZONE3 where the guest 1 "rescans ticket(s)." As prior mentioned, while this step is not mandatory, it ensures that a guest 1, who can otherwise pass directly into ZONE3 73 through an access point 5a-1 by scanning a paper 2b or electronic ticket 2c, first ensures that they are prepared for the confirmation process to take place within ZONE3 73, where being prepared includes: 1) having the cell phone and venue app 2a available that registered each of the ticket(s) that the guest 1 intends to currently use, and 2) making sure that each of these ticket(s) has already been registered.

While it is technically possible to perform the one-time registration step within ZONE3, by instead requiring that it is completed before ZONE3, the preferred operation limits the crowd size within ZONE3 but first limiting the amount of inputting that is necessary within ZONE3 using device 2a (i.e. only ticket confirmation and not also ticket registration.) As will be well appreciated by those familiar with venue management and from a careful reading of the present invention, reducing crowd build up in ZONE3 73 is useful as the goal of ZONE3 is to speed up the process of guest 1 access into the venue 74. Again, it is noted that the venue app 2a automatically detects that device 2a and therefore the guest 1 are physically located within ZONE2 72 and not ZONE1 71, and once so detected the venue app 2a then prompts the guest 1 to rescan their ticket(s) and otherwise will not allow the guest 1 to rescan their ticket(s) for the purpose of setting their status to "ENABLED," also meaning that the guest 1 is forced to perform all of the registration steps within ZONE1. After confirming that guest 1 and device 2*a* are within ZONE2 and prompting guest 1 to rescan a ticket, once rescanned the venue app 2*a* will set the internal status code of the ticket to "ENABLED." If the present ticket is an electronic ticket 2*c*, during rescanning the venue app 2*a* will also reset the ticket status maintained in close range data 2*c*-2 to "ENABLED." The guest 1 will then be prompted to rescan all of the tickets on the internal ticket list, and any that are not scanned cannot then be used to pass through access point 5*a*-1, as will be appreciated by a careful reading of the present invention. This completes the alternate preferred operation of the herein disclosed smart-ticket 2 within ZONE2 72.

Still referring to FIG. 10, guest 1 using a single ticket 2*b*, 2*c* or the combination thereof, passes through unmanned access point 5*a*-1 by scanning their single ticket. If the guest 1 was managing multiple ticket(s) using their cell phone and venue app 2*a*, it is presumed that there is one or more other guest 1's each using a single ticket, of one or more other tickets, to then also pass through access point 5*a*-1 into ZONE3 73. As each electronic ticket 2*c* is scanned, although not mandatory, it is preferred that the close-range data 2*c*-2 to "ENABLED." As prior mentioned, ZONE3 73 is a confined area, such that once passing through one of the one or more access points 5*a*-1, the only reasonable way for a guest 1 to leave ZONE3 73 is through either one or more exit access points 5*a*-2, or one or more access points 5*a*-3 leading into ZONE4 74, the venue. Also, as prior mentioned, the present inventor prefers that within the physically constrained ZONE3, the venue app 2*a* detects when a guest has proceeded away from entry points 5*a*-1 by perhaps 50 feet bringing them closer to the ZONE4 access points 5*a*-3. Again, this is possible because venue app 2*a* is using its GPS or a suitable LPS to determine the location of device 2*a* and therefore the guest 1. As will be understood by those familiar with crowd management, once entering ZONE3 guests 1 will begin to think about the next step of confirmation and to possibly slow down causing congestion around access points 5*a*-3, and therefore it is preferred that the venue app 2*a* essentially direct them forward a sufficient distance, where the present inventor anticipates that this functionality can be variable, where it is even possible that there are several demarcated "confirming areas" and the venue app 2*a* in conjunction with the venue's system monitors ZONE3 traffic and intelligently directs each guest 1 just entering ZONE3 to a particular demarcated sub-portion of ZONE3, not just for example 50 feet into ZONE3.

Still referring to FIG. 10, regardless of where a guest is within ZONE3, as some location within ZONE3 it is necessary that the guest 1 be required by the venue app 2*a* to confirm their ticket(s), a preferably prompted process that begins with "rescanning a ticket to begin confirmation." After a ticket is scanned by device 2*a*, the associated guest 1 will be prompted by venue app 2*a* to capture another one or more facial images, and optionally even a body image providing further features for differentiation and identification as will be well understood by those familiar with facial recognition, pattern matching and security systems. If the guest 1 entered a fingerprint during ZONE1 registration, then the guest 1 will also be prompted to scan their same finger as used for this prior registration in ZONE1. After venue app 2*a* scans at least the facial images and possible an upper torso/head image and/or a finger print, venue app 2*a* will first run internal processing to ensure that this information (e.g. after converting to biometric meta-data,) sufficiently "matches the registration" information entered for the present ticket within ZONE1. If the any of the scanned guest 1 information does not match, the guest 1 has two options: 1) try again, or 2) go to guest services.

Assuming that the scan is completed successfully and matches the registration scans, this confirmation biometric data is automatically "uploaded with ticket no. to the venue" by the venue app 2*a* to the venue access management system, preferably via a secured wireless link. In an alternative embodiment, the present inventor prefers for the sake of guest 1's privacy, although it is not mandatory, that this guest 1 biometric data is maintained in a database that has no database linkage to any other guest information such as ticket number, name, purchaser info, app id, tracking etc., as will be well understood by those familiar with database systems. Essentially, this biometric information becomes an isolated dataset simply used to record which guests 1 have already been confirmed for access into ZONE4 and otherwise has no use or association to a guest 1, including time of entry, current location, name, associated guests 1, etc. However, it is also desirable to associate this biometric data with the guest 1's tracking number and guardian ID/contact information, so as to provide the additional lost or missing guest functionality as prior described, where each guest 1 is being tracked by the system, and if a guest 1 such as a child is photo-graphed as possibly missing by a venue staff or another guest, the isolated biometric dataset can be searched to recall the guardian ID/contact information for communicating with the guardian. As the careful reader will see, there is a tradeoff in the level of privacy as compared to the level of venue services, where the options can be presented as choices to the registering guardians within ZONE1 and where some guests 1 can choose to connect additional guardian information while other do not. Regardless, once the biometric metadata is uploaded to the preferably isolated biometric dataset, the venue system will then perform an automated search of this dataset of guests 1 currently within ZONE4 or already confirmed and cleared to enter ZONE4. If a match is found, then the venue system preferably sends a "possible match" signal to the venue app 2*a*, which then alerts the guest 1 while also additionally causing the venue app 2*a* to further upload all of the guest 1's registration biometric data to the venue access management system for further storage and comparison by human evaluators with the prior uploaded confirmation biometric data.

Still referring to FIG. 10, as is well known in the art of facial recognition, automatic facial recognition algorithms are not perfect and also are tuned to either optimize FAR (the false acceptance rate where a non-authorized guest 1 is allowed access to the venue,) or FRR (the false recognition rate where an authorized guest 1 is denied access to the venue.) It is also well known in the art that a combination of automatic algorithms and human evaluation currently provides the highest accuracy that exceeds algorithms alone and human evaluation alone. The present invention provides the novel benefit of first using more stringent algorithms for examining the biometric metadata and then identifying those cases where the automatic algorithms come up with a potential guest 1 match, thus conversely ensuring that if no match is found then the likelihood of false acceptance is greatly reduced if not fully eliminated. In this process, a guest 1 potential match means that the guest 1 now trying to have their ticket confirmed appears to the venue's access management system to either already be in the venue and/or already be confirmed for entrance from ZONE3 into ZONE4 (the venue.) In this potential match situation, the venue access management system then: 1) automatically causes all biometric and associated data, for both the guest 1 now seeking confirmation, as well as any one or more possible matches found for the guest 1 within the preferably isolated biometric dataset, to be presented to a venue service agent at a computing device for further human evaluation, and 2) allowing the human evaluator to easily and quickly compare the current guest 1 biometric and any associated data with the biometric and any associated data of any possible matches, where the agent either accepts or rejects confirmation. The present inventor notes that this agent may be situated anywhere and does not need to be physically located near ZONE3.

Still referring to FIG. 10, the human agent becomes the final arbiter of determining if the guest 1 biometric data is "all unique?" with respect to the guests 1 already in the venue or confirmed to enter the venue. If the agent rejects the guest 1's request for confirmation, a message is communicated back to the venue app 2a directing the guest 1 to proceed to guest services, whereas if the agent accepts the guest 1's request for confirmation, a message is communicated back to the venue app 2a that the ticket has "received venue clearance." After confirming that the guest 1 present in ZONE3 is both the same as the registered guest 1 and also not already confirmed, the venue app 2a will set the internal status code of the ticket to "CONFIRMED." If the present ticket is an electronic ticket 2c, during rescanning the venue app 2a will also reset the ticket status maintained in close range data 2c-2 to "CONFIRMED." The guest 1 will then be prompted to repeat the process for any other tickets on the internal ticket list that have a current status of "ENABLED." This completes the alternate preferred operation of the herein disclosed smart-ticket 2 within ZONE3 73. Once a smart ticket 2 is confirmed, the guest 1 may then proceed through any of one or more access points 5a-3 to gain access into ZONE4 74, wherein the access point 5a-3 resets the status on an electronic ticket to "ACTIVE."

Still referring to FIG. 10, those familiar with facial recognition systems will understand that this two-step approach to venue access confirmation, wherein step 1 automatic algorithms stringently process biometric metadata to perform guest 1 confirmation for entry into the venue, and only upon detecting potential matches to already confirmed other guests 1 does the system execute step 2 of human evaluation, where the human evaluators are isolated and serve the queue of all guests seeking confirmation, provides a unique combination of: 1) maximum security using both algorithms and human evaluation, 2) maximum guest 1 privacy, 3) maximum throughput of guest 1 via self-serve access to the venue, 4) minimal staffing by the pooling of human evaluators to service the queue of all guests, and 5) minimal staffing by using unmanned access points 5a-1, 5a-2 and 5a-3. As prior stated, the venue access algorithms for performing the first algorithmic face match to determine if a guest 1 requesting confirmation has already been confirmed can now have thresholds altered to favor FRR over FAR, essentially requiring a higher degree of matching facial features, landmarks, etc. and thus reducing false acceptance (FAR) and thereby increasing security. The present system then efficiently presents this greater number of potential matches to awaiting agents who then can quickly make a human evaluation to accept or reject, where the combined process serves to greatly increase security while still permitting a greater overall flow of guests 1 through ZONE3 simply because all of access points 5a-3 are unmanned. The present inventor further anticipates that when a guest 1 is rejected by an agent, their entire "case" of pertinent information is made immediately available to ZONE3 guest services, such that the rejected guest 1 may then go to guest services and prove their identity to gain venue access. As the careful reader will see, and as will be clear to those familiar with information systems, many of the sub-steps mentioned herein, and especially as detailed with respect to FIG. 10 can be altered, re-ordered, skipped, enhanced, etc. without departing from the scope of the present invention. Furthermore, status codes such as "ISSUED," "REGISTERED," "ENABLED," "LIVE," "CONFIRMED," and "ACTIVE" are exemplary, as alternative encodes are obvious are sufficient, and therefore the teachings herein are to be considered as exemplary, rather than limitations of the present invention.

CONCLUSION AND RAMIFICATIONS

Thus the reader will see that the present invention accomplishes its objective of teaching the apparatus and methods for: 1) supporting a physical-virtual park gaming experience based at least in part upon information generated by a real-time guest tracking system, where the guest tracking determines the location of guests within any number of park-interaction points especially including a ride car seat on any of a guided, free-floating or free-ranging ride; 2) providing novel solutions for transparently tracking multiple guests as they enter and exit the park-interaction points including individual ride car seats, and 3) providing a system for allowing unmanned and secure venue and sub-venue access control.

The present invention and its associated parent patent teach a comprehensive system capable of embedding a virtualized gaming experience into the unique physical assets of a theme park, where a physical/virtual gaming experience at least includes: 1) the presentation of video/audio including the animation of characters that are automatically responsive at least in part to datum known by the system about a guest, where the datum at least includes any of the guest tracking datum or guest related information such as name, name pronunciation, or facial image associated with their ticket number and/or tracking number, and the animation is preferably at least at some moments a secret message or video than can only be perceived by guests wearing special park glasses, where those guests not wearing glasses see some other public message and are therefore unaware of the secret message, and where the animation is further responsive to the currently known game status of a particular guest, where game status includes any of a skill or achievement level, accumulated points, time spent or remaining in a game level, etc., 2) the controllable actuation of venue effects that are automatically responsive at least in part to datum known by the system about a guest, where the datum at least includes any of the guest tracking datum or guest related information associated with their ticket number and/or tracking number, where the venue effects provide output perceivable by the guest including any one of, or any combination of light, sound, water, air, vibration, etc., where actuation includes any one of, or any combination of increasing or decreasing a particular output, redirecting the projection of a particular output, or otherwise effecting the output to cause a perception or experience for a guest participating in the park-wide game, 3) accepting input from a guest that is used at least in part by a controllable venue affect to further actuate the effect, where accepting an input includes: a) providing a button where the guest then presses the button to alter the effect, where the button is further illuminated to indicate to the guest that pressing the illuminated button will cause an effect, where a process automatically determines to and does cause the button to be illuminated based at least in part upon guest information related to their: i) their ticket, ii) tracking datum, or iii) gaming status, or b) providing a object tracking system for determining, tracking and interpreting the movements of an article by a guest, such as a wizard's wand taught both in the prior art and in the base application, where the interpreted movements or article gestures are used at least in part by a controllable venue affect to further actuate the effect, and 4) automatically photographing or videoing a guest at a moment or moments at least in part corresponding to the timing of any one of, or any combination of: a) the animation of characters as herein described, or b) the controllable actuation of venue effects, with or without consideration of guest input, as herein described.

The present invention further teaches a comprehensive system of allowing one or more guests to purchase a ticket, register and lock the ticket to their personal biometric information, confirm themselves as to matching the biometrics registered to the locked ticket at a spatial point just prior in time to entering a venue or sub-venue, and then be either denied or gain admittance to the venue without the assistance of a venue staff member. This aspect of the present invention further accomplishes: 1) providing ticket authentication for counterfeit detection, 2) providing ticket number encryption for preventing ticket theft, 3) providing at least two levels of unmanned secure ticket confirmation, where the highest confirmation provides at least the combination of stringent algorithms for first comparing biometric datum for confirmation or denial of a guest entrance request, where the stringent algorithms favor lowering the false acceptance rate, and where denied guests are then subject to a second human evaluation of the biometric datum for comparing for either confirmation or denial of the guest entrance request, 4) providing guests with the ability to manage one or more tickets and associated guest biometric information through their own mobile device such as a cell phone running a venue app, where the biometric information is minimally shared with a venue access control system, where minimally shared includes allowing the guest to choose the level of association between their biometric information provided to the venue and the ticket related information also known to the venue, where the guest uses their own personal mobile device to enter biometric information and is not required to share a common biometric entry device that is shared by multiple other guests unknown to the guest, and 5) providing guests with the ability to form groups across one or more tickets, across one or more mobile devices each with a venue app, such that the combination of all grouped tickets may be assigned one or more guardians, where the guardians use their cell phone and mobile app to receive and review any and all tracking datum currently known to the venue tracking system regarding any associated guests in the group, where tracking datum includes current guest location as well as entrance and exit times with respect to individual park-interaction locations, where park-interaction locations include individual ride seats on a ride, where guardians may see images captured or continuously captured video by any one or more cameras adapted to the park-interaction locations including a ride car for currently viewing any guest in the group, where the guardians may alert the venue systems if a guest in the group is missing, where the alert includes at least a photo of the missing guest and guardian contact information, where a venue staff or another guest unrelated to the group can take a picture using a cell phone with the venue app where the picture is transmitted to the venue system for facial recognition and guest matching such that the guardian(s) associated with a matched missing guest are immediately contacted and provided with all available relevant information, and where the venue tracking system automatically notifies either or both the guardian(s) or venue staff if a non-guardian guest in a guarded group is detected as entering or exiting a park-interaction location at some amount of time before any of the guardians.

The present invention further teaches a spot tracking and photo system that: 1) coordinates with at least the guest tracking information and the venue effects to capture photos or videos timed with the guest experiences including any interactions within park-interaction locations including seats on guided, free-floating or free-ranging rides, 2) provides inputs for a guest to initiate their own self-photo or video especially on any guided, free-floating or free-ranging rides, 3) allows a guest to review and purchase captured photos and videos at least using their cell phone and venue app, where review includes electronically transferring a proof-photo to the guest's cell phone for viewing within the venue app, where the guest is automatically notified of transfer by the venue app, where the notification is timed to a detected guest movement such as through a chokepoint situated at a ride exit or shop entrance, where the guest can accept or reject the proof images, where accepting means any one of, or any combination of: a) storage in a venue maintained photo and video database, b) immediate printing as a physical photo to be acquired by the guest, or c) conversion into a saved photo location on the guest's cell phone, where rejecting means that the proof on the guests cell phone is deleted and optionally that any copy of the photo in the venue maintained photo and video database is deleted, 4) allows the guest to pre-establish a payment method, or make a pre-payment, for the photo services provided by the venue, where the payment method or pre-payment are known to the system and used to enable inputs used by a guest to initiate their own self-photo, and 5) allows the guest to establish social media accounts, links and other necessary information such that the venue photo system will automatically post photos and videos based upon this information and any other limits provided by the guest, where a limit includes only posting photos after a guest's approval or rejection.

As a careful reader will see, the present invention and the base application provide many apparatus and methods, some of which are novel and useful by themselves or in various combinations, as will be obvious to those skilled in the various arts. Those skilled in the various art herein described will also understand that newer implementation of technology will become available for providing the same functions as herein described for any given apparatus. As such, the present invention and all of its preferred and alternative embodiments should be considered both as apparatus and as functions that are exemplary and not limitations of the present invention. Furthermore, the present invention has uses well beyond theme and amusement parks including: museums, sporting and music venues, convention centers, air ports and even secure office buildings.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for providing a customized guest experience to a specific guest during a group experience being provided to one or more guests including the specific guest, where the system is used at a destination comprising two or more locationally distinct guest experiences, where at least one of the two or more locationally distinct guest experiences is the group experience, comprising:
- an interactive gaming system for engaging the specific guest in a game, where the game is at least in part conducted across or otherwise using the two or more locationally distinct guest experiences, where the customized guest experience is based at least in part upon a game state maintained by the interactive gaming system;
- a guest tracking system for determining guest tracking data comprising when the specific guest engages with a locationally distinct quest experience, where the quest tracking data is used at least in part by the interactive gaming system for determining the game state;
- a group location for providing the group experience, where the group location comprises at least one entranceway for the one or more guests to enter the group location and a multiplicity of distinct locations for occupying by each of the one or more guests after entering the group location;
- wireless tracking means worn or carried by the specific guest;
- one or more throughway sensors for detecting the passing by of the wireless tracking means through the at least one entranceway before or substantially as the specific guest enters the group location prior to the specific guest occupying one of the multiplicity of distinct locations;
- any one of or any combination of (1) one or more seating sensors for use at least in part for determining the specific distinct location being occupied by the specific quest based at least in part upon detecting either of the specific guest or the wireless tracking means substantially as, during, or after the specific guest has passed through the entranceway and while the specific guest is any of heading to, situating in, or after the specific guest has situated in and thereby is occupying a specific distinct location, and (2) a seating sequencing algorithm for use at least in part for determining the specific distinct location being occupied by the specific guest based at least in part upon the sequencing of the one or more guests including the specific guest passing through the at least one entranceway and based at least in part upon a pre-known arrangement of the multiplicity of distinct locations, and
- one or more apparatus for providing the customized guest experience to the specific guest while the specific guest is substantially occupying the specific distinct location of the group location, where the customized quest experience is based at least in part upon the specific distinct location.

2. The system of claim 1 where the wireless tracking means comprises any of RFID or NFC technology, where the wireless tracking means stores and provides guest information comprising any one of or any combination of venue, event, or guest information to the interactive gaming system, and where the guest information is used at least in part by the interactive gaming system for determining the game state and for determining the game experiences of the specific guest.

3. The system of claim 2 where the specific guest uses a game app to determine any of the guest information, and where the game app is used at least in part to provide guest information to the wireless tracking means.

4. The system of claim 1 where the one or more throughway sensors for detecting the passing by of the wireless tracking means as the specific guest enters the group location comprise one or more group chokepoint devices for emitting an exciter signal to cover an area passed through by the specific guest as the specific guest proceeds to enter the group location, where the group chokepoint device receives a reflection signal emitted or otherwise provided by the wireless tracking means in response to the exciter signal.

5. The system of claim 1 where the one or more seating sensors for detecting either of the specific guest or the wireless tracking means comprise any one of or any combination of seat chokepoint devices, seat pressure sensors, floor pressure sensors, and seat cameras.

6. The system of claim 1 conducted at a destination where the group location comprising the multiplicity of distinct locations is a movable group location capable of movement in any of one or more spatial dimensions, further comprising:
- one or more moveable group sensors for determining the current spatial location and/or orientation of the movable group location, where the provision of the customized guest experience is based at least in part upon the determined current movable group spatial location and/or orientation.

7. The system of claim 6 where at least one of the multiplicity of distinct locations comprising either the movable group location or the otherwise non-movable group location further comprises one or more means for determining one or more guest indications, and where the customized guest experience is based at least in part upon the one or more determined guest indications.

8. The system of claim 6 further comprising:
- one or more cameras for capturing one or more images of the specific guest substantially while the specific guest is receiving the customized guest experience, and
- an app for use by the specific guest, where the app allows the specific guest to retrieve, or is otherwise provided for the specific guest to view, any of the one or more captured images.

9. The system of claim 6 wherein the movable group location is a water craft comprising the multiplicity of distinct locations, where the specific quest boards the water craft using the at least one entranceway prior to traversing the water craft on way to occupying the specific distinct location, where the water craft floats or otherwise moves substantially freely along at least a portion of a waterway during the group experience, where the water craft comprises one or more natural fiducials, landmarks, or otherwise applied markers, and where the one or more group sensors comprise one or more tracking cameras for imaging the water craft as it proceeds along the waterway, further comprising:
- a moveable group location quest tracking algorithm for receiving a multiplicity of images from the one or more cameras and for determining (i) the current movable group spatial location and/or orientation of the water craft based at least in part upon processing the multiplicity of images to identify the one or more natural fiducials, landmarks, or otherwise applied markers, and determining (ii) a current movable guest spatial location and/or orientation of the specific guest traveling aboard the water craft based at least in part upon (ii-1) a pre-known arrangement of the multiplicity of distinct locations with respect to the water craft and the one or more natural fiducials, landmarks, or otherwise applied markers, and (ii-2) the specific distinct location being occupied by the specific quest determined by any one of or any combination of (1) or (2), where the specific guest receives the customized guest experience based at least in part upon (ii) the current movable quest spatial location and/or orientation, and optionally where the waterway comprises one or more special effects positioned at known points along the possible ride path of the free-floating water craft, where the one or more special effects are timed to occur based at least in part upon any one of or any combination of the current movable group spatial location and/or orientation and the current movable guest spatial location and/or orientation.

10. The system of claim 1 where at least one of the multiplicity of distinct locations comprises one or more input means for accepting one or more indications from the specific guest while the specific guest is substantially occupying the specific distinct location, where the one or more specific guest indications are used at least in part for any one of or any combination of providing guest indications to the interactive gaming system for use in the game or altering the provision of the customized guest experience.

11. The system of claim 10 where the at least one of the multiplicity of distinct locations further comprises output means, and where any of the functions of the input or output means is altered or otherwise determined based at least in part by information provided by the interactive gaming system.

12. The system of claim 1, further comprising:
a game app for use by the specific guest to provide guest personal information, where the guest personal information is used at least in part by the interactive gaming system for any one of or any combination of determining the game state and determining the customized quest experiences to be provided to the specific guest.

13. A method for use at a destination for providing a customized guest experience to a specific guest during a group guest experience, where the destination comprises a multiplicity of quest experiences, where each of the multiplicity of quest experiences is provided at a distinct spatial location and/or over a distinct temporal duration, where at least one of the multiplicity of guest experiences is the group guest experience, where the spatial location used for providing the group quest experience comprises a multiplicity of distinct seats one of which is occupied by the specific quest when receiving the customized guest experience or otherwise group experience, and where the customized quest experience is based at least in part upon a guest experience received by the quest while not at the group quest experience, comprising the steps of:

providing the specific guest with wireless tracking means, where the guest wears or carries the wireless tracking means in order to receive the customized guest experience;

tracking when the specific quest with the wireless tracking means is located at or otherwise within each of the multiplicity of quest experiences and determining the customized quest experience based at least in part upon any one or more of the tracked multiplicity of quest experiences that are not the group quest experience;

determining when the specific guest with the wireless tracking means is passing through an entrance into a group seating location from receiving the group guest experience;

determining a final distinct seat being occupied by the specific guest with the wireless tracking means, and providing the customized guest experience to the specific guest located in the final distinct seat substantially during the provision of the group guest experience, where the customized quest experience is based at least in part upon the final distinct seat.

14. The method of claim 13 for use with a destination game participated in by the specific guest, where the customized guest experience is based at least in part upon the destination game, further comprising the steps of:
providing a destination gaming system for use by the specific guest, where the gaming system receives guest tracking information comprising when the specific guest visits a specific guest experience of the multiplicity of guest experiences, and where the destination gaming system at least in part determines the content or otherwise provision of the customized guest experience based at least in part upon the guest tracking information.

15. The method of claim 14 where the interactive gaming system additionally receives inputs from the specific guest as a part of the game, further comprising the steps of:
providing the specific guest with a game app, where the specific guest provides the inputs to the game app for use by the destination gaming system for use at least in part in determining any of game directives or output to provide to the specific guest, where the game directives or output are provided to the specific guest using any one of or any combination of the game app and apparatus associated with or located at any of the multiplicity of guest experiences.

16. A system for providing a customized guest experience to a specific guest during a group experience being provided to one or more guests including the specific guest, where the system is used at a destination comprising two or more locationally distinct guest experiences, where at least one of the two or more locationally distinct guest experiences is the group experience, comprising:
an interactive gaming system for engaging the specific guest in a game, where the game is at least in part conducted across or otherwise using the two or more locationally distinct guest experiences, where the customized guest experience is based at least in part upon a game state maintained by the interactive gaming system;

a guest tracking system for determining guest tracking data comprising when the specific guest engages with a locationally distinct guest experience, where the guest tracking data is used at least in part by the interactive gaming system for determining the game state;

a group location for providing the group experience, where the group location comprises at least one entranceway for the one or more guests including the specific guest to enter the group location and a multiplicity of distinct locations for occupying by each of the one or more guests including the specific guest in order to receive the group experience or a customized guest experience after entering the group location;

wireless tracking means worn or carried by the specific guest;

one or more sensors for detecting the wireless tracking means or otherwise the specific guest for use in determining the guest tracking data comprising (a) the presence of the specific guest at any of the two or more locationally distinct guest experiences, and with respect to the group location also determining (b) a specific distinct location currently being occupied by the specific guest within the multiplicity of distinct locations while at the group location, and one or more apparatus for providing the customized guest experience to the specific guest while the specific guest is substantially occupying the specific distinct location of the group location, where the customized guest experience is based at least in part upon the specific distinct location.

17. The system of claim 16 wherein:

the wireless tracking means comprises any of RFID or NFC technology, where the wireless tracking means stores and provides guest information comprising any one of or any combination of venue, event, or guest identification information to the interactive gaming system, and where the guest information is used at least in part by the interactive gaming system for determining any one of or any combination of the game state and the game experiences of the specific guest;

the one or more sensors used for detecting (a) are throughway sensors for detecting the passing through of the wireless tracking means as the specific guest enters or otherwise transverses an entranceway into an experience location used for providing any one or more of the two or more locationally distinct guest experiences, where the throughway sensors comprise one or more group chokepoint devices for emitting an exciter signal to cover an area passed through by the specific guest as the specific guest proceeds to enter the experience location, where the group chokepoint device receives a reflection signal emitted or otherwise provided by the wireless tracking means in response to the exciter signal;

the one or more sensors used for detecting (b) are specific location sensors for detecting either of the specific guest or the wireless tracking means and comprise any one of or any combination of seat chokepoint devices, seat pressure sensors, floor pressure sensors, and seat cameras, and determining (b) the specific distinct location currently being occupied by the specific guest within the multiplicity of distinct locations while at the group location is based at least in part upon any one of or any combination of (b1) detecting either of the specific guest or the wireless tracking means being worn or carried by the specific guest substantially as, during, or after the specific guest has arrived at the specific distinct location for occupying to receive the guest experience, and (b2) first detecting and determining an ordered list representative of a single-file passage sequence of substantially all one or more of the guests including the specific guest heading to substantially the same multiplicity of distinct locations for receiving the group guest experience, and second determining a specific distinct location being occupied by the specific guest based at least in part upon pre-knowledge of the spatial arrangement of the multiplicity of distinct locations and at least in part upon the ordered list.

18. The system of claim 16 wherein the group location for providing the group experience is a movable group location capable of movement in any of one or more spatial dimensions, further comprising:

one or more movable group sensors for determining the current spatial location and/or orientation of the movable group location, where the provision of the customized guest experience is based at least in part upon the determined current movable group spatial location and/or orientation, and where optionally at least one of the multiplicity of distinct locations comprising either the movable group location or the otherwise non-movable group location further comprises one or more means for determining one or more guest indications, and where the customized guest experience is based at least in part upon the one or more determined guest indications.

19. The system of claim 18 wherein the movable group location is a water craft comprising the multiplicity of distinct locations, where the specific guest boards the water craft using the at least one entranceway prior to traversing the water craft on way to occupying the specific distinct location, where the water craft floats or otherwise moves substantially freely along at least a portion of a waterway during the group experience, where the water craft comprises one or more natural fiducials, landmarks, or otherwise applied markers, and where the one or more group sensors comprise one or more tracking cameras for imaging the water craft as it proceeds along the waterway, further comprising:

a moveable group location guest tracking algorithm for receiving a multiplicity of images from the one or more cameras and for determining (i) the current movable group spatial location and/or orientation of the water craft based at least in part upon processing the multiplicity of images to identify the one or more natural fiducials, landmarks, or otherwise applied markers, and determining (ii) a current movable guest spatial location and/or orientation of the specific guest traveling aboard the water craft based at least in part upon (ii-1) a pre-known arrangement of the multiplicity of distinct locations with respect to the water craft and the one or more natural fiducials, landmarks, or otherwise applied markers, and (ii-2) the specific distinct location being occupied by the specific guest determined by any one of or any combination of (1) or (2), where the specific guest receives the customized guest experience based at least in part upon (ii) the current movable guest spatial location and/or orientation, and optionally where the waterway comprises one or more special effects positioned at known points along the possible ride path of the free-floating water craft, where the one or more special effects are timed to occur based at least in part upon any one of or any combination of the current movable group spatial location and/or orientation of the water craft and the current movable guest spatial location and/or orientation of the specific guest.

20. The system of claim 16 further comprising any one of or any combination of:

one or more cameras for capturing one or more images of the specific guest substantially while the specific guest is receiving the customized guest experience;

an app for use by the guest, where the app allows the guest to retrieve, or is otherwise provided for the guest to view, any one or more images captured of the guest during the experience;

one or more input means for accepting one or more indications from the specific guest while the specific guest is substantially occupying the specific distinct location, where the one or more specific guest indications are used at least in part for any one of or any combination of providing guest indications to the interactive gaming system for use in the game or for altering the provision of the customized guest experience, and a game app for use by the specific guest to provide guest personal information, where the guest personal information is used at least in part by the interactive gaming system for any one of or any combination of determining the game state and determining the customized guest experiences to be provided to the specific guest.

\* \* \* \* \*